US009737926B2

(12) United States Patent
Harada et al.

(10) Patent No.: US 9,737,926 B2
(45) Date of Patent: *Aug. 22, 2017

(54) BALL SCREW AND MANUFACTURING METHOD OF NUT FOR BALL SCREW

(71) Applicant: NSK Ltd., Shinagawa-ku, Tokyo (JP)

(72) Inventors: Toru Harada, Fujisawa (JP); Koji Hashimoto, Fujisawa (JP); Tsuyoshi Ito, Fujisawa (JP); Tomofumi Yamashita, Fujisawa (JP); Naoya Aoki, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/678,459

(22) Filed: Apr. 3, 2015

(65) Prior Publication Data

US 2015/0283600 A1    Oct. 8, 2015

Related U.S. Application Data

(62) Division of application No. 13/581,210, filed as application No. PCT/JP2011/001560 on Mar. 16, 2011, now abandoned.

(30) Foreign Application Priority Data

Mar. 17, 2010  (JP) .................................. 2010-061182
Mar. 17, 2010  (JP) .................................. 2010-061183
(Continued)

(51) Int. Cl.
*B21K 1/04*   (2006.01)
*B21K 1/70*   (2006.01)
(Continued)

(52) U.S. Cl.
CPC ............... *B21K 1/70* (2013.01); *B21J 5/025* (2013.01); *B21J 5/12* (2013.01); *B21J 13/025* (2013.01);
(Continued)

(58) Field of Classification Search
CPC .. B21H 3/08; B21H 7/182; B21H 7/187; B21J 5/12; B21K 1/04; B21K 1/54;
(Continued)

(56) References Cited

U.S. PATENT DOCUMENTS 3,393,575 A    7/1968   Irwin
3,393,576 A    7/1968   Carlson
(Continued)

FOREIGN PATENT DOCUMENTS

EP    1 500 572 A2    1/2005
JP    49-37059 A      4/1974
(Continued)

OTHER PUBLICATIONS

Chinese Office Action issued in counterpart Chinese Application No. 201180010963.4 dated Dec. 28, 2015 with English translation (eight pages).
(Continued)

*Primary Examiner* — Debra Sullivan
(74) *Attorney, Agent, or Firm* — Crowell & Moring LLP

(57) ABSTRACT

A ball screw is provided in which an outer circumferential formation is formed at a portion facing a ball circulating passage out of outer circumferential surface of a nut. The ball screw includes: a screw shaft having on its outer circumferential surface a screw groove; a nut having on its inner circumferential surface a screw groove facing the screw groove; a plurality of balls rollably loaded in a spiral ball rolling passage formed by both screw grooves; and a ball circulating passage to return the balls from a start point
(Continued)

to an end point of the ball rolling passage for recirculation. The ball circulating passage is a concaved groove formed by concaving a groove on a part of the cylindrical inner circumferential surface of the nut by plastic working. Then, a flange is integrally provided at a portion facing the ball circulating passage and the screw groove.

6 Claims, 34 Drawing Sheets

(30) Foreign Application Priority Data

| Nov. 29, 2010 | (JP) | ................................ | 2010-265071 |
|---|---|---|---|
| Nov. 30, 2010 | (JP) | ................................ | 2010-266012 |
| Jan. 14, 2011 | (JP) | ................................ | 2011-006117 |
| Feb. 23, 2011 | (JP) | ................................ | 2011-037400 |
| Feb. 28, 2011 | (JP) | ................................ | 2011-042529 |

(51) Int. Cl.

| *B21J 5/12* | (2006.01) |
|---|---|
| *B21K 21/12* | (2006.01) |
| *B21K 21/16* | (2006.01) |
| *B21K 23/00* | (2006.01) |
| *F16H 25/22* | (2006.01) |
| *B21J 13/02* | (2006.01) |
| *B21J 5/02* | (2006.01) |

(52) U.S. Cl.
CPC ............... *B21K 1/04* (2013.01); *B21K 21/12* (2013.01); *B21K 21/16* (2013.01); *B21K 23/00* (2013.01); *F16H 25/2223* (2013.01); *Y10T 74/19767* (2015.01)

(58) Field of Classification Search
CPC . B21K 1/56; B21K 1/70; B21K 21/06; B21K 21/12; B21K 21/16; B21K 23/04; B21D 17/02
USPC .......... 72/353.2, 353.4, 353.6, 354.6, 370.21
See application file for complete search history.

(56) References Cited

U.S. PATENT DOCUMENTS

| 3,902,377 | A | | 9/1975 | Lemor |
|---|---|---|---|---|
| 4,610,155 | A | * | 9/1986 | Langford ................... B21J 5/12 72/353.4 |
| 5,582,072 | A | | 12/1996 | Yamaguchi et al. |
| 6,199,440 | B1 | | 3/2001 | Greubel et al. |
| 6,464,034 | B1 | | 10/2002 | Toda et al. |
| 7,013,747 | B2 | | 3/2006 | Drake |
| 7,107,805 | B2 | | 9/2006 | Osterlaenger et al. |
| 7,628,088 | B2 | | 12/2009 | Osterlanger et al. |
| 2004/0083840 | A1 | | 5/2004 | King et al. |
| 2007/0209465 | A1 | | 9/2007 | Shirai et al. |
| 2009/0064811 | A1 | | 3/2009 | Shirai |
| 2010/0101348 | A1 | | 4/2010 | Teramachi et al. |
| 2010/0242652 | A1 | | 9/2010 | Shirai et al. |
| 2011/0100143 | A1 | | 5/2011 | Borza |

FOREIGN PATENT DOCUMENTS

| JP | 56-41861 Y2 | 9/1981 |
|---|---|---|
| JP | 64-11466 U | 1/1989 |
| JP | 6-7202 Y | 2/1994 |
| JP | 6-45149 U | 6/1994 |
| JP | 6-235446 A | 8/1994 |
| JP | 8-57563 A | 3/1996 |
| JP | 11-104781 A | 4/1999 |
| JP | 11-159594 A | 6/1999 |
| JP | 2000-297854 A | 10/2000 |
| JP | 2000-297855 A | 10/2000 |
| JP | 2004-150593 A | 5/2004 |
| JP | 2004-232843 A | 8/2004 |
| JP | 2004-251367 A | 9/2004 |
| JP | 2005-249036 A | 9/2005 |
| JP | 2005-299754 A | 10/2005 |
| JP | 2005-321059 A | 11/2005 |
| JP | 2006-21307 A | 1/2006 |
| JP | 2006-57851 A | 3/2006 |
| JP | 2007-92968 A | 4/2007 |
| JP | 2007-127152 A | 5/2007 |
| JP | 2008-2523 A | 1/2008 |
| JP | 2008-215422 A | 9/2008 |
| JP | 2008-281063 A | 11/2008 |
| JP | 2009-14025 A | 1/2009 |
| JP | 2009-192033 A | 8/2009 |
| JP | 2010-96317 A | 4/2010 |
| WO | WO 01/11264 A1 | 2/2001 |
| WO | WO 2007/013266 A1 | 2/2007 |
| WO | WO 2007/046321 A1 | 4/2007 |
| WO | WO 2009/100332 A2 | 8/2009 |

OTHER PUBLICATIONS

Japanese Office Action issued in counterpart Japanese Application No. 2011-152620 dated Jan. 19, 2016 with partial English translation (four pages).
Chinese Office Action issued in counterpart Chinese Application No. 201180010963.4 dated Jul. 13, 2015, with English translation (Five (5) pages).
Japanese Office Action dated Jun. 30, 2015 with English translation (six pages).
International Search Report , including English translation dated May 24, 2011 (four (4) pages).
Japanese-language International Preliminary Report on Patentability (PCT/IPEA/409) dated Jul. 5, 2012 (six (6) pages).
English Translation of document C2 (International Preliminary Report on Patentability) previously filed on Aug. 30, 2012 (ten (10) pages.
Japanese Office Action dated Jun. 18, 2013 with English translation (eleven (11) pages).
Korean Office Action dated Feb. 28, 2014 with English translation (seven (7) pages).
Japanese Office Action dated Aug. 26, 2014 (three pages).

* cited by examiner

F I G. 1
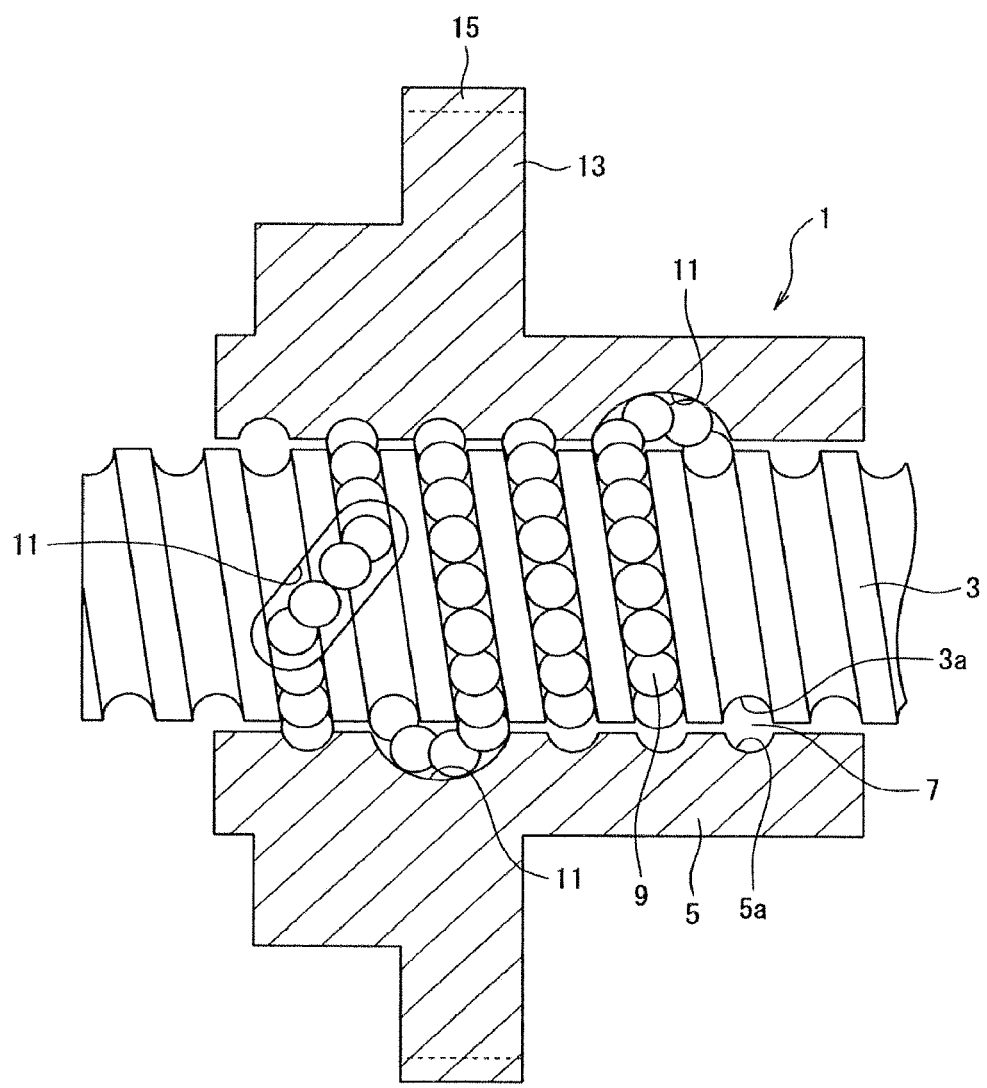

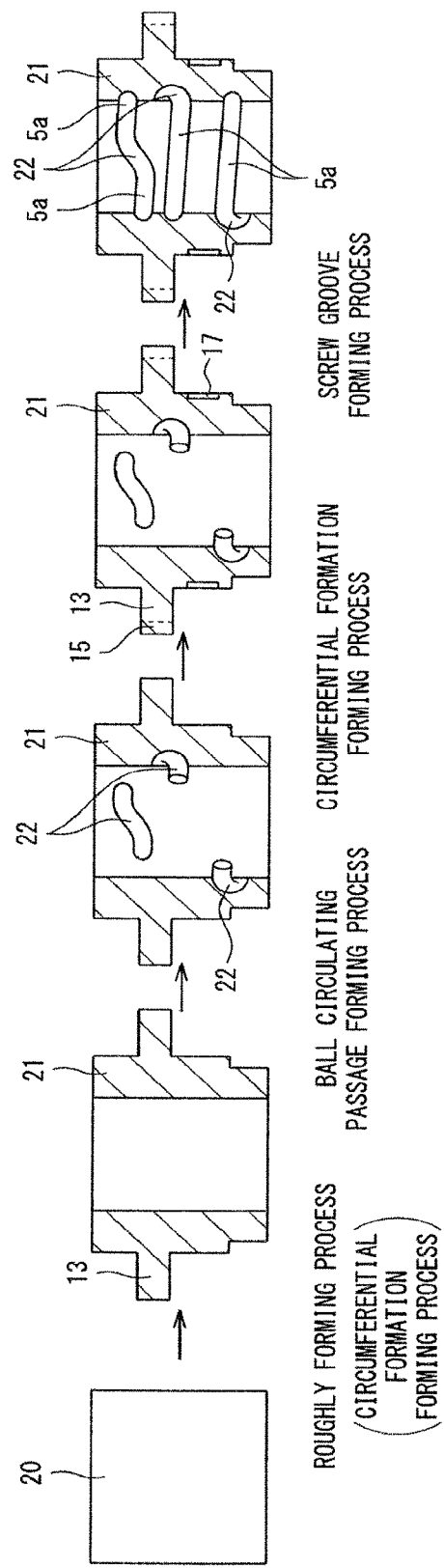

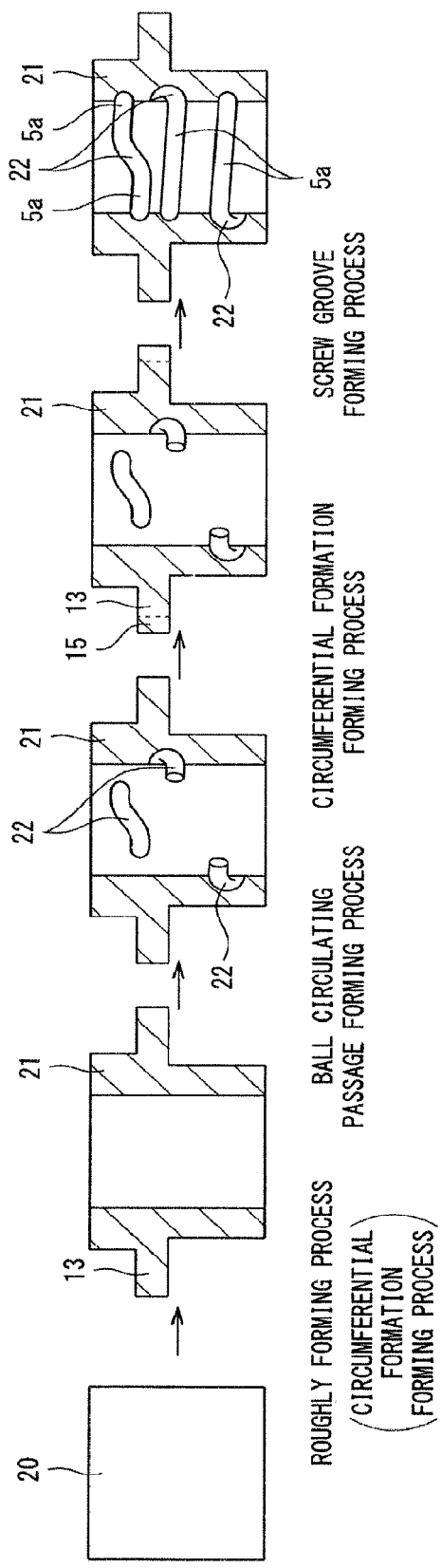

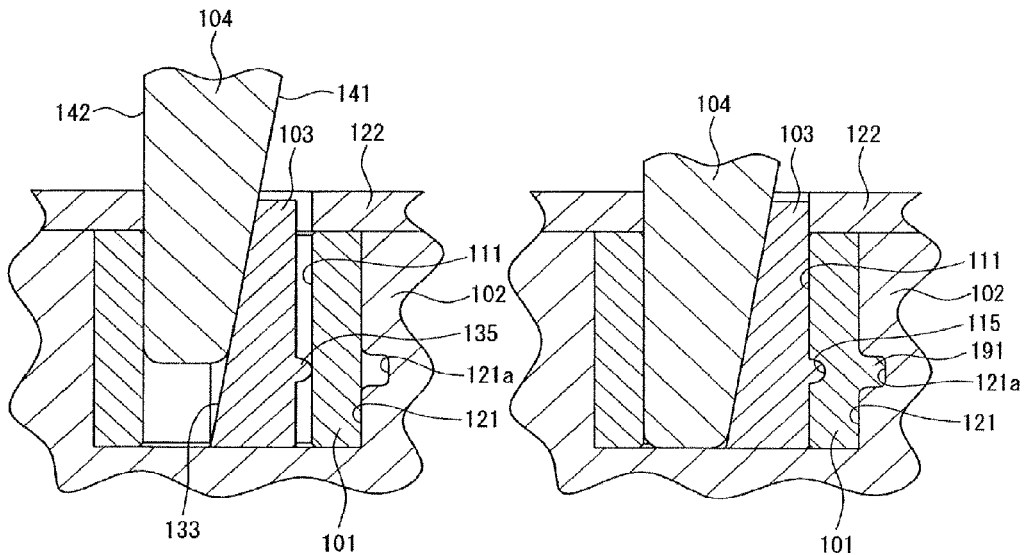
FIG. 16A  FIG. 16B
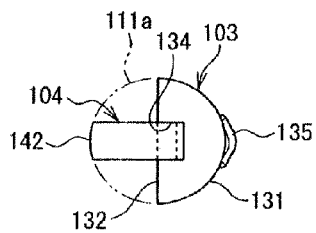 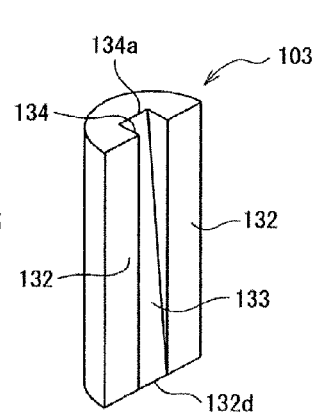 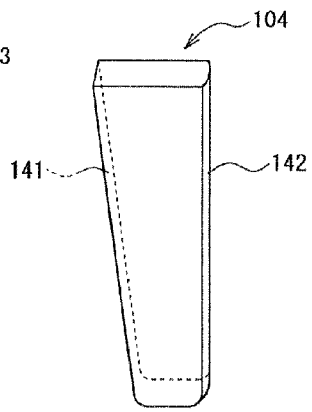
FIG. 17A  FIG. 17B  FIG. 17C

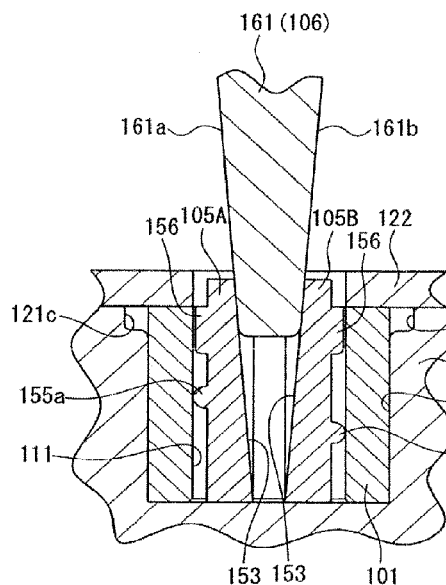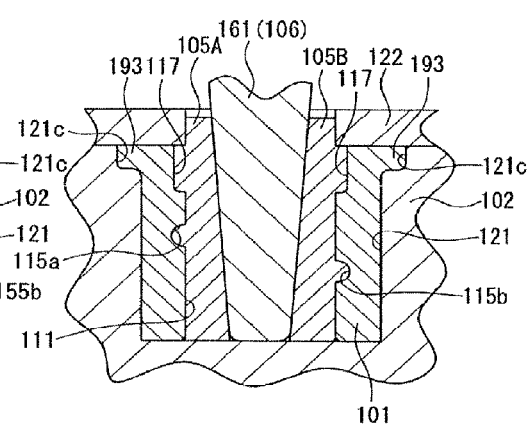
FIG. 22A  FIG. 22B
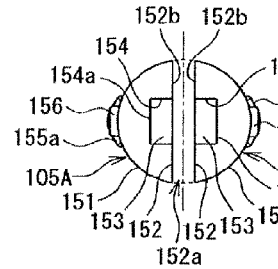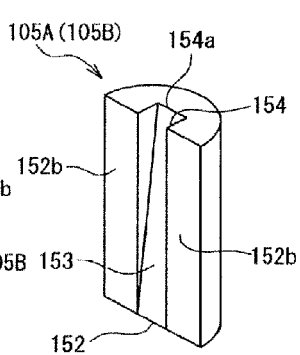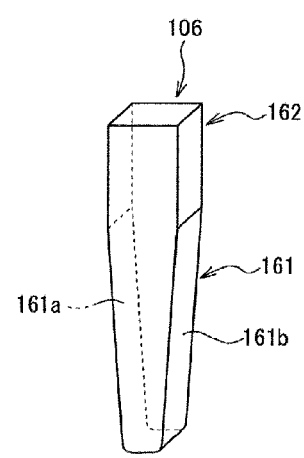
FIG. 23A  FIG. 23B  FIG. 23C

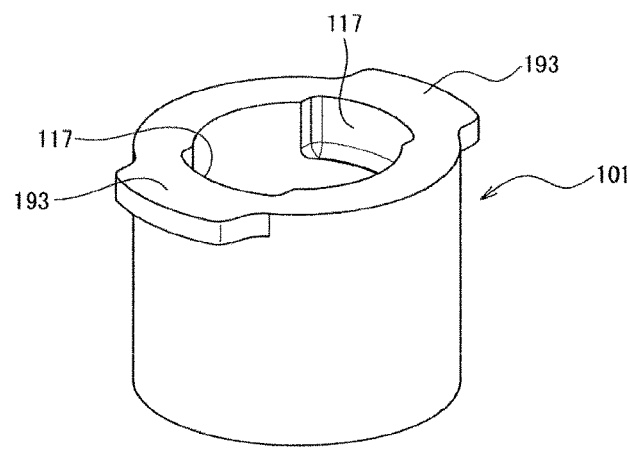
FIG. 24
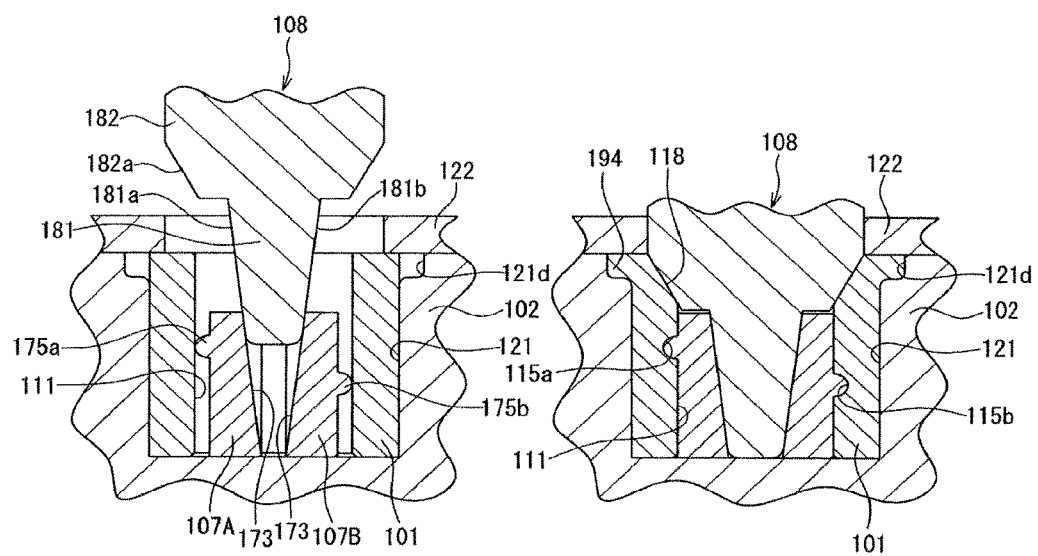
FIG. 25A
FIG. 25B

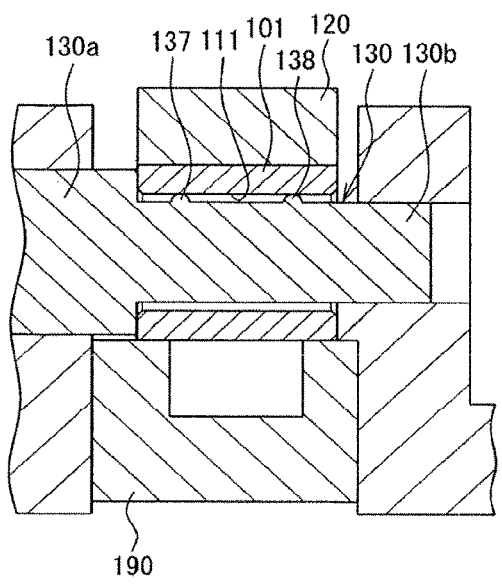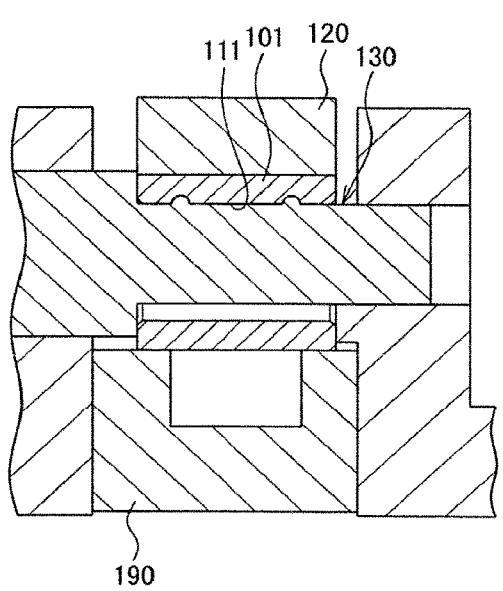
FIG. 28A Prior Art
FIG. 28B Prior Art

BALL SCREW AND MANUFACTURING METHOD OF NUT FOR BALL SCREW

CROSS-REFERENCE TO RELATED APPLICATIONS

This application is a divisional of application Ser. No. 13/581,210, filed Aug. 24, 2012, which is a National Stage application of PCT International Application No. PCT/JP2011/001560, filed Mar. 16, 2011, which claims priority under 35 U.S.C. §119 to Japanese Patent Application No. 2010-061182, filed Mar. 17, 2010, which claims priority under 35 U.S.C. §119 to Japanese Patent Application No. 2010-061183, filed Mar. 17, 2010, which claims priority under 35 U.S.C. §119 to Japanese Patent Application No. 2010-265071, filed Nov. 29, 2010, which claims priority under 35 U.S.C. §119 to Japanese Patent Application No. 2010-266012, filed Nov. 30, 2010, which claims priority under 35 U.S.C. §119 to Japanese Patent Application No. 2011-006117, filed Jan. 14, 2011, which claims priority under 35 U.S.C. §119 to Japanese Patent Application No. 2011-037400, filed Feb. 23, 2011, which claims priority under 35 U.S.C. §119 to Japanese Patent Application No. 2011-042529, filed Feb. 28, 2011, the disclosures of which are expressly incorporated by reference herein.

FIELD OF THE INVENTION

The present invention relates to a ball screw. The present invention relates to a manufacturing method of a nut constituting a ball screw.

RELATED ART

A ball screw includes: a screw shaft having on its outer circumferential surface a spiral screw groove; a nut having on its inner circumferential surface a screw groove facing the screw groove of a screw shaft; and a plurality of balls rollably loaded in a spiral rolling passage formed by the both screw grooves. When the nut screwed via the balls into the screw shaft and the screw shaft is relatively rotate in an axial direction, the screw shaft and the nut relatively move through the rolling of the balls.

In such a ball screw, there is provided a ball circulating passage constituting an endless ball passage formed by communicating a start point with an end point of the ball rolling passage. That is, when the balls rotate around the screw shaft while moving through within the ball rolling passage and reaches the end point of the ball rolling passage, the balls are scooped up from one end of the ball rolling passage, the balls travel through the ball circulating passage and is finally returned back to the start point of the ball rolling passage from the other end of the ball circulating passage. In this way, since the balls rolling through within the ball rolling passage infinitely circulates along the ball circulating passage, the screw shaft and the nut can relatively move continuously.

A circulating system of the balls employing the ball circulating passage includes various systems, such as a tube system, a deflector system, etc. For example, in case of the tube system, a return tube to communicate a start point with an end point of the ball rolling passage is fixed on an outer circumferential surface of the nut. Meanwhile, in case of the deflector system, a deflector in which a groove to communicate a start point with an end point of the ball rolling passage is formed is fitted into a deflector hole piercing through an inner circumferential surface and the outer circumferential surface.

PRIOR ART DOCUMENT

Patent Document 1: U.S. Pat. No. 7,013,747
Patent Document 2: JP 2000-297854 A
Patent Document 3: JP 2008-281063 A
Patent Document 4: JP 2010-96317 A
Patent Document 5: JP 2004-251367 A

SUMMARY OF THE INVENTION

Problem to be Solved

However, it is difficult to form outer circumferential formations, such as a flange, etc., at a portion where the ball rolling passage is provided out of the outer circumferential surface of the nut, for the reason that in case of the tube system, the return tube is fixed to the outer circumferential surface of the nut. In case of the deflector system, the deflector hole to fit a deflector is opened to the outer circumferential surface of the nut. In other words, it is difficult to design the outer circumferential surface in arbitrary shape. In addition, it is difficult to freely attach another member to a portion where the ball circulating passage is provided of the outer circumferential surface of the nut. As stated above, in the conventional ball screw, restrictions are imposed on the geometry of an outer diameter portion of the nut.

To this end, an object of the present invention is to provide a ball screw for solving the above-identified problems of the prior art, and has a high degree of freedom of the geometry at the outer diameter portion of the nut. Another object of the present invention is to provide a manufacturing method of a ball screw nut to enable manufacturing of a nut constituting such a ball screw.

Solution to the Problem

To accomplish the above-indicated object, the present invention is configured of the following components. Namely, according to one aspect of the present invention, there is provided a ball screw comprising: a screw shaft having on an outer circumferential surface a spiral screw groove; a nut having on its inner circumferential surface a screw groove facing the screw groove of the screw shaft; a plurality of balls rollably loaded in a spiral ball rolling passage formed by the both screw grooves; and a ball circulating passage to return the balls from an end point to a start point of the ball rolling passage for circulating the balls, wherein the ball circulating passage is formed of a concaved groove formed by concaving a groove on a part of the cylindrical inner circumferential surface of the nut, and an outer circumferential formation is integrally formed on a part facing the concaved groove on the outer circumferential surface of the nut.

Herein, the outer circumferential formation may be at least one of an encoder, a teeth train for a gear, a rotation stopper, a key, a key seat, a motor rotor, an inner ring of a one-way clutch, a raceway groove for a bearing, a screw, a circumferential groove, and another shape of the outer circumferential surface.

Additionally, the nut may be produced by machining a cylindrical metal blank to produce a roughly formed nut having a substantially identical shape with the nut, concaving a groove on the part of the cylindrical inner circumferential surface of the roughly formed nut, forming the concaved groove constituting the ball circulating passage, and forming the outer circumferential formation on the outer circumferential surface of the roughly formed nut.

Alternatively, the nut may be produced by machining a cylindrical metal blank to produce a roughly formed nut having a substantially identical shape with the nut, by concaving a groove a part of the cylindrical inner circumferential surface of the roughly formed nut by plastic working, forming the concaved groove constituting the ball circulating passage, and forming the outer circumferential formation on the outer circumferential surface of the roughly formed nut.

In addition, in the ball screw according to the aforesaid one embodiment of the present invention, preferably, the screw groove of the nut is provided only at a part where the balls rotate on the inner circumferential surface of the nut, and is not provided at a part where the balls do not rotate.

Furthermore, according to said one aspect of the present invention, a protrusion may be provided integrally with the nut on an end face in an axial direction of the nut. This protrusion may be provided at a part in the circumferential direction of the end face in an axial direction of the nut.

Moreover, according to another aspect of the present invention, there is provided a ball screw comprising: a screw shaft having on an outer circumferential surface a spiral screw groove; a nut having on its inner circumferential surface a screw groove facing the screw groove of the screw shaft; a plurality of balls rollably loaded in a spiral ball rolling passage formed by the both screw grooves; and a ball circulating passage to return the balls from an end point to a start point of the ball rolling passage for circulating the balls, wherein the ball circulating passage is formed of a concaved groove formed by concaving a groove on a part of the cylindrical inner circumferential surface of the nut, and an outer circumferential formation is integrally formed on a part facing the concaved groove on the outer circumferential surface of the nut, wherein the concaved groove is formed on the inner circumferential surface of the nut blank by pressing the inner circumferential surface of the nut blank with a convex, by a press method using a die of the cam mechanism, the cam mechanism comprising: a cam driver internally inserted into a nut blank and moving in an axial direction; a cam slider disposed between the nut blank and the cam driver, and having the convex corresponding to the concaved groove, the convex moving in a radial direction of the nut with a movement of the cam driver.

Moreover, according to said one aspect or another aspect of the present invention, the ball screw may further comprise a nut fitted member to be fitted by press fitting onto the outer circumferential surface of the nut.

In this situation, preferably, an interference of the nut fitted member and the nut by press fitting exceeds 0.02 percent of an external dimension of the outer circumferential surface of the nut onto which the nut fitted member is fitted. Alternatively, preferably, an interference of the nut fitted member and the nut by press fitting exceeds 0.02 percent and less than 0.16 percent of an external dimension of the outer circumferential surface of the nut onto which the nut fitted member is fitted.

Additionally, preferably, when the nut fitted member is press fitted into the nut, shrink fitting is used which heats the nut fitted member to fit onto the nut.

Furthermore, preferably, the nut fitted member is any of a sleeve a bearing, a gear, each having a cylindrical inner circumferential surface, and a combination thereof.

Moreover, according to said one aspect of the present invention, the ball screw may further comprise a nut fitted member provided by insert molding on the outer circumferential surface of the nut.

Additionally, according to another aspect of the present invention, there is provided a manufacturing method of ball screw nut comprising: a nut having on an inner circumferential surface a spiral groove and on an outer circumferential surface a protrusion; a screw shaft having on an outer circumferential surface a spiral groove; a plurality of balls rollably loaded between a raceway formed by the both screw grooves; and a ball returning passage formed as a concave on an inner circumferential surface of the nut, to return the balls from an end point to a start point of the raceway, the plurality of balls rolling in the raceway to cause the nut to relatively move with respect to the screw shaft, wherein formation of the concave on the inner circumferential surface of the nut, and formation of the protrusion on the outer circumferential surface of the nut are simultaneously performed by cold forging.

Furthermore, according to said another aspect of the present invention, the concaved groove may be formed on the inner circumferential surface of the nut blank by pressing the inner circumferential surface of the nut blank with a convex, by a press method using a die of the cam mechanism, the cam mechanism comprising: a cam driver internally inserted into a cylindrical nut blank and moving in an axial direction; a cam slider disposed between the nut blank and the cam driver, and having the convex corresponding to the concaved groove, the convex moving in a radial direction of the nut with a movement of the cam driver; and a restraining member for restraining both end faces in the axial direction and the outer circumferential surface of the nut blank, and having a recess on an inner circumferential surface that receives the outer circumferential surface of the nut blank, wherein the outer circumferential formation is formed by projecting a periphery of the nut blank into the recess of the restraining member.

In this situation, a working in a subsequent process may be performed after a process in the press method using the die, by using the outer circumferential formation, a recess or a tapered surface formed on the inner circumferential surface of the outer circumferential formation, as a reference surface or a holding part.

In addition, the outer circumferential formation may be a torque transmission part, a positing part, or a mounting part.

Furthermore, according to further another aspect of the present invention, there is provided a ball screw comprising: a screw shaft having on an outer circumferential surface a spiral screw groove; a nut having on an inner circumferential surface a screw groove facing the screw groove of the screw shaft; a plurality of balls rollably loaded in a spiral ball rolling passage formed by the both screw grooves; and a ball circulating passage to return the ball from an end point to a start point of the ball rolling passage for circulating the balls, wherein the ball circulating passage is formed of a concaved groove on a part of the cylindrical inner circumferential surface of the nut, and a protrusion is provided on an end face in an axial direction of the nut.

In this situation, the concaved groove may be formed on the inner circumferential surface of the nut blank by pressing the inner circumferential surface of the nut blank with a convex, by a press method using a die of a cam mechanism, the cam mechanism comprising: a cam driver internally inserted into a cylindrical nut blank and moving in an axial direction; a cam slider disposed between the nut blank and the cam driver, and having the convex corresponding to the concaved groove, the convex moving in a radial direction of the nut with a movement of the cam driver; and a restraining member for restraining both end faces in the axial direction and the outer circumferential surface of the nut blank, and having a recess on an end face to receive the both end faces in the axial direction of the nut blank, wherein the protrusion is formed by projecting an excess material, produced with the formation of the concaved groove, of the nut blank into a recess of the restraining member.

Additionally, preferably, a nut fitted member is provided by insert molding on the outer circumferential surface of the nut, the nut fitted member being formed to cover the outer circumferential formation on the outer circumferential surface of the nut produced with the formation of the concaved groove.

Preferably, the nut fitted member formed by insert molding may be either of or both of the sleeve or a gear having a cylindrical inner circumferential surface.

Advantageous Effect of the Invention

Since in the ball screw of the present invention, the ball circulating passage is configured with the concaved groove formed by concaving a groove on a part of the inner circumferential surface of the nut, the present invention provides a high degree of freedom of the geometry of the outer diameter portion of the nut. Further, the production method of the ball screw nut of the present invention allows manufacturing of the ball screw nut with a high degree of freedom of the geometry of the outer diameter portion of the nut.

BRIEF DESCRIPTION OF THE DRAWINGS

FIG. 1 is a cross-sectional view of a ball screw according to a first embodiment of the present invention;

FIG. 6 is a process drawing of manufacturing method of the nut shown in FIG. 5;

FIG. 15 a process drawing explaining a manufacturing method of a ball screw of a third embodiment;

FIGS. 16A and 16B are views explaining a method of a first example of a fourth embodiment;

FIG. 17A is a plain view, FIG. 17B is a perspective view, and FIG. 17C is a perspective view showing the cam slider, used in the first example of a fourth embodiment;

FIGS. 22A and 22B are views explaining a method of a third example of the fourth embodiment;

FIG. 23A is a plane view, FIG. 23B is a perspective view, and FIG. 23C is a perspective view showing the cam driver, of a cam slider used in the third example of the fourth embodiment;

FIG. 24 is a perspective view showing a nut blank removed from a die in a state shown in FIG. 22B;

FIGS. 25A and 25B are views explaining a method of the fourth example of the fourth embodiment;

FIGS. 28A and 28B are views explaining a method of patent document 3;

FIGS. 38A and 38B are views showing a construction of one example of the ball screw of the fifth embodiment, in which FIG. 38A is a cross-sectional view, and FIG. 38B is a perspective view;

DESCRIPTION OF EMBODIMENTS

Figure 2:
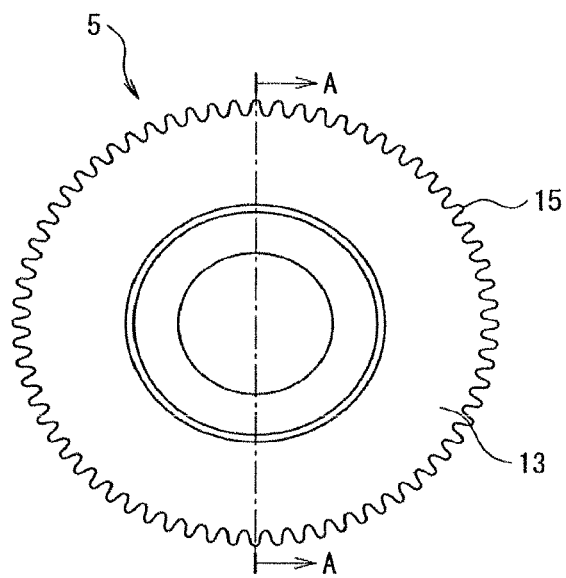
FIG. 2 is a front view of a nut.
Figure 3:
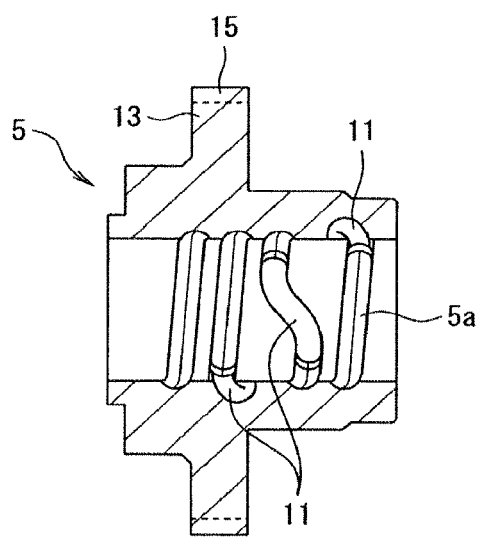
FIG. 3 is a cross-sectional view taken along a line A-A of the nut shown in FIG. 2.

Hereinafter, a description will be made to embodiments of the present invention with reference to the accompanying drawings.

First Embodiment

FIG. 1 is a cross-sectional view (a cross-sectional view taken with a plane in an axial direction) of a ball screw of a first embodiment according to the present invention. As shown in FIG. 1, the ball screw 1 includes: a screw shaft 3 having on its outer circumferential surface a spiral screw groove 3a; a nut 5 having on its inner circumferential surface a spiral screw groove 5a facing the screw groove 3a of the screw shaft 3; a plurality of balls 9 rollably loaded in a spiral ball rolling passage 7 formed by the both screw grooves 3a and 5a; and a ball circulating passage 11 to return the balls 9 from an end point to a start point of the ball rolling passage 7 for circulating the balls 9.

Namely, the balls 9 circulates around the screw shaft 3 while traveling within the ball rolling passage 7 and reaches an end point of the ball rolling passage 7, where the balls 9 are scooped up from one end of the ball circulating passage 11 and returns to the start point of the ball rolling passage 7 from the other end of the ball circulating passage 11 through within the ball circulating passage 11.

It is noted that materials for the screw shaft 3, the nut 5, and the ball 9 are not specifically limited to particular ones, and any general materials may be available. For example, metal such as steel, etc., and ceramic may be given as a candidate. Additionally, a cross-sectional shape of the screw grooves 3a and 5a may be an arc or a gothic arc.

Such a ball screw 1 is arranged such that when the nut 5 screwed via the ball 9 with the screw shaft 3 and the screw shaft 3 are relatively rotated, the screw shaft 3 and the nut 5 relatively move through the rolling of the ball 9 in an axial direction. An endless ball passage is formed by the ball rolling passage 7 and the ball circulating passage 11. The ball 9 rolling within the ball rolling passage 7 endlessly circulates within the endless ball passage, and therefore the screw shaft 3 and the nut 5 are allowed to relatively move continuously.

An explanation will be made here to the ball circulating passage 11 in further details. The ball circulating passage 11 is integrally formed on an inner circumferential surface of the nut 5. More specifically, a concaved groove formed concaving a groove on a part of the cylindrical inner circumferential surface of the nut 5 by plastic working or by cutting is taken as the ball circulating passage 11. Since the ball screw 1 of the present embodiment adopts a ball circulating system utilizing such a ball circulating passage 11, it eliminates the necessity for mounting another member constituting the ball circulating passage 11 on the nut 5. In this connection, a cross-sectional shape of the ball circulating passage 11 may be an arc or a gothic arc.

In case where the ball circulating system is a tube system or a deflector system, a member constituting the ball circulating passage and the nut are formed as a separate body. In case of the tube system, the return tube is provided on the outer circumferential surface, whereas in case of the deflector system, a deflector is attached in a deflector hole. Therefore, it is impossible to provide an outer circumferential formation such as a flange, etc., at a portion where the return tube and the deflector are provided, on the outer circumferential surfaces. Thus, a restriction is imposed on the freedom to design the outer circumferential surface of the nut.

In contrast, in the ball screw 1 of the present embodiment, the ball circulating passage 11 is provided on the inner circumferential surface of the nut 5, which eliminates the need for providing any kind of member for circulation of the balls on the outer circumferential surface of the nut 5. This gives freedom to design all over the outer circumferential surface of the nut 5 in arbitrary shape, without being restricted by a position where the ball circulating passage 11 is provided and the number of circuits. Thus, the embodiment enables integrally forming the outer circumferential formation even at a position facing the ball circulating passage 11 and the screw groove 5a, on the outer circumferential surfaces of the nut 5. The ball screw 1 of the present embodiment is provided with a flange 13 as the outer circumferential formation. Further, since the ball screw 1 does not include members such as the return tube, the deflector, etc., it is free from care about perchance being fallen out, thus providing the reliable ball screw 1.

The kind of the outer circumferential formation is not specifically limited to a particular one. In addition to the flange, a teeth train for a gear, a key seat, a baring raceway groove, and another shape of outer circumferential surface may be used. For example, provided that the teeth train for a gear is arranged in a circumferential direction and consists of a plurality of teeth on the outer circumferential surface of the nut 5, it enables the nut 5 to function as a gear. Moreover, given that a key seat is formed on the outer circumferential surface of the nut 5, the nut 5 can be connected with another member by engaging a key provided in another member into the key seat. Further, provided that a bearing raceway groove is formed on the outer circumferential surface of the nut 5, it enables the nut 5 to function as an inner ring of the rolling bearing. Furthermore, whereas the outer circumferential surface of the nut 5 typically has a circular cross section, not limited thereto, another shape of outer circumferential surfaces, such as a polygonal cross section and an elliptical cross section may also be permitted. Incidentally, one of these outer circumferential formations may be provided on the outer circumferential surfaces of the nut 5, or two or more may be provided. For instance, as in the ball screw 1 of the present embodiment, a flange 13 is provided on the outer circumferential surface of the nut 5, and a teeth train 15 for a gear on the outer circumferential surface of the flange 13.

A forming method of these outer circumferential formations is not specifically limited to a particular one, and it may be formed by forging such as cold forging, or by cutting. With these forming methods, low-cost manufacturing of the ball screw with the outer circumferential formation is made possible as the formation can be easily formed. Also, in what order the outer circumferential formation and the ball circulating passage 11 should be provided is not specifically limited to a particular one, rather it does not matter which of them is provided first. Nonetheless, if the ball circulating passage 11 is formed after the outer circumferential formation is provided by e.g. cold forging, it ensures high shaping accuracy of the ball circulating passage 11.

Whereas application of such a ball screw 1 of the preset embodiment is not specifically limited to a particular one, it is preferably applied, inter alia, to an electric actuator to be incorporated into a car, a motorcycle, a positioning device, etc.

Herein, one example of manufacturing method of the nut 5 of the ball screw 1 of the present embodiment will be briefly explained by referring to FIG. 6. Firstly, a cylindrical steel material (not shown) is worked by cold forging to form a virtually cylindrical blank (having a shape substantially identical with the nut 5). Secondly, a concaved groove is formed on an outer circumferential surface of the blank by plastic working such as forging, etc., to provide the ball circulating passage 11. Then, a teeth train 15 for a gear that consists of a plurality of teeth arranged in a circumferential direction is provided on the outer circumferential surface of the flange 13 projecting from the outer circumferential surface of the blank. Finally, when the screw groove 5a is formed on the inner circumferential surface of the blank, the nut 5 is provided.

Second Embodiment

In the ball screw, there are a variety of circulating systems of the balls using the ball circulating passages, including a tube system and a deflector system. For example, in case of the tube system, a return tube for communicating a start point with an end point of the ball rolling passage is secured on the outer circumferential surface of the nut 5. Meanwhile, in case of the deflector system, a deflector in which a groove for communicating a start point with an end point of the ball rolling passage is formed is fitted into a deflector hole piercing through the outer circumferential surface and the inner circumferential surface of the nut. In addition, it is also known a circulating system in which a concaved groove is formed by concaving a groove on a part of the inner circumferential surface of the nut, so that the concaved groove is adopted as the ball circulating passage.

In manufacturing such a ball screw, the nut is manufactured by working a cylindrical steel material by cold forgoing to produce a substantially cylindrical blank (having a shape substantially the same as that of the nut), and by applying cutting to the blank. More specifically, the formation of a through hole into which the return tube is inserted and the deflector hole, the formation of the concaved groove, and the formation of the outer circumferential formation, such as the teeth train for a gear, on the outer circumferential surface are achieved by cutting. Further, Patent Document 2 proposes a technique of manufacturing a nut having a desired geometry with sintered alloy.

However, manufacturing of the nut by cutting inherently entails a problem of undergoing poor material yield and high cost. What is more, since sintered alloy has low density and contains void, the sintered alloy inherently involves a problem that it is difficult to have the sufficient strength as a nut.

The second embodiment is devised for aiming at the above-identified problems, and its object is to provide a manufacturing method of a ball screw and a ball screw, with which manufacturing of a ball screw is enabled at a low-cost and with a high strength, in addition to a high material yield.

To solve the above problems, a manufacturing method of the second embodiment comprises: a screw shaft having on its outer circumferential surface a spiral screw groove; a nut having on its inner circumferential surface a screw groove facing the screw groove of the screw shaft; and a plurality of balls rollably loaded in a spiral ball rolling passage formed by the both screw grooves; a ball circulating passage to return the ball from an end point to a start point of the ball rolling passage for circulating the balls; and an outer circumferential formation integrally formed on the outer circumferential surface of the nut, the method comprising a roughly forming step of producing a roughly formed nut having a shape substantially identical with the nut from a cylindrical metal material; a ball circulating passage forming step of forming a concaved groove constituting the ball circulating passage by concaving a groove on a part of a circular cylindrical surface (cylindrical surface) inner circumferential surface of the roughly formed nut; and an outer circumferential formation forming step of forming the outer circumferential formation on the outer circumferential surface of the roughly plastic nut, wherein the outer circumferential formation is at least one of a key, an encoder, a gear, a rotation stopper, a screw, a circumferential groove, a motor rotor, and an inner ring of a one-way clutch.

At least one of the roughly forming step, the ball circulating passage forming step, and the outer circumferential formation forming step is worked by plastic working.

Further, the plastic working is cold forging.

The ball screw of the second embodiment comprises: a screw shaft having on its outer circumferential surface a spiral screw groove; a nut having on its inner circumferential surface a screw groove facing the screw groove of the screw shaft; a plurality of balls rollably loaded in a spiral ball rolling passage formed by the both screw grooves, and a ball circulating passage to return the balls from an end point to a start point of the ball rolling passage for circulating the balls, wherein the ball circulating passage is formed of a concaved groove formed by concaving a groove on a part of the cylindrical inner circumferential surface of the nut, and a outer circumferential formation is integrally formed on the outer circumferential surface of the nut, and wherein the outer circumferential formation is at least one of a key, an encoder, a gear, a rotation stopper, a screw, a circumferential groove, a motor rotor, and an inner ring of a one-way clutch.

According to the manufacturing method of the ball screw and the nut of the second embodiment, the embodiment allows manufacturing the ball screw with a high strength at a low cost, in addition to a high material yield.

Figure 4B:
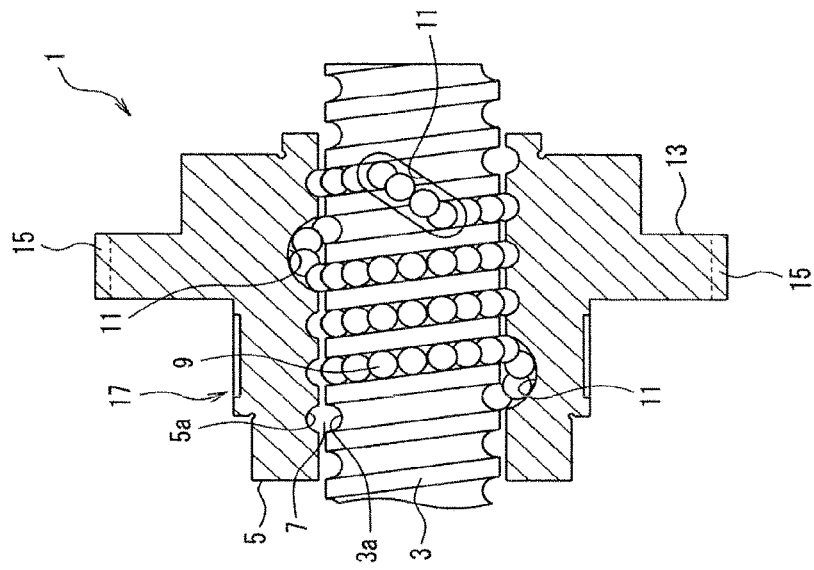
FIG. 4B is a longitudinal sectional view of a first example of a second embodiment of a ball screw according to the present invention.
Figure 4A:
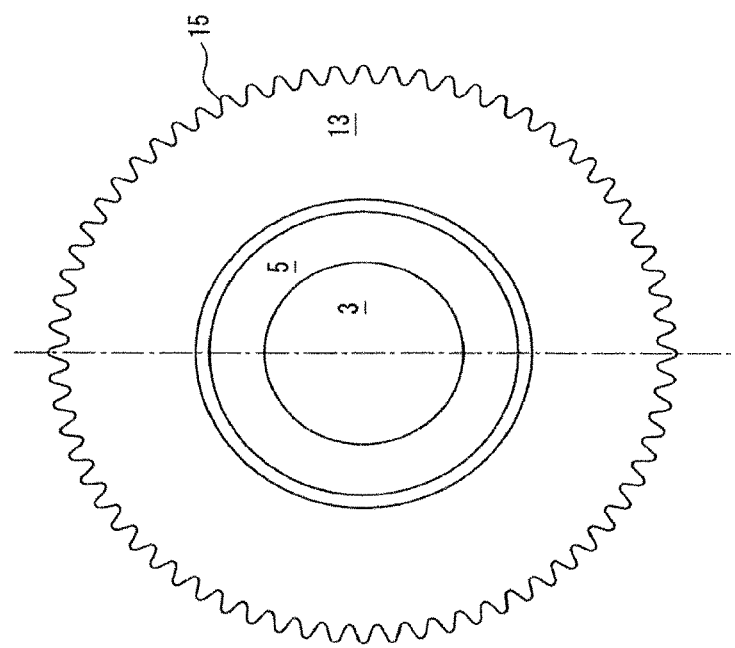
FIG. 4A is a front view.
Figure 5B:
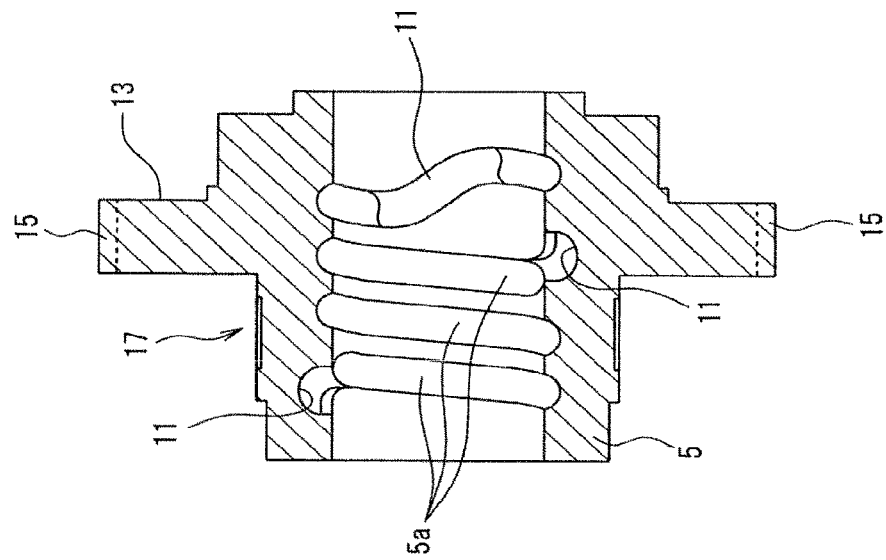
FIG. 5A is a right side view, and FIG. 5B a longitudinal sectional view of only a ball screw nut shown in FIGS. 4A and 4B.
Figure 5A:
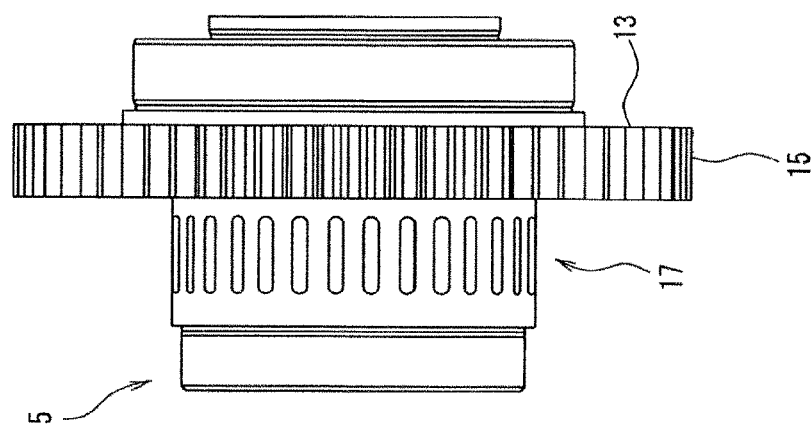

An explanation will next be made to the ball screw of the second embodiment by referring to the drawings. FIG. 4 is a view showing one example of the ball screw of the second embodiment, in which FIG. 4A is a front view, and FIG. 4B is a longitudinal sectional view (a longitudinal sectional view parallel to an axis line, hereinafter referred also to as a transversal longitudinal sectional view). FIG. 5 is a view only showing the details of the nut of the ball screw shown in FIG. 4, in which FIG. 5A is a right side view, and FIG. 5B is a transversal longitudinal sectional view.

As shown in FIG. 5, the ball screw 1 includes: a screw shaft 3 having on its outer circumferential surface a spiral screw groove 3a; a nut 5 having on its inner circumferential surface a spiral screw groove 5a facing the screw groove 3a of the screw shaft 3; a plurality of balls 9 rollably loaded in a spiral ball rolling passage 7 formed by both screw grooves 3a and 5a; and a ball circulating passage 11 to return the balls 9 from an end point to a start point of the ball rolling passage 7 for circulating the balls.

In other words, the balls 9 rotate around a screw shaft 3 while traveling through the ball rolling passage 7, and reach an end point of the ball rolling passage 7 where the balls 9 are scooped up from one end of the ball circulating passage 11 and are returned to the start point of the ball rolling passage 7 through the ball circulating passage 11.

It is noted that what materials should be used for the screw shaft 3, the nut 5, and the balls 9 are not specifically restrained to particular ones, rather it may be available general materials, including e.g. metal such as steel, etc., and ceramic. Further, a cross-sectional shape of the screw grooves 3a and 5a may be an arc, so-called a gothic arc formed by connecting two or more arcs.

Such a ball screw 1 is configured such that when the nut 5 screwed with the screw shaft 3 via the balls 9 and the screw shaft 3 are relatively rotated, they relatively move in an axial direction with the rolling of the balls 9. The endless ball passage is formed of the ball rolling passage 7 and the ball circulating passage 11. As the balls 9 rolling through the ball rolling passage 7 endlessly circulate through the endless ball passage, the screw shaft 3 and the nut 5 are permitted to relatively move continuously.

An explanation will be made here in detail to the ball circulating passage 11. The circulating passage 11 is integrally formed on the inner circumferential surface of the nut 5. More particularly, a concaved groove formed by concaving a groove on a part of the inner circumferential surface of the nut 5 e.g. by plastic working is taken as the ball circulating passage 11. It is noted that a cross-sectional shape of the ball circulating passage 11 may be an arc or the previously described gothic arc. Since the ball screw 1 of the present embodiment adopts a ball circulating system using such a ball circulating passage 11, the embodiment eliminates the need for providing a member, such as the return tube and the deflector on the nut 5 constituting the ball circulating passage. Also, the embodiment eliminates the necessity for providing a through hole and a deflector hole to mount another member, such as the return tube and the deflector constituting the ball circulating passage.

Where the ball circulating system is the tube system and the deflector system, the member constituting the ball circulating passage and the nut are separate bodies. In case of the tube system, the return tube is provided on the outer circumferential surface of the nut, whereas in case of the deflector system, the deflector is fitted into the deflector hole. For that reason, the outer circumferential formation such as the flange cannot be arranged on a portion where the return tube and the deflector are provided, on the outer circumferential surfaces of the nut, resulting in a restriction on freedom of design of the outer circumferential surface of the nut.

In contrast, according to the ball screw 1 of the present embodiment, since the ball circulating passage 11 is provided on the inner circumferential surface of the nut, the embodiment eliminates the need for providing any member to circulate the ball on the outer circumferential surface of the nut 5. Additionally, since the embodiment eliminates the necessity for forming any hole to attach a member for circulating the ball, the nut 5 is not subject to a restriction of a position where the ball circulating passage 11 is provided or the number thereof. This may give a high degree of freedom to design the outer circumferential surface in arbitrary shape on all over the outer circumferential surface of the nut 5. Accordingly, the embodiment enables the integral formation of the outer circumferential formation on the outer circumferential surface of the nut 5, even at a portion facing the ball circulating passage 11 and the screw groove 5a, on the outer circumferential surfaces of the nut 5. Further, since members such as the return tube, the deflector, etc. are not provided, it is free from care of these members being fallen out, which offers the ball screw 1 with high reliability. Furthermore, no particular restriction is not imposed on the kind of the outer circumferential formation of the nut 5, rather in addition to the flange, a teeth train for gear (helical gear), an encoder, a key, a bevel gear, a rotation stopper, a screw (male screw), a circumferential groove, a motor rotor, and an inner ring of a one-way clutch may be available. For example, integrally providing the flange on the outer circumferential surface of the nut 5, and forming the teeth train for a gear (helical gear consisting of plural circumferentially arranged teeth on the outer circumferential surface of the flange allows the nut 5 to function as a gear.

Moreover, integrally providing the encoder on the outer circumferential surface of the nut 5 enables direct detection of a rotational state of the nut 5. Additionally, integrally providing a key on the outer circumferential surface of the nut 5 connects the nut 5 with another member, by engaging the nut 5 into a key seat formed in the another member. Further, integrally providing a bevel gear on the outer circumferential surface of the nut 5 enables a power transmission with the bevel gear to be meshed.

With the provision of a detent on the outer circumferential surface of the nut 5, mere locking of the rotation stopper attains a translatory movement of the screw shaft 3, when the nut 5 and the screw shaft 3 are relatively rotated. Further, integrally providing a screw (male screw) on the outer circumferential surface of the nut 5 allows a screw motion between screws to be screwed together therewith. In addition to this, integrally providing a circumferential groove on the outer circumferential surface of the nut 5 achieves a bearing capability on the outer circumferential surface of the nut 5 by, for example, attaching a wear ring into the circumferential groove.

Moreover, integrally providing the rotor motor on the outer circumferential surface of the nut 5 enables the nut 5 per se to function as a rotor motor. By installing it within a motor stator, a turning force to be imparted to the nut 5 may easily or directly be obtained. Additionally, integrally providing an inner ring of a one-way clutch on the outer circumferential surface of the nut 5 restricts the rotation to either the nut 5 or the outer ring of the one-way clutch.

Specifically, one of these outer circumferential formations may be formed on the outer circumferential surface of the nut 5, or two or more may be formed thereon. For example, in the ball screw 1 of the present embodiment, the flange 13 is provided on the outer circumferential surface of the nut 5, the teeth train 15 for a gear is provided on the outer circumferential surface of the flange 13, and an encoder (rotary encoder) 17 is integrally provided on a left side in an illustrated axial direction of the flange 13. Thereby, the nut 5 of the ball screw 1 of the present embodiment may function as a gear, and its rotational state can be detected by the encoder 17. While an application of the ball screw 1 of the present embodiment is not specifically limited to a particular one, it may preferably be applied to an electric actuator to be built in a car, a motorcycle, a positioning device, etc.

An explanation of one example will next be made to a manufacturing method of the ball screw 1 of the present embodiment by referring to FIG. 6. In the present embodiment, a cylindrical steel material 20 having the predetermined length (or mass) is machined by plastic working e.g. by cold forging, etc., to produce a blank 21 (roughly formed nut) having a shape (substantially cylindrical shape) virtually identical with the nut 5 (roughly forming process). At this time, the flange 12 is also provided on the outer circumferential surface of the blank 21 by plastic working. Therefore, the roughly forming process also serves as an outer circumferential forming process.

A concaved groove is then formed by concaving a groove on a part of the cylinder-shaped inner circumferential surface of the blank 21 by e.g. plastic working such as cold forging to form a concaved groove 22 constituting the ball circulating passage 11 communicating a start point with an end point of the ball rolling passage 7 (ball circulating passage forming process). A specific method of forming the concaved groove 22 includes one as below. That is, inserting a punch with a convex having a shape corresponding to the concaved groove 22; bringing the convex of the punch into contact with the inner circumferential surface of the blank 21; and strongly pressing the punch against the inner circumferential surface of the blank to form the concaved groove 22.

It is noted that in what order the outer circumferential formation and the ball circulating passage 11 should be provided is not specifically limited to a particular one, which of them is provided first is not a matter. However, in the present embodiment, since the ball circulating passage 11 is formed after the flange 13 that is the outer circumferential formation is formed by plastic working, a higher shape accuracy of the ball circulating passage 11 can be secured.

The teeth train 15 for a gear, consisting of a plurality of circumferentially arranged teeth is provided on the outer circumferential surface of the flange 13 projecting from the outer circumferential surface of the blank 21, e.g. by plastic working such as cold forging, and the encoder 17 is provided directly on the outer circumferential surface of the nut 5, e.g. by plastic working such as cold forging. It is noted that the plastic working is preferable for these formations, but they may be formed by cutting.

Then, a screw groove 5a is formed on the inner circumferential surface of the blank 21 by cutting (screw groove forming process). Finally, the nut 5 is manufactured by applying heat treatment, such as hardening and tempering, thereto under a desired condition. An example of hear treatment includes carburizing, carbonitriding, induction heat treatment, etc.

The ball screw 1 of the present embodiment is manufactured by combining the nut 5 thus manufactured in this way with the screw shaft 3 and the balls 9 manufactured in the traditional method. In the present embodiment, since all the aforementioned roughly forming process, the ball circulating passage forming process, and the outer circumferential formation forming process are performed by plastic working, the manufacturing method of the ball screw 1 achieves manufacturing of the high precision of the ball screw 1 at a low cost, in addition to a high material yield. Further, since manufacturing is done by plastic working, a metal flow (fiber flow) of the steel material 20 is hardly cut and subject to work hardening, whereby a high strength nut 5 may be manufactured.

The kind of the plastic working is not specifically limited to a particular one, but forging is preferable, and cold forging is more preferable. Instead, adopting hot forging is also possible, but since the cold forging provides highly accurate finishing as compared with the hot forging, it may provide the nut 5 with satisfactory high precision, without applying a post process. As a result, the ball screw 1 can be manufactured at a low cost.

It is preferable to adopt the plastic working as the cold forging in all the manufacturing processes, out of the roughly forming process, the ball circulating passage forming process, and the outer circumferential formation forming process, but it may substitute the plastic working for the cold forging in either one or in two processes. In this occasion, as a working method other than the plastic working such as the cold forging, it is also possible to use cutting, such as turning working and grinding, electrical discharge working or combination of them, or a combination of them and shot blasting.

Additionally, in the ball circulating passage forming process, a working process may be divided into two or more processes as with the rough processing and finishing. In that case, for example, a rough shape may previously be formed on a lathe as rough processing, and then perform finishing working by grinding, polishing, or banish working.

Figure 7A:
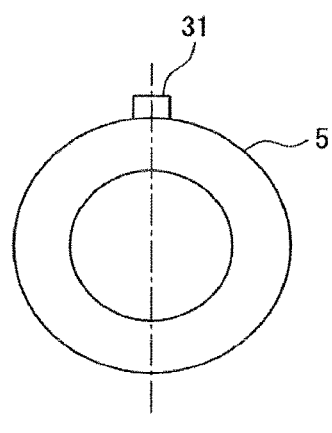
FIG. 7A is a front view.
Figure 7B:
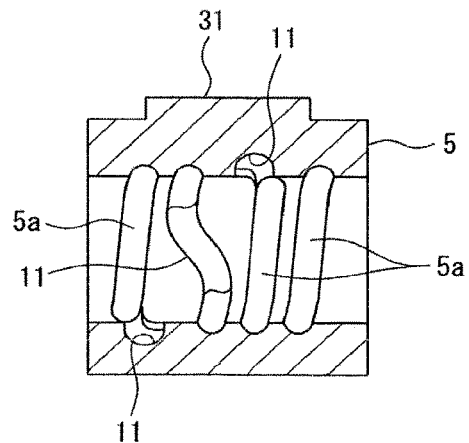
FIG. 7B is a longitudinal sectional view of only a nut of a second example of a second embodiment of the ball screw of the present invention.

An explanation will next be made to a second example of the ball screw of the second embodiment by referring to FIG. 7. FIG. 7 is a view showing only the nut of the ball screw manufactured by the same manufacturing process as the first example of the second embodiment shown in FIGS. 4 to 6, in which FIG. 7A is a front view, and FIG. 7B is a transversal longitudinal cross-sectional view. The screw shaft and the ball of the ball screw of the present embodiment are the same as those of the first example of the second embodiment shown in FIG. 4. Further, the circulating passage 11 and the screw groove 5a formed in the nut 5 are functionally equal thereto, though their shapes are slightly different, and so its detailed description is omitted for brevity's sake.

In the present embodiment, a key 31 is integrally provided on the outer circumferential surface of the nut 5 e.g. by plastic working in the outer circumferential formation forming process shown in FIG. 6. The key 31 plays a role of connecting another member (not shown) to the nut 5 by engaging into a key seat of another part. The key 31 may be manufactured by cutting or by grinding. Alternatively, a key seat may be formed in place of the key 31.

Figure 8A:
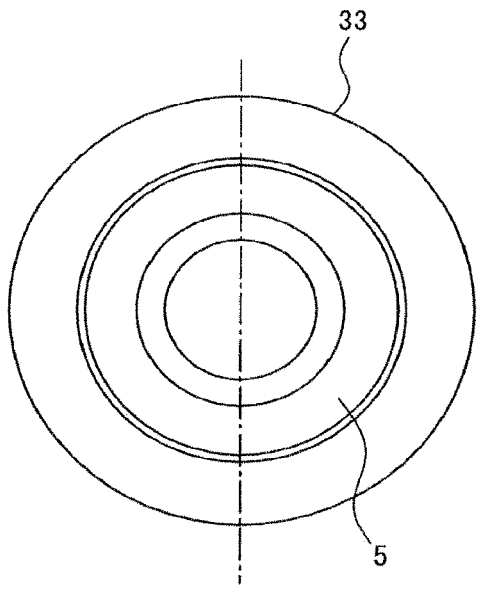
FIG. 8A is a front view.
Figure 8B:
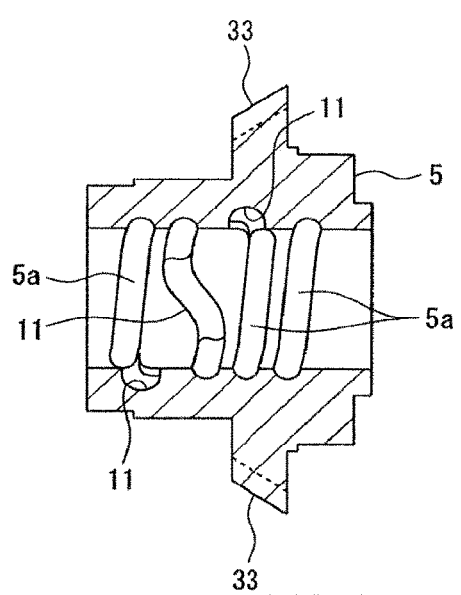
FIG. 8B is a longitudinal sectional view of only a nut of a third example of the second embodiment of the ball screw of the present invention.

An explanation will next be made to a third example of the ball screw of the second embodiment by referring to FIG. 8. FIG. 8 is a view showing only the nut out of the ball screw manufactured by the same manufacturing process as that of the first example of the second embodiment shown in FIGS. 4 to 6, in which FIG. 8A is a front view, and FIG. 8B is a transversal longitudinal sectional view. The screw shaft and the ball of the ball screw of the present embodiment are the same as those of the first example of the second embodiment shown in FIG. 4. Further, the circulating passage 11 and the screw groove 5a formed in the nut 5 are functionally equal thereto, though their shapes are slightly different, and so its detailed description is omitted for brevity's sake.

In the present embodiment, a bevel gear 33 is integrally provided on the outer circumferential surface of the nut 5 e.g. by plastic working in the outer circumferential forming process shown in FIG. 6. The bevel gear 33 may play a part in power transmission in a direction perpendicular to the axis with a bevel gear to be meshed therewith. The bevel gear 33 may be provided by cutting and grinding.

Figure 9A:
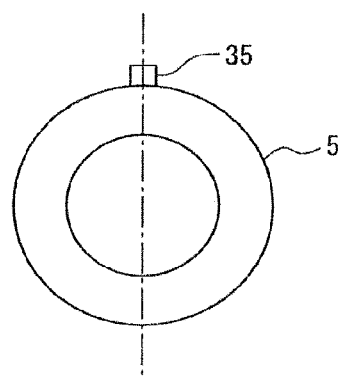
FIG. 9A is a front view.
Figure 9B:
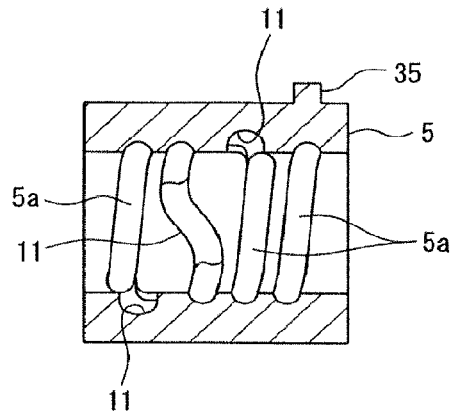
FIG. 9B is a longitudinal sectional view of only a nut of a fourth example of the second embodiment of the ball of the present invention.

An explanation will next be made to a fourth example of the ball screw of the second embodiment by referring to FIG. 9. FIG. 9 is a view showing only the nut in the ball screw manufactured by the same manufacturing process as that of the first example of the second embodiment shown in FIGS. 4 to 6, in which FIG. 9A is a front view, and FIG. 9B is a transversal longitudinal sectional view. The screw shaft and the balls of the ball screw according to the present embodiment are same with those of the first example in the second embodiment illustrated in FIG. 4. Further, the circulating passage 11 and the screw groove 5a formed in the nut 5 as a function of the ball screw are functionally equal thereto, though their shapes are slightly different, and so its detailed description is omitted for brevity's sake.

In the present embodiment, a cubic rotation stopper 35 is integrally provided on the outer circumferential surface of the nut 5 in the outer circumferential formation forming process shown in FIG. 6. The rotation stopper 35 is abut by another member (not shown) to thereby restrict rotation of the nut 5, thus accomplishing a translatory movement in an axial direction of the screw shaft, for example, when the nut 5 and the screw shaft are relatively rotated. Suppose that the rotation stopper 35 is arranged on the outside in a radial direction of the ball circulating passage 11. When a concaved groove for the ball circulating passage 11 is formed with the punch as described above, a concave is previously formed at a dice side. This automatically provides the rotation stopper 35 using a material to expand to the outside in a radial direction of the nut 5.

Figure 10A:
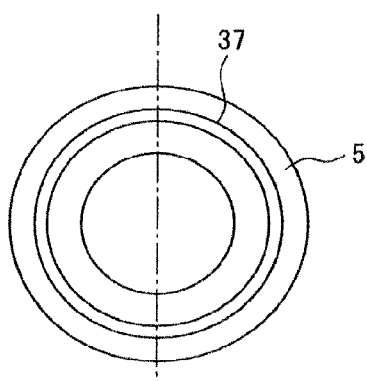
FIG. 10A is a front view.
Figure 10B:
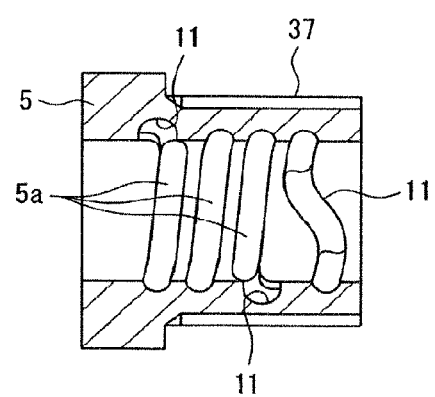
FIG. 10B is a longitudinal sectional view of only a nut of a fifth example of the second embodiment of the ball screw of the present invention.

An explanation will next be made to a fifth example of the ball screw of the second embodiment by referring to FIG. 10. FIG. 10 is a view showing only the nut out of the ball screw manufactured by the same manufacturing process as that of the first example of the second embodiment shown in FIGS. 4 to 6, in which FIG. 10A is a front view, and FIG. 10B is a transversal longitudinal sectional view. The screw shaft and the balls of the ball screw according to the present embodiment are same with those of the first example in the second embodiment illustrated in FIG. 4. Further, the circulating passage 11 and the screw groove 5a formed in the nut 5 are functionally equal thereto, though their shapes are slightly different, and so its detailed description is omitted for brevity's sake.

In the present embodiment, a screw (male screw) 37 is integrally provided on the outer circumferential surface of the nut 5 in the outer circumferential formation forming process shown in FIG. 6. The male screw 37 is screwed into a screw (e.g. female screw) of another member (not shown) to thereby accomplishing a screw motion. Instead, the screw 37 may be formed by cutting.

Figure 11A:
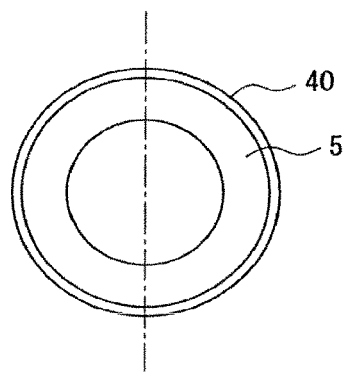
FIG. 11A is a front view.
Figure 11B:
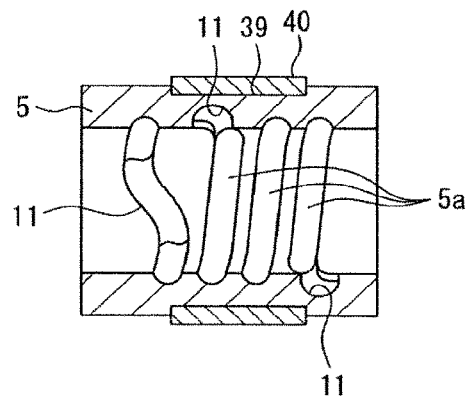
FIG. 11B is a longitudinal sectional view of only a nut of a sixth example of the second embodiment of the ball screw of the present invention.

An explanation will then be made to a six example of the ball screw of the second embodiment by referring to FIG. 11. FIG. 11 is a view showing only the nut out of the ball screw manufactured by the same manufacturing process as that of the first example of the second embodiment shown in FIGS. 4 to 6, in which FIG. 11A is a front view, and FIG. 11B is a transversal longitudinal sectional view. The screw shaft and the balls of the ball screw according to the present embodiment are same with those of the first example in the second embodiment illustrated in FIG. 4. Further, the circulating passage 11 and the screw groove 5a formed in the nut 5 are functionally equal thereto, though their shapes are slightly different, and so its detailed description is omitted for brevity's sake.

In the present embodiment, in the outer circumferential formation forming process shown in FIG. 6, a circumferential groove 39 of the nut 5 is integrally formed on the outer circumferential surface of the nut 5 e.g. by plastic working, and a wear ring 40 is attached to the circumferential groove 39. As is well known, because the wear ring 40 is provided for acting as a bearing with another member (not shown), the wear ring 40 allows supporting between the nut 5 and another member when the nut 5 is housed inside of another member. The circumferential groove 39 may be formed by cutting and grinding.

Figure 12A:
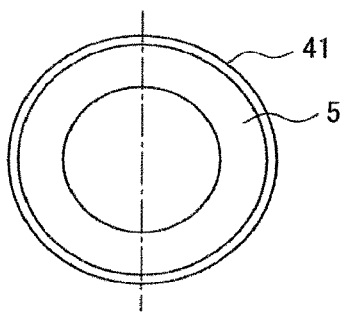
FIG. 12A is a front view.
Figure 12B:
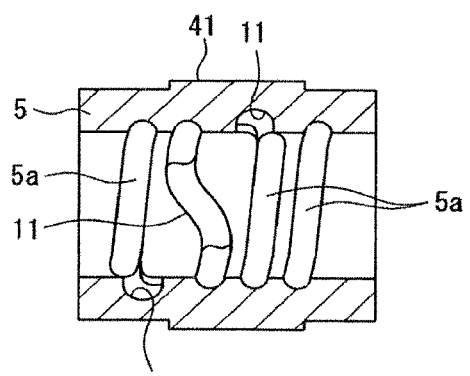
FIG. 12B is a longitudinal sectional view of only a nut of a seventh example of the second embodiment of the ball screw of the present invention.

An explanation will next be made to a seventh example of the ball screw of the second embodiment by referring to FIG. 12. FIG. 12 is a view showing only the nut out of the ball screw manufactured by the same manufacturing process as that of the first example of the second embodiment shown in FIGS. 4 to 6, in which FIG. 12A is a front view, and FIG. 11B is a transversal longitudinal sectional view. The screw shaft and the balls of the ball screw according to the present embodiment are same with those of the first example in the second embodiment illustrated in FIG. 4. Further, the circulating passage 11 and the screw groove 5a formed in the nut 5 are functionally equal, though their shapes are slightly different, and so its detailed description is omitted for brevity's sake.

In the present embodiment, a motor rotor 41 is integrally provided e.g. by plastic working in the outer circumferential formation forming process shown in FIG. 6. As the motor is configured by housing the motor rotor 41 within the motor stator (not shown), simply and directly a turning force to the nut 5 is obtainable. Alternately, the motor rotor 41 may be manufactured by cutting and grinding.

Figure 13A:
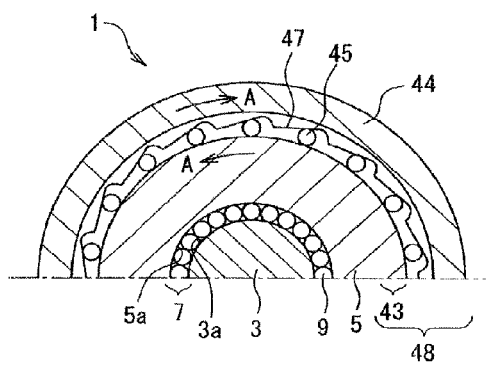
FIG. 13A is a transverse longitudinal sectional view.
Figure 13B:
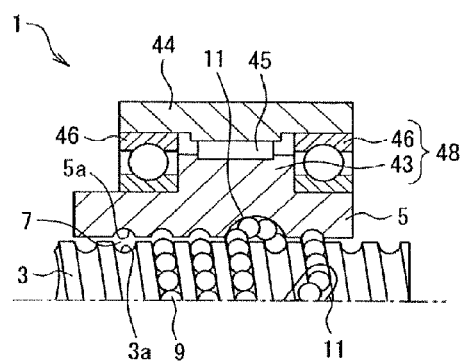
FIG. 13B is an orthogonal longitudinal sectional view of only a nut of an eighth example of the second embodiment of the ball screw of the present invention.

An explanation will then be made to an eighth example of the ball screw of the ball screw of the second embodiment by referring to FIG. 13. FIG. 13 is a view showing only the nut out of the ball screw manufactured by the same manufacturing process as that of the first example of the second embodiment shown in FIGS. 4 to 6, in which FIG. 13A is a front view, and FIG. 13B is a vertical longitudinal sectional view perpendicular to the axial line (hereinafter, referred to as a axial line-perpendicular vertical longitudinal sectional view). The screw shaft 3 and the balls 9 of the ball screw 1 of the present embodiment are the same as those of the second embodiment shown in FIG. 1. Further, the circulating passage 11 and the screw groove 5a formed in the nut 5 are functionally equal thereto, though their shapes are slightly different, and so its detailed description is omitted for brevity's sake.

In the present embodiment, an inner ring 43 of a one-way clutch 48 is integrally provided on the outer circumferential surface of the nut 5 in the outer circumferential formation forming process shown in FIG. 6. The inner ring 43 per se of the one-way clutch 48 of the present embodiment is formed into a cylindrical body. The one-way clutch 48 includes an outer ring 44 to be fitted onto the outside in a radial direction of the inner ring 43, and a roller 45, as plural rolling elements, to be loaded between the inner ring 43 and the outer ring 44, as described in Patent Document JP 4,214,371 B proposed by the applicant of the present invention. In the present embodiment, a rolling bearing 46 is interposed at the both sides in an axial direction of the inner ring 43 on the outer circumferential surface of the nut 5 to rotatably support the inner ring 43 and the outer ring 44. In the present embodiment, a cam face 47 is formed on an inner circumferential surface of the outer ring 44. When the inner ring 43 and the outer ring 44 relatively rotate in a direction indicated by an arrow A shown in FIG. 13A, the roller 45 is bite into the cam face 47 and the relative rotation of the both is restricted by a wedge effect.

On the other hand, when the inner ring 43 and the outer ring 44 relatively rotate in a reverse direction from the arrow A, the wedge effect caused between the roller 45 and the cam face 47 is released, and they are permitted to freely and relatively rotate. Accordingly, the one-way clutch 48 only restricts the relative rotation in one direction of the nut 5 and the outer ring 44, or another member (not shown) to be installed in the outer ring 44. Instead, the inner ring 43 may be provided by cutting and grinding.

Figure 14A:
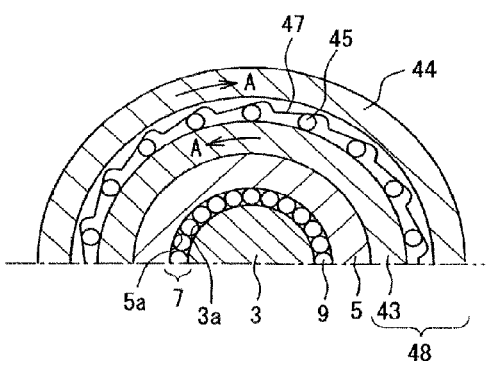
FIG. 14A a transverse longitudinal sectional view.
Figure 14B:
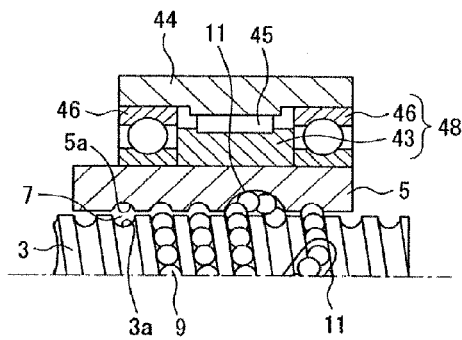
FIG. 14B is an orthogonal longitudinal sectional view of a modification of the ball screw shown in FIGS. 13A and 13B.

FIG. 14 is a modification of the ball screw 1 shown in FIG. 13, in which the inner ring 43 of the one-way clutch 48 is a separate body different from the nut 5. Even in this situation, because the nut 5 of the present embodiment is devoid of a projection on the outer circumferential surface, the cylindrical inner ring 43 may be fitted, as it is, onto the outer circumferential surface of the nut 5. For example, provided that the inner ring 43 is, press fitted to the outer circumferential surface of the nut 5, the both may successfully be integrated. In addition, a deformation of the inner ring 43 due to fitting can be suppressed.

Third Embodiment

For the ball screw, a circulation system using the ball circulating passage includes a variety of systems, such as a tube system and a deflector system. For example, in case of the tube system, a return tube to communicate a start point with an end point of the ball rolling passage is fixed to the outer circumferential surface of the nut. Meanwhile, in case of the deflector system, a deflector in which a groove is formed to communicate a start point with an end point of the ball rolling passage is fitted into a deflector hole piercing through the inner circumferential surface and the outer circumferential surface of the nut. Moreover, a circulating system is known such that a concaved groove is formed by concaving a groove on a part of the inner circumferential surface of the nut to adopt the concaved groove as the ball rolling passage.

When manufacturing such a ball screw, it has been worked by cold forging a cylindrical steal material to produce a substantially cylindrical (having a geometry virtually identical with the nut) blank; and the nut is manufactured by applying cutting to the blank. More preciously, the cutting working has been performed for formation of the through hole or the deflector hole through which the return tube pierces, formation of the concaved groove, and formation of the outer circumferential formation, such as the teeth train for a gear to the outer circumferential surface of the nut.

In Patent Document 2, there is proposed a technology of manufacturing a nut having a desirable geometry using a sintered alloy.

However, the manufacturing of the nut by cutting inherently entails a problem of undergoing a poor material yield and a high cost. What is more, since the sintered alloy has a low density and contains voids, the sintered alloy intrinsically involves a problem that it is difficult to have the satisfactory strength as a nut.

Thereupon, an object of the third embodiment is to solve the above-identified problems of the prior art, and provide a manufacturing method of a ball screw with a high strength at a low cost, in addition to a high material yield.

To solve the above problems, the third embodiment has the following structure. Namely, the manufacturing method of the ball screw of the third embodiment comprises: a screw shaft having on its outer circumferential surface a spiral groove; a nut having on its inner circumferential surface a screw groove facing the screw groove of the screw shaft; a plurality of balls rollably loaded in a spiral ball rolling passage formed by the both ball grooves; a ball circulating passage to return the balls from an end point to a start point of the ball rolling passage for circulating the balls; and an outer circumferential formation integrally provided on the outer circumferential surface of the nut, wherein the method involves a roughly forming step of producing a roughly formed nut having a shape virtually identical with the nut by plastic working from a cylindrical metal material; a ball circulating passage forming step of forming a concaved groove constituting the ball circulating passage by concaving a groove on a part of a cylindrical inner circumferential surface of the roughly formed nut.

In the manufacturing method of the ball screw of the third embodiment, it is preferable for the plastic working, used in at least one of process, out of the roughly forming step, the ball circulating passage formation step, and the outer circumferential formation forming step to be implemented by cold forging. Further, the outer circumferential formation may be at least one a flange, a teeth train for a gear, a key seat, a bearing raceway groove, and another shape of circumferential surface.

The manufacturing method of the ball screw of the third embodiment allows manufacturing of the ball screw with a high strength at a low cost, in addition to a high material yield.

An explanation will then be made in detail to the ball screw of the third embodiment by referring to the drawings. FIG. 1 is a cross-sectional view (a cross-sectional view taken with a plane in an axial direction). As shown I FIG. 1, the ball screw 1 includes: a screw shaft 3 having on its outer circumferential surface a spiral screw groove 3a; a nut 5 having on its inner circumferential surface a spiral screw groove 5a facing the screw groove 3a of the screw shaft 3; a plurality of balls 9 rollably loaded in a spiral ball rolling passage 7 formed by the both screw grooves 3a, 5a; and a ball circulating passage 11 to return the balls 9 from an end point to a start point of the ball rolling passage 7 for circulating the balls.

Namely, the balls 9 rotate around the screw shaft 3 while travelling through the ball rolling passage 7, reach the end point of the ball rolling passage 7 where the balls 9 are scooped up from one end of the ball circulating passage 11, and returned to the start point of the ball rolling passage 7 from the other end of the ball circulating passage 11 through the ball circulating passage 11.

It is noted that materials for the screw shaft 3, the nut 5, and the balls 9 are not specifically limited to particular ones, and general materials may be available. For example, metal such as steel, etc., and ceramic may be given as a candidate.

Further, a cross-sectional shape of the screw grooves 3a and 5a may be an arc and a gothic arc.

Such a ball screw 1 is configured such that when the nut 5 screwed via the balls 9 with the screw shaft 3 and the screw shaft 3 are relatively rotated, they relatively move in an axial direction through the rolling of the balls 9. An endless ball passage is formed of the ball rolling passage 7 and the ball circulating passage 11. As the balls 9 rolling through the ball rolling passage 7 endlessly circulate through the endless ball passage, the screw shaft 3 and the nut 5 are allowed to relatively move continuously.

Here, an explanation will be made in detail to the ball circulating passage 11. The circulating passage 11 is integrally formed on the inner circumferential surface of the nut 5. More particularly, a concaved groove formed by concaving a groove on a part of the inner circumferential surface of the nut 5 by plastic working is taken as the ball circulating passage 11. In this connection, a cross-sectional shape of the ball circulating passage 11 may be an arc or the previously described gothic arc. Since the ball screw 1 of the present embodiment adopts the ball circulating system using such a ball circulating passage 11, the embodiment eliminates the need for providing another member (the return tube and the deflector) on the nut 5 constituting the ball circulating passage. Also, the embodiment eliminates the necessity for providing holes (the through hole and the deflector hole) to mount another member constituting the ball circulating passage.

Where the ball circulating system is the tube system and the deflector system, the member for constituting the ball circulating passage and the nut are separate bodies. In case of the tube system, the return tube is provided on the outer circumferential surface of the nut, whereas in case of the deflector system, the deflector is fitted into the deflector hole. For that reason, it could not provide the outer circumferential formation such as the flange on a portion where the return tube and the deflector are provided, out of the outer circumferential surfaces of the nut, resulting in a restriction on freedom of design of the outer circumferential surface of the nut.

In contrast, the ball screw 1 of the present embodiment, since the ball circulating passage 11 is provided on the inner circumferential surface of the nut 5, the embodiment eliminates the need for providing any member on the outer circumferential surface. Additionally, as the embodiment eliminates the necessity for forming any hole such as the aforesaid through hole, the deflector hole, etc., the nut 5 is not subject to a restriction of a position where the ball circulating passage 11 is provided and the number of cycle. This may give a high degree of freedom to design the outer circumferential surface all over the outer circumferential surface of the nut 5. Accordingly, the embodiment enables integrally forming the outer circumferential formation on the outer circumferential surface of the nut 5, even at a portion facing the ball circulating passage 11 and the screw groove 5a on the outer circumferential surfaces of the nut 5. The ball screw 1 of the present embodiment is provided with the flange 13 as outer circumferential formation. Further, members such as the return tube, the deflector, etc., are not provided, thereby making it free from care of these members from falling out, which offers the high reliable ball screw 1.

The kind of the outer circumferential formation is not specifically limited to a particular one, rather a teeth train for a gear, a key seat, a baring raceway groove, and another shape of outer circumferential surface may be used, apart from the flange. For example, provided that the teeth train for a gear that consists of a plurality of teeth arranged in a circumferential direction is provided on the outer circumferential surface of the nut 5, it enables the nut 5 to function as a gear. Moreover, given that the key seat is formed on the outer circumferential surface of the nut 5, the nut 5 can be connected with another member by engaging a key provided in another member into the key seat. Further, provided that a bearing raceway groove is formed on the outer circumferential surface of the nut 5, it enables the nut 5 to function as an inner ring of the rolling bearing. Furthermore, whereas the outer circumferential surface of the nut 5 typically has a cross section in circle, not limited thereto, another outer shape of circumferential surface, such as a polygonal cross section and an elliptical cross section may also be permitted. Incidentally, one of these outer circumferential formations may be provided on the outer circumferential surface of the nut 5, or two or more may be provided. For example, as with the ball screw 1 of the present embodiment, the flange 13 may be provided on the outer circumferential surface of the nut 5, and the teeth train 15 for a gear may be provided on the outer circumferential surface of the flange 13.

While an application of the ball screw 1 of the present embodiment is not specifically limited to a particular one, it may preferably be applied to an electric actuator to be built in a car, a motorcycle, a positioning device, etc.

An explanation of one example will next be made to a manufacturing method of the ball screw 1 of the present embodiment by referring to FIG. 15. In the present embodiment, a cylindrical steel material 20 having the predetermined length (or mass) is worked by plastic working e.g. by cold forging, etc., to produce a blank 21 (roughly formed nut) having a shape virtually identical with the nut 5 (roughly forming process). At this time, the flange 13 is also provided on the outer circumferential surface of the blank 21 by plastic working Therefore, the roughly forming process also serves as an outer circumferential forming process.

Then, the concaved groove 22 constituting the ball circulating passage 11 communicating an end point with a start point of the ball rolling passage 7 is formed by concaving a groove on a part of a cylindrical inner circumferential surface of the blank 21 by plastic working such as cold forging, etc (ball circulating passage forming process). A specific example of a method of forming the concaved groove 22 includes one as follows. That is, a punch with a convex having a shape corresponding to the concaved groove 22 is inserted into the blank 21, the convex of the punch is brought into contact with the inner circumferential surface of the blank 21, and the punch is strongly pressed against the inner circumferential surface of the blank 21 to thereby form the concaved groove 22.

It is noted that in what order the outer circumferential formation and the ball circulating passage 11 should be provided is not specifically limited to a particular one, rather, it does not matter which of them is provided first. However, in the present embodiment, the ball circulating passage 11 is formed after the flange 13 that is the outer circumferential formation is provided by plastic working, whereby a higher shape accuracy of the ball circulating passage 11 is secured.

Next, the teeth train 15 for a gear including circumferentially arranged plural teeth are provided on the outer circumferential surface of the flange 13 projecting into the outer circumferential surface of the blank 21 by plastic working such as cold forging. Alternatively, it is preferable to form the teeth train 15 for a gear by plastic working, but it may be formed by cutting.

Then, a screw groove 5a is formed on the inner circumferential surface of the blank 21 by cutting (screw groove forming process). Finally, the nut 5 is manufactured by applying heat treatment, such as hardening and tempering, thereto under a desired condition. An example of hear treatment includes carburizing, carbonitriding, induction heat treatment, etc.

By combining the nut 5 thus manufactured by this way with the screw shaft 3 and the ball 9 manufactured by the traditional method, the ball screw 1 is manufactured.

Since all the aforesaid roughly forming process, the ball circulating passage forming process, and the outer circumferential formation forming process are performed by the plastic working, the manufacturing method of the ball screw 1 allows producing a ball screw with high precision at a low cost, in addition to a high material yield. Further, owing to the manufacturing by plastic working, a metal flow (fiber flow) having the steel material 20 is hardly cut and subject to work hardening, thereby providing the nut 5 with a high strength.

The kind of the plastic working is not specifically limited to a particular one, but forging is preferable, and cold forging is more preferable. Instead, adopting hot forging is also possible, but since the cold forging provides high accurate finishing as compared with the hot forging, it may provide the nut 5 with satisfactory high precision, without applying a post process. As a result, the ball screw 1 can be manufactured at a low cost.

It is preferable to adopt the plastic working as the cold forging in all the manufacturing processes, out of the roughly forming process, the ball circulating passage forming process, and the outer circumferential formation forming process, but it may substitute the plastic working for the cold forging in either one or in two processes.

Fourth Embodiment

The fourth embodiment is directed to a nut constituting a ball screw and a manufacturing method thereof.

The ball screw is a device including: a nut having on its inner circumferential surface a spiral groove; a screw shaft having on its outer circumferential surface a spiral groove; balls loaded between a raceway formed of the spiral groove of the nut and the spiral groove of the screw groove; and a ball returning passage to return the balls from an end point to a start point of the raceway, wherein the nut relatively moves relative to the screw shaft through the rolling of the balls within the raceway.

Such a ball screw is utilized not only for a positioning device of general industrial machinery but also for an electric actuator to be built in vehicles such as a car, a motorcycle, or a ship.

The ball returning passage of the ball screw includes a circulating tube system and a deflector system. In case of the deflector system, the deflector having a concave constituting the ball returning passage is fitted into a through hole of the nut. On the other hand, in Patent Document 3, there is disclosed that a concave (circulating groove) constituting the ball returning passage is directly formed on an inner circumferential surface of a nut blank by plastic working. As to how to form the ball returning passage will be described by referring to FIG. 28.

Firstly, a die equipped with a cylindrical working head 130 having S-shaped convexes 137, 138 corresponding to a shape of the circulating groove is prepared. Secondly, a nut blank 101 is placed on a stand 190, with its axial direction being oriented toward a horizontal direction; a distal end 130b and a base end 130a are fixed with the convexes 137 and 138 facing upward with the working head 130 placed inside of the nut blank 101. Then, pressing pressure is applied, in this state, to an upper member 120 of the die to go down it, and the convexes 137 and 138 are pressed against the inner circumferential surface 111 of the nut blank 101 to thereby cause the inner circumferential surface 111 of the nut blank 101 to be subject to plastic deformation.

In the manufacturing method of such a ball screw nut, where a projection (a flange, a rotational or an axial stopper, positioning at the time of machining and mounting, power transmission, projection for the purposes of torque transmission, etc) is provided on the outer circumferential surface of the nut, cutting is adopted.

Further, Patent Document 2 proposes to integrally form a nut having a concave (a return groove) constituting a ball returning passage, a spiral groove (inner screw groove), and a projection (a portion forming an outside surface) on an outer circumferential surface using sintered metal.

However, the manufacturing of the nut by cutting is problematic in that it inflicts a lower material yield and a high cost. There is also a problem that it is difficult for the nut to have the satisfactory strength due to containing of pores in the sintered alloy, in addition to its low density.

The object of the fourth embodiment is to solve the above-identified problems of the prior art, and provides a method of capable of manufacturing a ball screw nut with a high strength at a low cost, in addition to a high material yield.

To solve the above problems, the manufacturing method of a first ball screw nut of the fourth embodiment includes: a nut having a spiral screw groove on its inner circumferential surface and having a projection on its outer circumferential surface; a screw shaft having on its outer circumferential surface a spiral screw groove; and balls rollably loaded in a spiral ball rolling passage formed by the spiral screw groove of the nut and the spiral screw groove of the screw shaft; and a ball returning passage which is formed on the inner circumferential surface as a concave to return the balls from an end point to a start point of the ball rolling passage, wherein the ball screw nut where the nut relatively moves relative to the screw shaft through the rolling of the balls, and wherein formation of the concave on the inner circumferential surface of the nut and formation of the projection is simultaneously performed by cold forging.

The manufacturing method of a second ball screw nut of the fourth embodiment includes: a nut having on its inner circumferential surface a spiral groove and on its outer circumferential surface a projection; a screw shaft having on its outer circumferential surface a spiral groove; balls rollably loaded between a raceway formed by the spiral screw groove of the nut and the spiral screw groove of the screw shaft; and a ball returning passage which is formed as a concave on the inner circumferential surface of the nut to return the balls from an end point to a start point of the raceway, wherein the nut relatively moves relative to the screw shaft through the rolling of the balls, and wherein a concave is formed on the inner circumferential surface of the nut blank by pressing the inner circumferential surface of the nut blank with the convex, by press method (cold forging) using a die of the cam mechanism comprising a cam driver internally inserted into a cylindrical nut blank and moving in its axial direction; a cam slider which is disposed between the nut blank and the cam driver, and the convex corresponding to the concave is provided, the convex moving in a radial direction of the nut with the movement of the cam driver; and a restraining member for restraining both end faces in an axial direction and the outer circumferential surface of the nut blank, and on an inner circumferential surface of which a recess is formed to receive the outer circumferential surface, and wherein the projection is formed by projecting a periphery of the nut blank into a recess of the restraining member.

This method solves the following problems. In other words, in Patent Document 3, there is a problem that when the nut has a long axial dimension and a small inner diameter, damage may occur due to the insufficient strength of the working head of the die, as the working head of the die becomes elongate. Further, because a flow of materials with the formation of the concave cannot be controlled, the flow goes toward in an axial direction of the nut blank, leading to a deformation of the axial both end faces of the nut blank into a projection. Moreover, there is also a problem that as the axial end faces of the nut blank come to a reference plane for processing by spiral groove working that is the next process, the projection induces degradation in machining accuracy of the spiral groove as it stands.

According to this method, a movement in an axial direction of the cam driver changes its direction to an radial direction on a slope constituting the cam mechanism to transmit it to the cam slider, and the concave is formed on the inner circumferential surface of the nut blank by pressing and plastically deforming the inner circumferential surface of the nut blank with the convex provided in the cam slider. Even when manufacturing a nut having a long axial dimension and a small inner diameter, damage is hardly given to the die as compared with the method disclosed in Patent Document 3.

Since the axial both end faces of the nut blank and the outer circumferential surface are restrained by the restraining member, and the projection is provided by projecting a periphery of the nut blank into the recess of the restraining member, the both ends in an axial direction of the nut blank are hardly subject to deformation at the time of the formation of the concave. As the end faces in an axial direction of the nut blank come to the reference plane for processing by the spiral groove working that is the next process, the spiral groove working accuracy will be enhanced at the time of being used as it is.

Further, according to the method, since the projection is provided on the outer circumferential surface of the nut blank, concurrently with the formation of the concave by cold forging, the material will not be wasted as in the case where the projection is provided by cutting.

In the manufacturing method of the first or the second ball screw nut of the fourth embodiment, the projection, the concave or the tapered surface being formed on the inner circumferential surface of the projection is adopted to a reference plane or a holding part to proceed the working after the next process.

A ball screw nut manufactured by the first or the second method according to the fourth embodiment includes a ball screw nut where the projection is an axial force transmission part, a torque transmission part, a positioning part, or a mounting part.

According to the first method of the fourth embodiment, the embodiment can manufacture the ball screw nut with a high strength, at a reduced working cost and at a low cost, in addition to a high material yield.

According to the second method of the fourth embodiment, even when the nut having a long axial dimension and a small inner diameter is manufactured, as a method of directly forming by plastic working a concave constituting the ball returning passage on the inner circumferential surface of the nut blank, the concave can be formed without giving damage to the die, as well as suppressing the deformation of the both ends in an axial direction of the nut blank.

Also, as the projection is provided on the outer circumferential surface of the nut blank simultaneously with the formation of the groove, the material cost can be reduced as compared with the case where the projection is manufactured by cutting.

An explanation will next be made to the fourth embodiment in detail.

First Example

In the first example, a stopper 191 projecting to the outer circumferential surface of the nut blank 101 is provided at the outside in an radial direction of an S-shaped concave 115 by a method shown in FIG. 16, concurrently with the formation of the S-shaped concave (concave constituting the ball returning passage) 115 on the inner circumferential surface of the nut blank 101.

A die to be used in the first example, as shown in FIG. 16, the die includes a blank holder 102 having a concave 121 to hold the nut blank 101; a lid member 122 to restrain an upper end face of the nut blank 101; a cam slider 103 and a cam driver 104 to be disposed inside of the nut blank 101. On an inner circumferential surface of the concave 121 of the blank holder 102, the recess 121*a* having a shape corresponding to the stopper 191 is formed. The concave 121 of the blank holder 102 and the lid member 122 constitute the restraining member for restraining the both end faces in an axial direction and an outer circumferential surface of the nut blank 101.

The cam slider 103 is, as shown in FIGS. 17A and 17B, a substantially semi-cylindrical member having a plane 132 parallel to an outer circumferential surface 131 in an axial direction, wherein the diameter of a circle defining the outer circumferential surface 131 is smaller than the diameter of a circle 111*a* defining the inner circumferential surface 111 of the nut blank 101. On a plane 132 of the cam slider 103, a slope 133 extending in an axial direction is provided at a middle portion in a radial direction. The slope 133 corresponds to a plane connecting a base line 134*a* of the concave 134 at one end in an axial direction (upper end) and a line 132*d* forming a lower end of the plane 132. Moreover, an S-shaped concave 135 corresponding to an S-shaped concave 115 is provided on the outer circumferential surface 131 of the cam slider 103.

The cam driver 104 is, as shown in FIG. 17C, a long plate-shaped member, one side face 141 of which has a slope having the same slant as the slope 133 of the cam slider 103, and the other side 142 of which has a periphery along a circle 111*a* defining the inner circumferential surface 111 of the nut blank 101. The dimensions in an axial direction of the cam driver 104 are longer than that of the cam slider 103. Further, the width of the cam driver 104 is thinner than the width corresponding to an open width (dimensions between the both sides of the slope 133) of the concave 134 of the cam slider 103.

The slope 131 of the cam slider 103 and the slanted side face 141 of the cam driver 104 constitute the cam mechanism of the die.

Firstly, the nut blank 101 is disposed in the concave 121 of the blank holder 102 using this die, and the lid member 122 is placed on an upper end face of the nut blank 101 to restrain the both ends in an axial direction of the nut blank 101 and the outer circumferential surface of the nut blank 101. Secondly, the cam slider 103 is inserted into the inside of the nut blank 101, with the concave 134 side being set upward and the S-shaped convex 135 oriented toward the inner circumferential surface 111 of the nut blank 101. In this instance, the S-shaped convex 135 of the cam slider 103 is aligned with the recess 121a of the blank holder 102.

Then, the cam driver 104 is inserted between the cam slider 103 and the nut blank 101. On this occasion, a portion at the side face 141 of the cam driver 104 is fitted into the concave 134 of the cam slider 103 to bring the slope 133 of the cam slider 103 into contact with the slanted side face 141 of the cam driver 104. FIG. 16A shows this state.

After that, when pressing the cam driver 104 from above by applying pressing pressure, a force is transmitted from the slanted side face 141 of the cam driver 104 to the slope 133 of the cam slider 103. Accompanying thereto, a downward force of the cam driver 104 is converted into a force moving the cam slider 103 to the radial outside, and the S-shaped convex 135 provided in the cam slider 103 presses the inner circumferential surface 111 of the nut blank 101 to cause it to be subject to plastic deformation. Accompanying thereto, materials existing on the outer circumferential surface of the nut blank 101 are pushed into the recess 121a of the blank holder 102. FIG. 16B shows this state.

Figure 18:
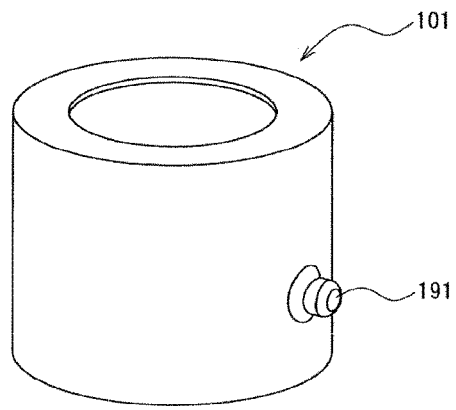
FIG. 18 is a perspective view showing a nut blank removed from a die in a state shown in FIG. 16B.

Thereby, the S-shaped concave 115 is formed in the inner circumferential surface 111 of the nut blank 101, a periphery of the nut blank 101 projects and the recess 121a is formed, which provides the stopper 191 on the outer circumferential surface of the nut blank 101. A state where the nut blank 101 is removed from the die is shown in FIG. 18.

Thus, according to the method of the first example, even when the nut having a long axial dimension and a small inner diameter is manufactured, the S-shaped concave 115 can be formed, without giving damage to the cam driver 104. Further, as the material of the nut blank 101 pressed to the outside in an radial direction by the S-shaped convex 135 goes toward the recess 121a, deformation hardly occurs on the both end faces in an axial direction of the nut blank 101. The end faces in an axial direction of the nut blank 101 may be adopted as a reference plane for processing in the spiral groove machining that is the next process. Therefore, even if the spiral groove is applied using as it is, good machining accuracy is guaranteed.

Further, as the stopper (projection) 191 is provided on the outer circumferential surface of the nut blank 101, simultaneously with the formation of the S-shaped concave 115, a low material cost may be achieved, as compared with the case where the stopper 191 is manufactured by cutting. Moreover, since the stopper 191 is provided when materials making the nut blank 101 flow in an radial direction, a metal flow (fiber flow) is hardly cut and subject to work hardening, the stopper 191 may have the strength high enough to resist an axial force and torque.

Second Example

Figure 19A:
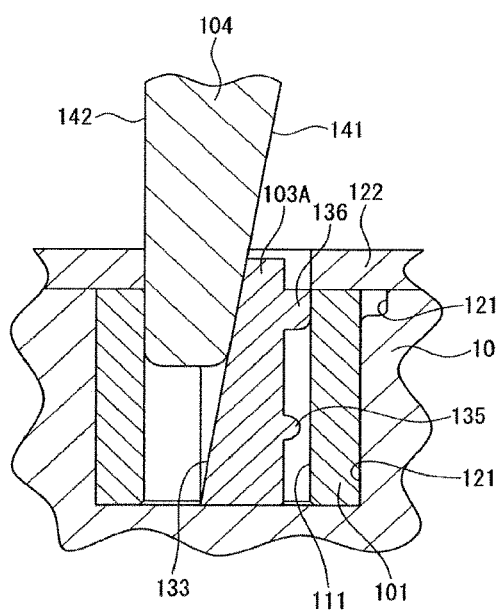
FIGS. 19A and 19B are views explaining the second example of the fourth embodiment.
Figure 19B:
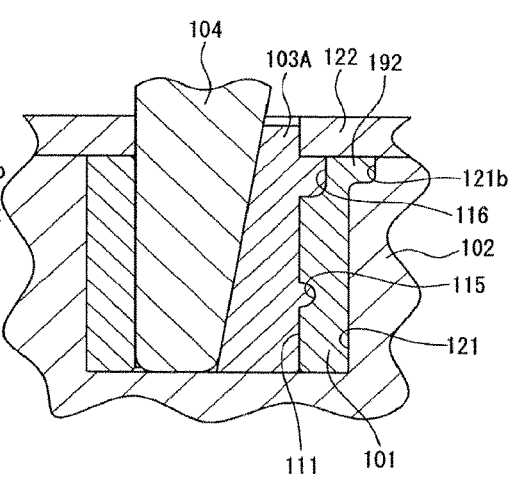

In the second example, a stopper 192 projecting into the outer circumferential surface of the nut blank 101 is formed at an one end in an axial direction, concurrently with the formation of the S-shaped concave (concave constituting the ball returning passage) 115 on the inner circumferential surface of the nut blank 101 by using a method shown in FIG. 19.

A die to be used in the second example includes: as shown in FIG. 19, the blank holder 102 having the concave 121 to hold the nut blank 101; the lid member 122 to restrict an upper end face of the nut blank 101; and the cam driver 103A and the cam driver 104 to be disposed inside of the nut blank 101. On an upper end of the inner circumferential surface of the concave 121 of the blank holder 102, the recess 121b having a shape corresponding to the stopper 192 is formed.

The concave 121 and the lid member 122 of the blank holder 102 constitute the restraining member for restraining the both end faces in an axial direction and the outer circumferential surface of the nut blank 101.

Figures 20A, 20B, 20C:
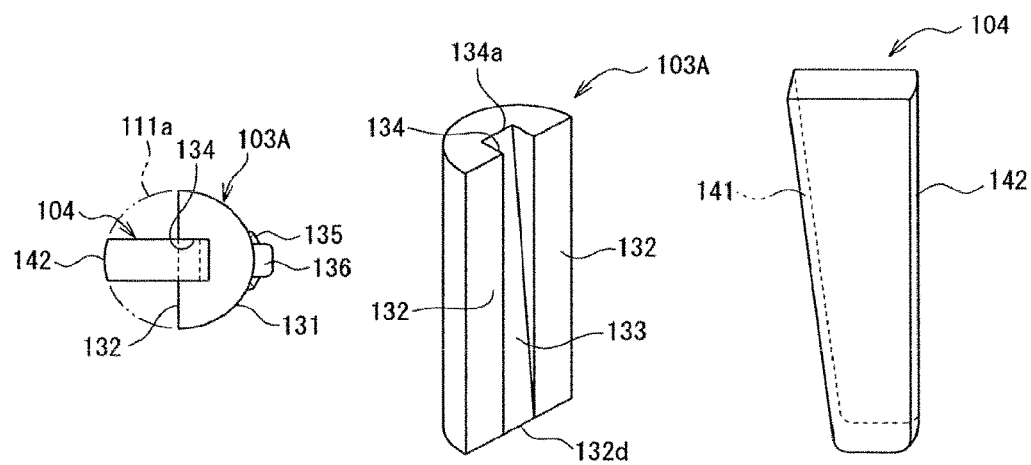
FIG. 20A is a plane view.
FIG. 20B is a perspective view.
FIG. 20C is a perspective view showing the cam driver, of a cam slider used in the second example of the fourth embodiment.

The cam slider 103A is, as shown in FIGS. 20A and 20B, a substantially semi-cylindrical member having a plane 132 parallel with the outer circumferential surface 131 in an axial direction, where the diameter of a circle defining the outer circumferential surface 131 is slightly smaller than that of a circle 111a defining the inner circumferential surface 111 of the nut blank 101. On the plane 132 of the cam slider 103A, the axially extending slope 133 is provided at a middle portion in an radial direction. The slope 133 corresponds to a plane connecting a base line 134a of the concave at axial one end (upper end) and a line 132d defining a lower end of the plane 132.

On the outer circumferential surface 131 of the cam slider 103A, the S-shaped convex 135 corresponding to the S-shaped concave 115 is provided. Further, on the outer circumferential surface 131 of the cam slider 103A, a convex 136 for forming the stopper 192 is provided at a position corresponding to the recess 121b.

The cam driver 104 is, as shown in FIG. 20C, a long plate-shaped member, one side face 141 of which has a slope having the same slant as the slope 133 of the cam slider 103A, and the other side 142 of which has a periphery along a circle 111a defining the inner circumferential surface 111 of the nut blank 101. The dimension in an axial direction of the cam driver 104 is longer than that of the cam slider 103A. Further, the width of the cam driver 104 is thinner than the width corresponding to an open width (dimensions between the both sides of the slope 133) of the concave 134 of the cam slider 103A.

The slope 131 of the cam slider 103A and the slanted side face 141 of the cal slider 103A constitute the cam mechanism of the die.

Firstly, the nut blank 101 is disposed in the concave 121 of the blank holder 102 using this die, and the lid member 122 is placed on an upper end face to restrain the both ends in an axial direction of the nut blank 101 and the outer circumferential surface of the nut blank 101. Secondly, the cam slider 103A is inserted into the inside of the nut blank 101, with the concave 134 side being set upward and the S-shaped convex 135 and the convex 136 oriented toward the inner circumferential surface 111 of the nut blank 101. In this instance, the convex 136 of the cam slider 103 is aligned with the recess 121a of the blank holder 102.

Then, the cam driver 104 is inserted into between the cam slider 103A and the nut blank 101. On this occasion, a portion on the side face 141 side of the cam driver 104 is fitted into the concave 134 of the cam slider 103A to bring the slope 133 of the cam slider 103A into contact with the slanted side face 141 of the cam driver 104. FIG. 19A shows this state.

After that, when pressing the cam driver 104 from the top thereof by applying a pressing pressure, a force is transmitted from the slant side face 141 of the cam driver 104 to the slope 133 of the cam slider 103A. At the same time, a downward force of the cam driver 104 is converted into a force moving the cam slider 103A to the outside in a radial direction, and the S-shaped convex 135 and the convex 136 provided in the cam slider 103A presses the inner circumferential surface 111 of the nut blank 101 to cause it to be subject to plastic deformation. Accompanying thereto, a portion, pressed by the S-shaped convex 135, in the material forming the nut blank 101 moves upward, a portion (materials existing on the outer circumferential surface of the nut blank 1) pressed by the convex 136 to the outside in an radial direction is pressed into the recess 121b of the blank holder 102. FIG. 20B shows this state.

Figure 21:
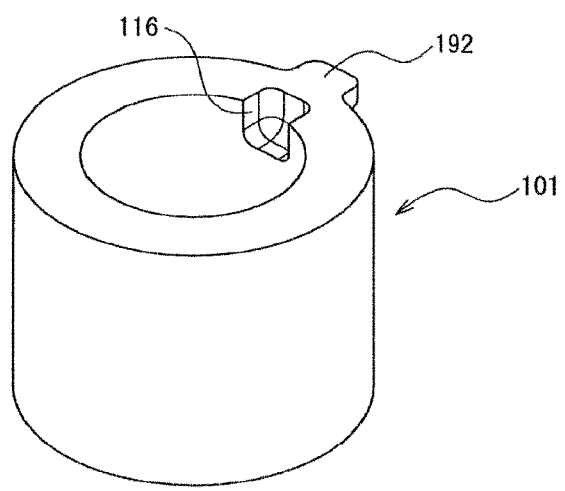
FIG. 21 is a perspective view showing a nut blank removed from a die in a state shown in FIG. 19B.

Thereby, the S-shaped concave 115 is formed on the inner circumferential surface 111 of the nut blank 101, a periphery of the nut blank 101 projects into the recess 121b, which provides the stopper 192 on the outer circumferential surface of the nut blank 101. Similarly, a concave 116 corresponding to the convex 136 is formed on the inner circumferential surface of the stopper 192. A state where the nut blank 101 is removed from the die is shown in FIG. 21.

Thus, according to the method of the second example, even when the nut having a long axial dimension and a small inner diameter is manufactured, the S-shaped concave 115 can be formed, without giving damage to the cam driver 104. Further, as the material making the nut blank 101 pressed by the S-shaped convex 135 and the convex 136 goes toward the recess 121b, deformation hardly occurs on the both end faces in an axial direction of the nut blank 101. The end faces in an axial direction of the nut blank 101 may be adopted as a reference plane for processing in a spiral groove working that is the next process. Therefore, even if the grooving is applied using as it is, good working accuracy is guaranteed.

Further, as the stopper (projection) 192 is provided on the outer circumferential surface of the nut blank 101, simultaneously with the formation of the S-shaped concave 115, low material cost can be achieved, as compared with the case where the stopper 192 is manufactured by cutting. Moreover, since the stopper 192 is provided when materials of the nut blank 101 flow in a radial direction, a metal flow (fiber flow) is hardly cut and subject to work hardening, the stopper 192 may have the strength high enough to resist an axial force and torque.

Third Example

In the third example, in a method illustrated in FIG. 22, a pair of the stoppers 193 projected into the outer circumferential surface of the nut blank 101 is provided at an end in an axial direction, concurrently with the formation of the S-shaped concaves (concave constituting the returning passage) 115a and 115b in two points on the outer circumferential surface of the nut blank 101.

A die to be used in the third example includes: as shown in FIG. 22, the blank holder 102 having the concave 121 to hold the nut blank 101; the lid member 122 to restrain an upper end face of the nut blank 101; a pair of the cam slider 105A and 105B to be disposed in the inside of the nut blank 101; and the cam driver 106 to disposed between the both cam sliders 105A and 105B. On an upper end of the inner circumferential surface of the concave 121 of the blank holder 102, there are provided a pair of the recesses 121c each having a shape corresponding to the pair of the stoppers 193. The concave 121 of the blank holder 102 and the lid member 122 constitutes the restraining member for restraining the both end faces in an axial direction and the outer circumferential surface of the nut blank 101.

Each of the cam sliders 105A and 105B is, as shown in FIGS. 23A and 23B, a substantially semi-cylindrical member having an outer circumferential surface 151 of which diameter is slightly smaller than an inner diameter of the nut blank 101, and a line 152 defining an opposite face of the outer circumferential surface 151 is smaller than an inner diameter of the nut blank 101. Thus, as shown in FIG. 23A, when the outer circumferential surfaces 151 of the cam sliders 105A and 105B are disposed to match a circle 111a defining the inner circumferential surface 111 of the nut blank 101, a gap 152a is generated between the lines 152 of the both cam sliders 105A and 105B.

On the opposite face 152b (face along a line 152) of the both cam sliders 105A and 105B, an axially extending slope 153 is formed at a middle portion of the line 152. The slope 153 corresponds to a plane connecting a base line 154a of the concave 154 at one end (upper end) in an axial direction and a line 152 of a lower end. Further, the S-shaped convexes 155a and 155b corresponding to the S-shaped concaves 115a and 115b are respectively provided on the outer circumferential surface 151 of the each cam slider 105A and 105B. Furthermore, on the outer circumferential surface 151 of each of the cam sliders 105A and 105B, a convex 156 for providing the stopper 193 is formed at a position corresponding to the each recess 121c.

The cam driver 106 is, as shown in FIG. 23C, a long quadrangular prism comprising: a slope 161 having slopes 161a and 161b on both sides thereof; and a base end 162 of which both end faces have a parallel surface to each other. The slopes 161a and 161b of the cam driver 106 are identical with the slopes 153 of the cam sliders 105A and 105B. The widths of the slopes 161a and 161b of the cam drives 106 are slightly smaller than those of the slopes 153 of the cam sliders 105A and 105B. Accordingly, the slope 161 of the cam driver 106 may be received in the concaves 154 of the cam sliders 105A and 105B.

The slopes 153 of the cam slider 105A and 105B and the slopes 161a and 161b of the cam driver 106 constitute the cam mechanism of the die.

Firstly, the nut blank 101 is disposed in the concave 121 of the blank holder 102, and the lid member 122 is placed on an upper end face of the nut blank 101 to restrain the both end faces in an axial direction and an outer circumferential surface of the nut blank 101. Secondly, a pair of the cam sliders 105A and 105B are inserted into the inside of the nut blank 101 so that the both slopes 153 face each other. On this occasion, the convexes 156 of the cam sliders 105A and 105B are aligned with the respective recesses 121c of the blank holder 102.

Next, the cam driver 106 is inserted between the both cam sliders 105A and 105B to bring the slopes 153 of the both cam sliders 105A and 105B into contact with the slopes 161a and 161b of the cam driver 106. FIG. 22A shows this state.

Then, when the cam driver 106 is pressed from the top thereof by applying a pressing pressure, a force is transmitted from the slopes 161a and 16ab of the cam driver 106 to the slopes 153 of the both cam sliders 105A and 105B. Accompanying thereto, a downward force of the cam driver 106 is converted into a force moving each of the cam sliders 105A and 105B to the outside in a radial direction, and the S-shaped convexes 155a and 155b provided in the respective cam slider 105A and 105B and the convex 156 press the inner circumferential surface 111 of the nut blank 101 to cause it to be subject to plastic deformation.

Accompanying thereto, a portion, pressed by the S-shaped convexes 155a and 155b, of the material forming the nut blank 101 moves upward, and a portion (material existing on the external circumference of the nut blank 101) pressed by the convex 156 to the outside in a radial direction is pushed into the recess 121c of the blank holder 102. FIG. 22B shows this state.

Thereby, the S-shaped concave 115a and 115b are provided at two points of the inner circumferential surface 111 of the nut blank 101, and an external circumference of the nut blank 101 projects into the recess 121c, and the stopper 193 is provided on the outer circumferential surface of the nut blank 101. Further, on the inside of the stopper 193, a concave 117 corresponding to the convex 156 is formed. A state where the nut blank 101 is removed from the die is shown in FIG. 24.

Thus, according to the method of the third example, even when the nut having a long axial dimension and a small inner diameter is manufactured, the S-shaped concave 115 can be formed, without giving damage to the cam driver 106. Further, as the material forming the nut blank 101 pressed by the S-shaped convex 155 and the convex 156 goes toward the recess 121c, deformation hardly occurs on the both end faces in an axial direction of the nut blank 101. The end faces in an axial direction of the nut blank 101 may be adopted as a reference plane for processing in the spiral groove working that is the next process. Therefore, even if the grooving is applied as it is, good working accuracy is guaranteed. Additionally, the end faces in an axial direction of the nut blank 101 are subject to work hardening, and thus they are suited for a reference plane for processing.

Further, as the stopper (projection) 193 is provided on the outer circumferential surface of the nut blank 101, simultaneously with the formation of the S-shaped concave 115, a low material cost can be achieved, as compared with the case where the stopper 193 is manufactured by cutting. Moreover, since the stopper 193 is provided when materials forming the nut blank 101 flow in a radial direction, a metal flow (fiber flow) is hardly cut and subject to work hardening, the stopper 191 may have the strength high enough to resist an axial force and torque. The formation of a bolt insertion hole in the stopper 193 makes it available as a fitting flange for the nut.

Fourth Example

In the fourth example, in a method illustrated in FIG. 25, a flange 194 is provided on the outer circumferential surface at one end in an axial direction of the nut blank 101, and a tapered surface 118 is formed on an internal circumference thereof, concurrently with the formation of S-shaped concaves (concaves constituting a ball returning passage) 115a and 115b at two points on the inner circumferential surface of the nut blank 101.

A die includes: as shown in FIG. 25, the blank holder 102 having the concave 121 to hold the nut blank 101; the lid member 122 to restrain an upper end face of the nut blank 101; a pair of cam slider 107A, 107B to be disposed inside of the nut blank 101; and the cam driver 108 to be disposed between the both cam sliders 107A and 107B. On an upper end of the inner circumferential surface of the concave 121 of the blank holder 102, a circumferential groove (recess) 121d having a shape corresponding to the flange 194 is formed. The concave 121 of the blank holder 102 and the lid member 122 constitute the restraining member for restraining both end faces in the axial direction and the outer circumferential surface of the nut blank 101.

The cam sliders 107A and 107B have a shape where an end at which the convex 156 is provided is cut in an axial direction, including the convex 156, from the cam sliders 105A and 105B in the third example, and two S-shaped convexes 175a and 175b where a slope 153 of the cam sliders 105A and 105B made corresponding to the same slope 173 and to the S-shaped concaves 115a and 115b at two points.

The cam driver 108 has a ramp 181 having slopes 181a and 181b identical with the slope 173 of the cam sliders 107A and 107B, and a base end at which a tapered surface 182a corresponding to the tapered surface 118 is formed. The slope 173 of the cam sliders 107A and 107B and the slopes 181a and 181b of the cam driver 108 constitute the cam mechanism of the die.

Firstly, the nut blank 101 is disposed in the concave 121 of the blank holder 102 using this die, and the lid member 122 is placed on an upper end face of the nut blank 101 to restrain the both ends in an axial direction and the outer circumferential surface of the nut blank 101. Secondly, a pair of the cam slider 107A, 107B is inserted into the inside of the nut blank 101 so that the both slopes face each other.

Then, the cam driver 108 is inserted into between the concaves (identical with the concaves 154 of the cam sliders 105A and 105B) where the a slope 173 of the both cam sliders 107A and 107B is formed to bring the slope 173 of the both cam sliders 107A and 107B into contact with a slopes 181a and 181b of the cam driver 108. FIG. 25A shows this state.

After that, when pressing the cam driver 108 from above by applying pressing pressure, a force is transmitted from the slopes 181a and 181b of the cam driver 108 to the slope 173 of the both cam sliders 107A and 107B. Accompanying thereto, a downward force of the cam driver 108 is converted into a force moving the cam sliders 107A and 107B to the outside in a radial direction, and the S-shaped convexes 175a and 175b provided in the each cam slider 107A and 107B press the inner circumferential surface 111 of the nut blank 101 to cause it to be subject to plastic deformation. Further, the tapered surface 182a of the cam driver 108 presses and plastically deforms the upper portion of the inner circumferential surface 111 of the nut blank 101.

Accompanying thereto, a portion, pressed by the S-shaped convexes 175a and 175b, in a material forming the nut blank 101 moves upward, a portion (materials existing on the external circumference of the nut blank 101) pressed by the tapered surface 182a to the outside in a radial direction is pushed into a circumferential recess 121d of the blank holder 102. FIG. 25B shows this state.

Figure 26:
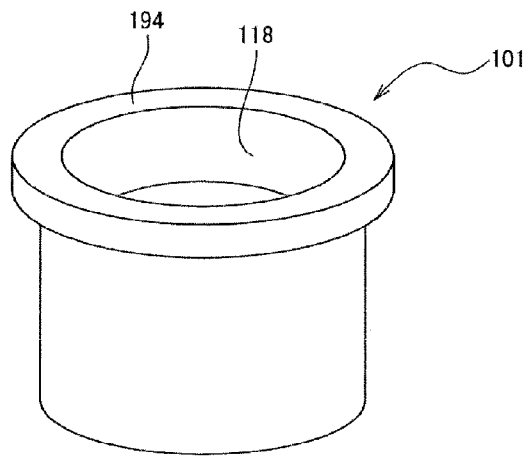
FIG. 26 is a perspective view showing a nut blank removed from a die in a state shown in FIG. 26B.

Thereby, the S-shaped concaves 115a and 115b are formed at two points of the inner circumferential surface 111 of the nut blank 101, the external circumference of the nut blank 101 projects into the circumferential recess 121d, which provides the flange 194 on the outer circumferential surface of the nut blank 101. A tapered surface 113 corresponding to the tapered surface 182a is formed inside of the flange 194. A state where the nut blank 101 is removed is shown in FIG. 26.

Thus, according to the method of the fourth example, even when the nut having a long axial dimension and small inner diameter is manufactured, the S-shaped concaves 115a and 115b can be formed, without giving damage to the cam driver 108. Further, because the material forming the nut blank 101 pressed by the S-shaped convexes 175a and 175b and the tapered surface 118 flows toward the circumferential recess 121d, deformation hardly occurs on the end faces in an axial direction of the nut blank 101. The end faces in an axial direction of the nut blank 101 may be adopted as a reference plane for processing in spiral groove working that is the next process. Besides, the end faces in an axial direction of the nut blank 101 are work hardened, and thus they are suited for a reference plane for processing.

Further, as the flange (projection) 194 is provided on the outer circumferential surface of the nut blank 101, simultaneously with the formation of the S-shaped concaves 115a and 115b, low material cost may be achieved, as compared with the case where the flange 194 is manufactured by cutting. Moreover, since the flange 194 is provided when materials making the nut blank 101 flow in an radial direction, a metal flow (fiber flow) is hardly cut and subject to work hardening, the flange 194 may have the strength high enough to resist an axial force and torque.

The flange 194 may be used as a flange for mounting parts such as a bearing on the outer circumferential surface of the nut. Likewise, the tapered surface 118 may be used as the center (surface for center alignment in grinding of cylinder). Further, by forming a bolt insertion hole in the flange 194, it may be used as a mounting flange for the nut. Moreover, gear cutting may be done on an external circumference of the flange 194 to manufacture a gear.

Fifth Example

Figure 27A:
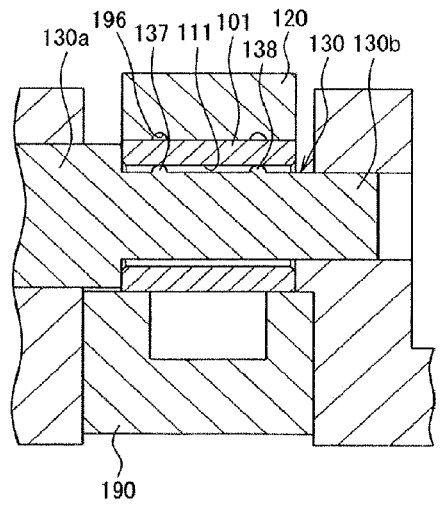
FIGS. 27A and 27B are views explaining a method of a fifth example of the fourth embodiment.
Figure 27B:
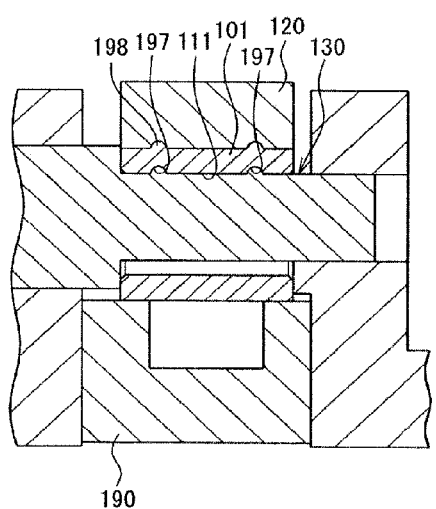

As shown in FIG. 27, previously forming the concave 196 on the underside of the upper member 120 of the die simultaneously enables by cold forging formation of the concave 197 on the inner circumferential surface 111 of the nut blank 101, and formation of a projection 198 on the outer circumferential surface of the nut blank 101 in exactly the same way as the case shown in FIG. 28.

Fifth Embodiment

The fifth embodiment is directed to a manufacturing method of the nut constituting the ball screw and a ball screw nut manufactured thereby.

The ball screw includes: the nut having on its inner circumferential surface a spiral groove; the screw shaft having on its outer circumferential surface a spiral groove; balls loaded between a raceway formed by the spiral groove of the nut and the spiral groove of the screw shaft; and the ball returning passage to return the balls from an end point to a start point of the raceway. The ball screw is a device in which the balls roll within the raceway to thereby relatively move the nut with respect to the screw shaft.

Such a ball screw is provided not only for a positioning device, etc. for general industrial machinery, but also for an electric actuator to be installed in vehicles such as a car, a motorcycle, a ship, etc.

The ball returning passage of the ball screw includes a circulating tube system and a deflector system. In case of the deflector system, a deflector having a concave constituting the ball returning passage is fitted into a through hole of the nut. On the other hand, in Patent Document 3, there is disclosed directly defining by plastic working a concave (circulating groove) constituting the ball returning passage on the inner circumferential surface of the nut blank. As for the manufacturing method thereof, it is as stated in the fourth embodiment.

The method disclosed in Patent Document 3, however, intrinsically entails a problem that when the nut has a long axial dimension and a small inner diameter, damage may occur due to the strength poverty of the working head of the die, as the working head of the die becomes elongate.

The present invention is contrived focusing on the above-identified problems, and its object is to provide a manufacturing method of a ball screw nut which is able to form a concave, without giving damage to the die, and to attenuate an impact on outside accuracy of the nut, even when a nut having a long axial dimension and a small inner dimension is manufactured, as a method of directly forming by plastic working the concave constituting the ball returning passage on the inner circumferential surface of the nut blank.

Further, yet another object of the present invention is to provide a ball screw and a manufacturing method thereof which is able to prevent adhesion on butting of the nut against the housing, and to suppress collision energy generated thereat.

To solve the above-identified problems, the manufacturing method of the ball screw nut of the fifth embodiment includes: the nut having on its inner circumferential surface a spiral groove; the screw shaft having on its outer circumferential surface a spiral groove; balls loaded between a raceway formed by the spiral groove of the nut and the spiral groove of the screw shaft; and the ball returning passage provided as a concave on the inner circumferential surface of the nut for returning the balls from an end point to a start point of the raceway, wherein the nut relatively moves with respect to the screw shaft by rolling the balls with the raceway, and wherein the concave is formed on the inner circumferential surface of the nut blank by pressing the inner circumferential surface of the nut blank with a convex, by a press method using a die of the cam mechanism, the cam mechanism comprising: a cam driver internally inserted into a cylindrical nut blank and moving in an axial direction; a cam slider disposed between the nut blank and the cam driver, and having the convex corresponding to the concave, the convex moving in a radial direction of the nut with a movement of the cam driver; and a restraining member for restraining both end faces in the axial direction and the outer circumferential surface of the nut blank, and having a recess on an end face to receive the end face in the axial direction of the nut blank, wherein the outer circumferential formation is formed by projecting a periphery of the nut blank into the recess of the restraining member.

According to the fifth embodiment, a movement in the axial direction of the cam driver on a slope defining the cam mechanism changes its direction to the radial direction to transmit it to the cam slider; and the convex provided in the cam slider presses the inner circumferential surface of the nut blank to cause it to be subject to plastic deformation, which forms the concave on the inner circumferential surface of the nut blank. Then, even when the nut having a long axial dimension and a small inner diameter is manufactured, the die is hardly subject to damage, as compared with the method disclosed in Patent Document 3.

Since the both end faces in an axial direction and the outer circumferential surface of the nut blank are restrained by the restraining member, and the end face of the nut blank is projected into the recess of the restraint member, it may reduce an impact on the outer dimension accuracy of the nut.

Further, the ball screw of the fifth embodiment is a ball screw including: the nut having on its inner circumferential surface a spiral groove; a screw shaft having on its outer circumferential surface a spiral groove; balls loaded between a raceway formed by the spiral groove of the nut and the spiral groove of the screw shaft; and the ball returning passage provided as a concave on the inner circumferential surface of the nut, for returning the balls from an end point to a start point of the of the raceway, wherein a convex is provided at an end face in an axial direction of the nut.

With the ball screw according to the fifth embodiment, since the end face of the nut is projected, the embodiment prevents adhesion occurred on butting of the nut against the housing, thereby suppressing collision energy.

According the fifth embodiment, as a method of directly manufacturing the concave constituting the ball returning passage on the inner circumferential surface of the nut by plastic working, even when the nut having a long axial dimension and a small inner diameter is manufactured, the embodiment enables formation of the concave, without giving damage to the die, as well as reduction of an impact on the outer dimension accuracy. Additionally, to project the end face of the nut, thereby providing the ball screw of which collision energy is decreased to prevent the adhesion on colliding of the nut.

First Example

Figure 29A:
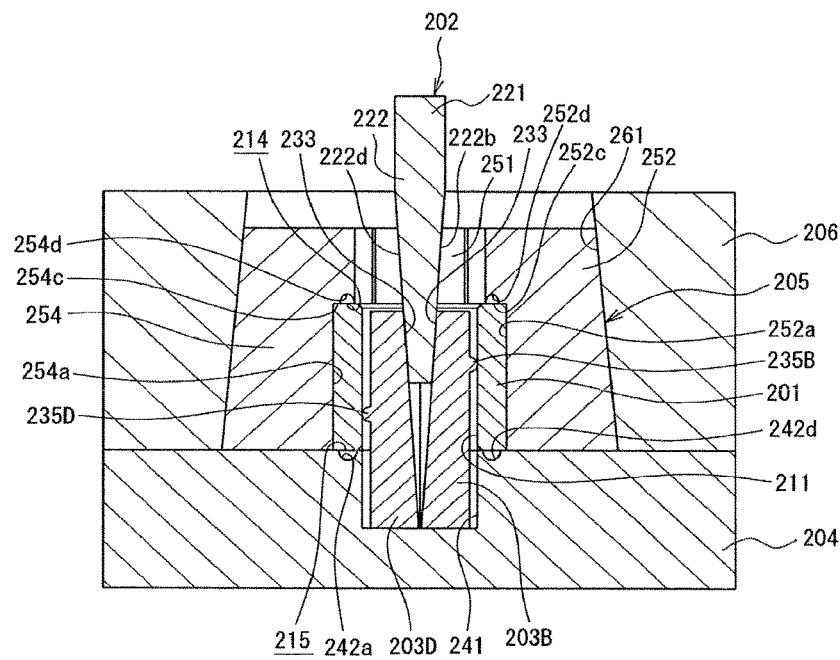
FIGS. 29A and 29B are cross-sectional views showing a construction in a first example of a manufacturing method of a fifth embodiment.
Figure 29B:
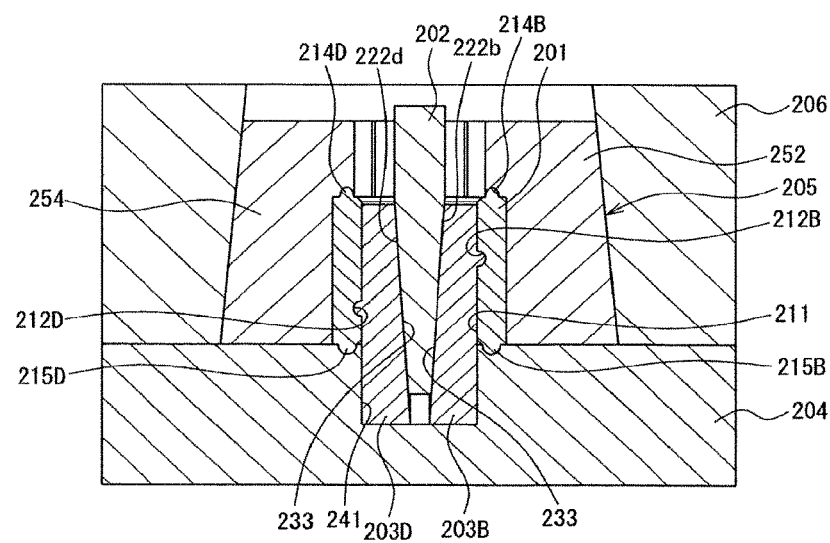
Figures 30A, 30B, 30C:
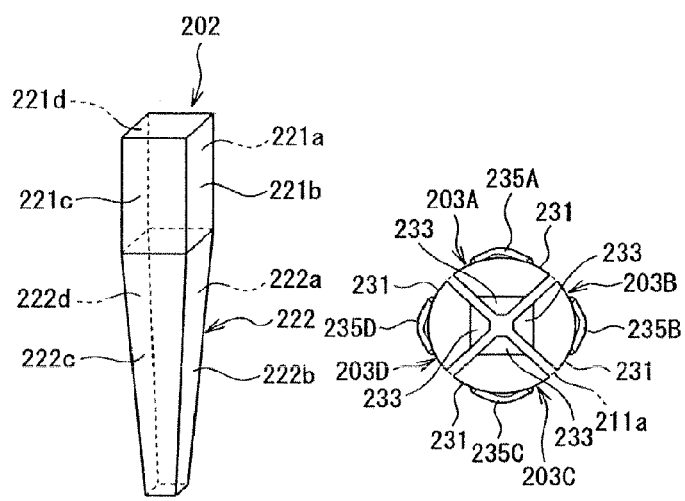
FIG. 30A is a perspective view.
FIG. 30B is a plane view showing a cam slider.
FIG. 30C is a perspective view, of a cam driver used in the first example of the fifth embodiment.
Figure 31A:
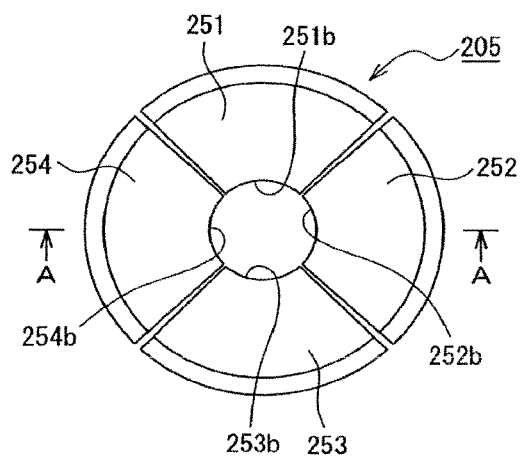
FIG. 31A is a plane view.
Figure 31B:
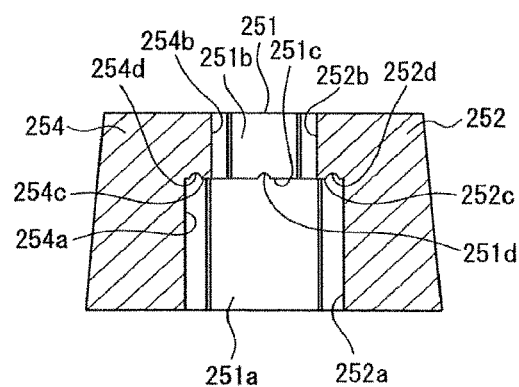
FIG. 31B is a sectional view taken along a line A-A thereof.
Figure 31C:
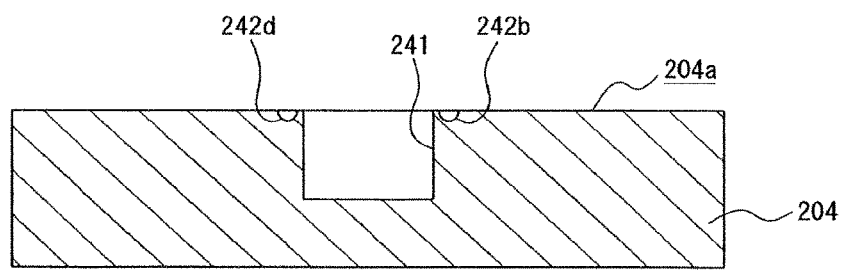
FIG. 31C is a cross-sectional view of a stand, showing a split constituting a restraining member used in the first example of the fifth embodiment.
Figure 32A:
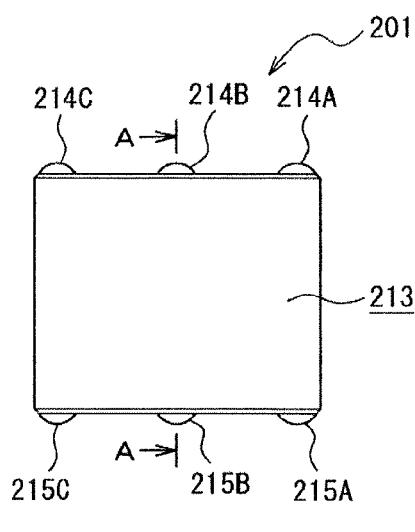
FIG. 32A is a front view.
Figure 32B:
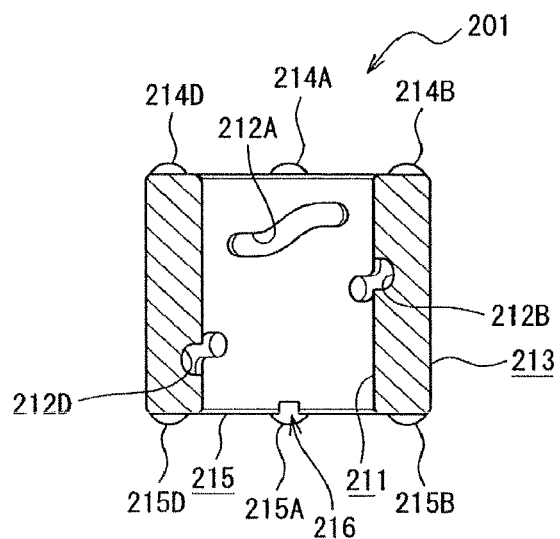
FIG. 32B is a cross-sectional view taken along a line A-A thereof.
Figure 32C:
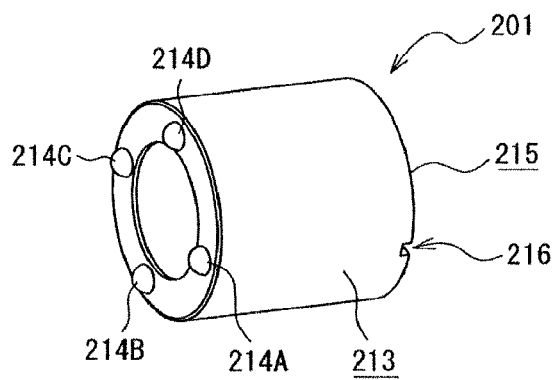
FIG. 32C is a perspective view, showing a nut blank in which an S-shaped groove and a convex are formed in the first example of the fifth embodiment.

An explanation will then be made to a first example of a manufacturing method of the ball screw according to the fifth embodiment by referring to drawings. FIG. 29 is a cross-sectional view showing a construction in the first example of the manufacturing method of the fifth embodiment. FIG. 30 is a view showing a cam driver, in which FIG. 30A is a perspective view, FIG. 30B is a plane view, and FIG. 30C is a perspective view. FIG. 31 is a view showing a split constituting a restraining member used in the first example, in which FIG. 31A is a plane view, FIG. 31B is a cross section taken along a line A-A, and FIG. 31C is a cross-sectional view of a stand. FIG. 32 is a plain view showing a nut blank in which an S-shaped concave and a convex are formed, in which FIG. 32A is a front view, FIG. 32B is a cross-sectional view taken along a line A-A, and FIG. 32C is a perspective view.

Die

As shown in FIGS. 29 to 31, a die used in the first example includes a cam driver 202 to be inserted inside of a nut blank 201; cam sliders 203A to 203D to be disposed between the nut blank 201 and the cam driver 202; a stand 204 in which a concave 241 having the same inner diameter as the nut blank 201 is formed at the center of a top surface; a restraining member 205 for restraining an upper end surface and an outer circumferential surface of the nut blank 201; and an outer member 206 for restraining a movement to the outside of the restraining member 205.

Cam Driver

The cam driver 202 is, as shown in FIG. 30A, a bar member having a square cross section, wherein the cam driver includes a base end 221 in which the size of a square in section is unchanged in an axial direction, and a body 222 in which the size of a square in section gets smaller as it goes toward an end. In other words, four sides 221a to 221d of the base end 221 are respectively parallel with one another, back and forth and right and left, and the four sides 222a to 222b of the body have a slope with the same inclination.

Cam Slider

Cam sliders 203 A to 203D are, as shown in FIGS. 30B and 30C, a member in which a cylinder having the diameter slightly smaller than the inner diameter of the nut member 201 is divided into four in a circumferential direction. At the opposite side of the outer circumferential surface 231, a slope 233 with the same inclination as the four slopes 222a to 222b of the cam driver 202 is provided. Arranging the cam sliders 203A to 203D matching with the outer circumferential surface 231 to a circle 211a defining the inner circumferential surface 211 of the nut blank 201 creates a space at the center of the circle 211a into which the cam driver 202 is inserted, with the four slopes 233, at the center of the circle 211a. Moreover, on the outer circumferential surface 231 of the each cam slider 203A to 203D, S-shaped convexes 235A to 235D corresponding to the S-shaped convex constituting the four ball returning passages is provided.

The slopes 222a to 222d of the cam driver 202 and the slope 238 of the cam slider 203 constitute the cam mechanism of the die.

Restraining Member

The restraining member 205 is, as shown in FIG. 31A, comprised of splits 251 to 254, in which an outer circumferential diameter of cylinder changed in a tapered shape in an axial direction are divided into four parts in a circumferential direction. As shown in FIG. 31B, an inner circumferential surface of each split 251 to 254 is provided in small-diameter portions 251b to 254b in which a large-diameter side of the outer circumferential surface is formed in the large-diameter portions 251a to 254a corresponding to the outside of the nut blank 201, and a small-diameter side of an outer circumferential surface is formed in the small-diameter portions 251b to 254b slightly larger than the inner diameter (smaller than the outside) of the nut blank 201.

Thereby, at a boundary surface of the large-diameter portions 251a to 254a and the small-diameter portions 251b to 254b, restraining surfaces 251c to 254c are formed, which bring into contact with an upper end surface 214 of the nut blank 201. On these restraining surfaces 251c to 254c (a recess 253d is not shown in FIG. 31B), recesses 251d to 254d are formed. The large-diameter portions 251a to 254a of the inner circumferential surface of each split 251 to 254 correspond to the inner circumferential surface to which the outer circumferential surface 213 of the nut blank 201 is received.

The stand 204 has, as shown in FIG. 31C, a concave 241 having the same inner diameter as the nut blank 201 is formed on the center of the upper surface 204, and a part of the upper surface 204a acts as a restraining surface that comes into contact with a lower end face 215 of the nut blank 201. On the restraining surface, recesses 242a to 242d are formed. In FIG. 31C, because there is shown an aspect in which the recesses 242a to 242d are formed so as to be positioned at the inner circumferential surface side of the each split 251 to 254, only the recess 242b and the recess 242d are shown, but the recess 242a and the recess 242c are not shown.

The recesses 242a to 242d are formed at least on one axial end face of the nut blank 201, i.e. at either of the upper end face 214 or the lower end face 215. In the first example, the recesses 242a to 242d have a substantially semispherical shape, and are formed integrally and continuously in a circumferential direction of at least either the upper end face 214 or the lower end face 215. The shape and the number of the recesses 242a to 242d are not necessarily limited to such aspect. They may independently be provided in correspondence with the length of an arc in a circumferential direction of the S-shaped concaves 212A to 212D to be formed on the inner circumferential surface of the nut blank 201. Further, the recesses 242a to 242d may be formed identical with one another in area, depth, geometry, etc., or they may individually be different. For example, the recesses 242a to 242d formed at a position distant from the S-shaped concaves 212A to 212D may be small in their area and depth. Conversely, the recesses 242a to 242d to be formed at a position proximate to the S-shaped concaves 212A to 212D may be large in their area and depth. Moreover, irrespective of the number of the S-shaped concave, provision of only one recess may of course be possible.

An outer member 206 is a cylinder having an outside surface identical with the inner circumferential surface 261 corresponding to the tapered outer circumferential surface of the restraining member 205, and with a profile of the stand 204.

The S-shaped concaves 212A to 212D are formed which define the four ball returning passages on the inner circumferential surface 211 of the nut blank 201 by the following method, using this die.

Manufacturing Method of Ball Screw Nut

Firstly, the nut blank 201 is disposed at the center on the stand 204 to match the inner circumferential surface 211 of the nut blank 201 with the inner circumferential surface of the concave 241. Secondly, each splits 251 to 254 of the restraining member 205 are disposed on the stand 204, the large-diameter portions 251a to 254a of the inner circumferential surface are brought into contact with the outer circumferential surface 213 of the nut blank 201, and the restraining surfaces 251c to 254c are brought into contact with the upper end face 214 of the nut blank 201. Then, the outer member 206 is disposed on the stand 204, and the inner circumferential surface 261 is brought into contact with the tapered outer circumferential surface of the restraining member 205. At this instance, the outer member 206 is fixed to the stand 204.

Thereby, a movement toward the outside in a radial direction of splits 251 to 254 constituting the restraining member 205 is restrained. The restraining member 205 and the stand 204 put into a state where the both end faces 214 and 215 in an axial direction of the nut blank 201 are restrained.

Subsequently, the cam sliders 203A to 203D are inserted into the nut blank 201 toward the inner circumferential surface 211 of the nut blank 201. Thereby, the four slopes 233 of the cam sliders 203A to 203D creates a space into which the cam driver 202 is inserted. Then, an end of the body of the cam driver 202 is inserted into the space. FIG. 29A shows this state.

When pressing the cam driver 202 from above by applying pressing pressure a force is transmitted from the slanted slopes 222a to 222d of the cam driver 202 to the slope 233 of the cam sliders 203A to 203D. Accompanying thereto, a downward force of the cam driver 202 is converted into a force radially moving outward each cam slider 203A to 203D, and the S-shaped convexes 235A to 235D provided in the each cam slider 203A to 203D press the inner circumferential surface 211 of the nut blank 201 to cause it to be subject to plastic deformation. Accompanying thereto, materials existing on the outer circumferential surface 213 of the nut blank 201 are pushed into the recesses 251a to 251d of the splits 251 to 254 constituting the restraining member 205 and into the recesses 242a to 242d of the stand 204. FIG. 29B shows this state.

This forms S-shaped concaves 212A to 212D constituting the four ball returning passages on the inner circumferential surface 211 of the nut blank 201. An excess material produced with the formation of the S-shaped concaves 212A to 212D move into the recesses 251d to 254d of the splits 251 to 254 constituting the restraining member 205 from an upper end of the nut blank 201, and convexes 214A to 214D are provided thereby. Furthermore, excess material produced with the formation of the S-shaped concaves 212A to 212D moves into the recesses 242a to 242d of the stand 204 from a lower end 215 of the nut blank 201, and the convexes 215A to 215D are provided thereby. Hereinafter, in some case, these convexes 214A to 214D and convexes 215A to 215D may possibly be called as an end face convex.

Here, it is preferable for a die at the outside side of the nut blank 201 to be one which relatively firmly fastens the outside of the nut blank 201. For example, it is preferable that fitting of the outside of the die and the nut blank 201 range from loose fit of several micrometers to interference fit of tens of micrometers. Since with plastic working using such method, expansion of the excess material to the outside of the nut blank 201 can be suppressed, it enables plastic working of the S-shaped concaves 212A to 212D, without impacting on accuracy of the outside dimensions, etc.

It is noted that where the formation of a projection at the outside side of the nut blank 201 is allowed for, it is also possible to use at the same time the recess formed at the outer diameter side and the recess formed at the end face side.

The nut blank 209 in which the S-shaped concaves 212A to 212D, the convexes 214A to 214D, and the convexes 215A to 215D are formed by this method is shown in FIG. 32. FIG. 32A is a front view; FIG. 32B is a cross-sectional view taken along a line A-A thereof; and FIG. 32C is a perspective view. By forming a spiral groove and a seal attaching groove in the nut blank 201, the ball screw nut is manufactured.

Herein, as shown in FIGS. 32B and 32C, on one end face 215 of the nut blank 201, a notch 216 is formed for positioning during forging of the nut blank 210 and subsequent cutting. In the first example, a convex (not shown) to be fitted to or to be engaged into may be provided in the stand 204 and the restraining member 205 for preventing that the excess material does not move into the notch 216 during plastic working to the nut blank 201.

Further, the sum of volume of the convex parts of the convexes 214A to 214D and the convexes 215A to 215D is substantially identical with that of the concave of the S-shaped recesses 212A to 212D.

With the method according to the first example, the end face convex can be manufactured simultaneously with the S-shaped concave. Also, the method minimizes an effect of the material flowing to the periphery of the nut, caused by forging. Even when a nut having long dimensions in an axial direction and a small inner diameter is manufactured, simultaneous formation of the four S-shaped concaves 212A to 212D in the nut blank 201 may be possible, without giving damage to the cam driver 202. Adhesion between the nut and housing, which may be caused when the nut moves in an axial direction and an end face of the nut collides against the housing, etc., can be prevented by providing an end face concave and making a collision area small between the nut and the housing, etc. Further, according to the first example, it does not impair plane accuracy of portions other than the convex of the nut end face.

Second Example

Figure 33A:
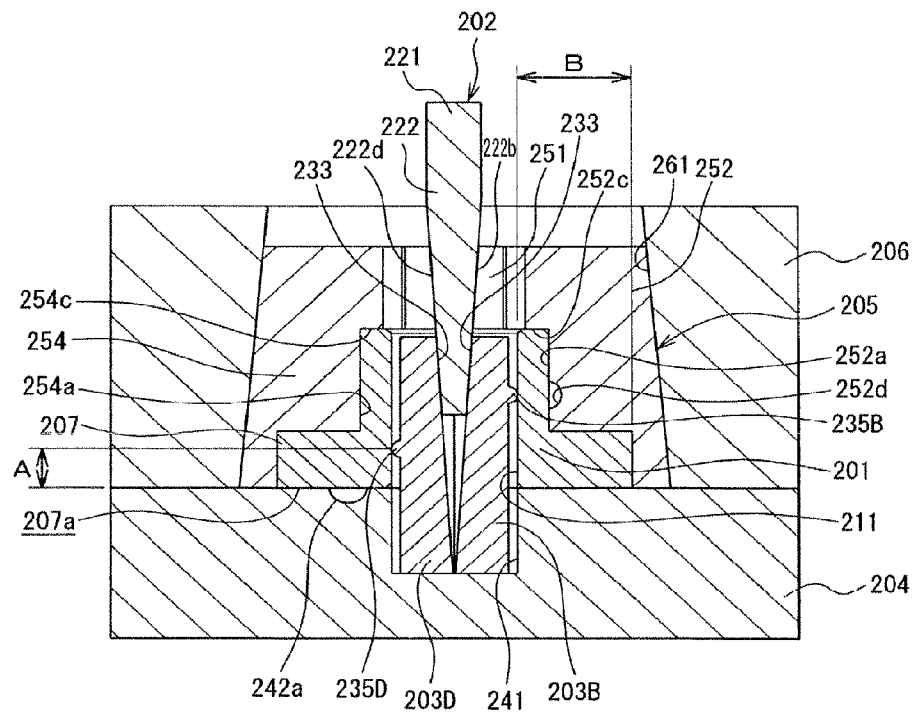
FIGS. 33A and 33B are cross-sectional views showing a construction in the second example of manufacturing method of the fifth embodiment.
Figure 33B:
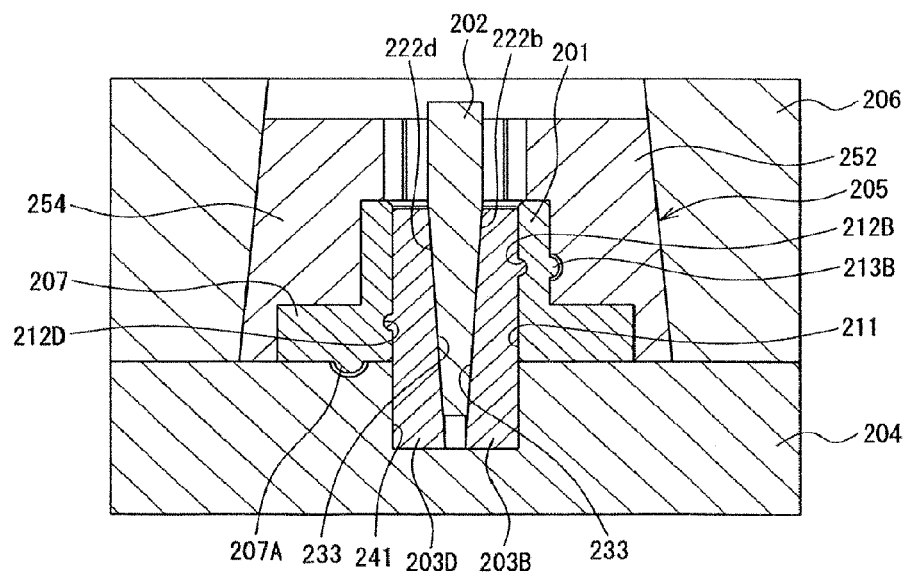

FIG. 33 is a cross-sectional view showing a second example of the manufacturing method of the ball screw of a fifth embodiment. In this connection, the second example is the same as the above-mentioned first example, with the exception that a location where the recess of the splits and the recess of the stand are formed is changed. Thus, the descriptions of the same configurations having the same reference numerals with those of the first example will be omitted for brevity's sake. As shown in FIG. 33, the second example illustrates one example of arrangement of the recess where plastic working (e.g. cold forging) is applied to the nut blank 201 in which the flange 207 is provided.

In the nut blank 201, where a thick wall part of the flange 207 and a phase of the S-shaped concaves 212A to 212D in an axial direction are overlapped, there is some possibility of exerting a bad influence even on geometry, etc., of the S-shaped concaves 212A to 212D to be worked, due to hindrance by the thick wall part and insufficient plastic deformation resulting therefrom, even by forming the recess on the outer diameter side. In addition, where the flow of the material is unsuccessfully ended and a thin wall part (in FIG. 33, a portion at which the flange in an axial direction does not have overlapping phase each other) exists, it is thinkable that dimensional accuracy of an internal diameter of the thin wall part could drop.

To address this potential adverse effect, in the second example, a recess 242a corresponding to the S-shaped concaves 212A to 212D of which phase overlaps with the flange 207 in an axial direction is provided in the stand 204 facing the end face 207a of the flange 207. On the contrary, a concave of which phase does not overlap in an axial direction with the flange 207 may be provided at end faces (restraining surfaces) 251c to 254c at the opposite side to the flange 207, or provided, as shown in FIG. 33, at a position corresponding to the S-shaped concaves 212A to 212D of the large-diameter portions 251a to 254a facing the external diameter of the nut blank 201.

Here, in the second example, when A is "a distance in an axial direction between the S-shaped concave nearest to an end face at the side where the end face convex is provided and an axial end face at the side where the end face convex is provided", and B is "a distance in a radial direction between the S-shaped concave and the outermost circumferential surface of the nut blank", it is preferable to set to be A<B. By defining like this, notably, the nut blank with the flange 207, the projection is liable to project, which mitigates an impact on the external diameter side of the nut blank 201.

According to the second example, even where the thick wall part such as the flange 207 etc., is provided in the nut blank 201, the nut on an end face of which the projection is formed may be provided, while suppressing an adverse effect on another portion of the nut blank 201. In this connection, area, depth, position in a circumferential direction of the projection, etc. may be properly set at discretion as with the first example.

Third Example

Figure 34A:
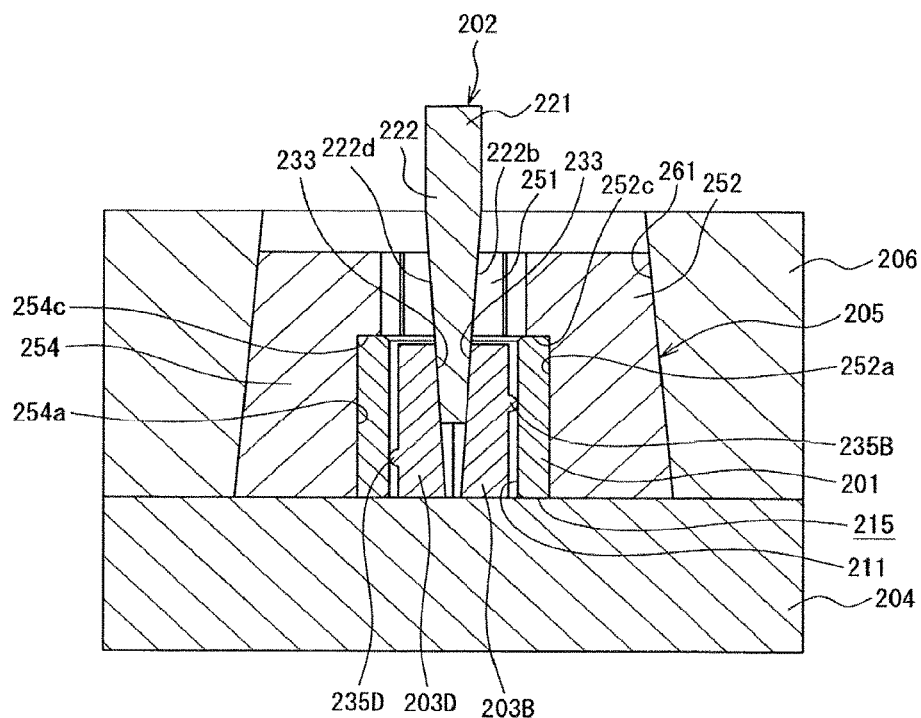
FIGS. 34A and 34B are cross-sectional views showing a construction in the third embodiment of manufacturing method of the fifth embodiment.
Figure 34B:
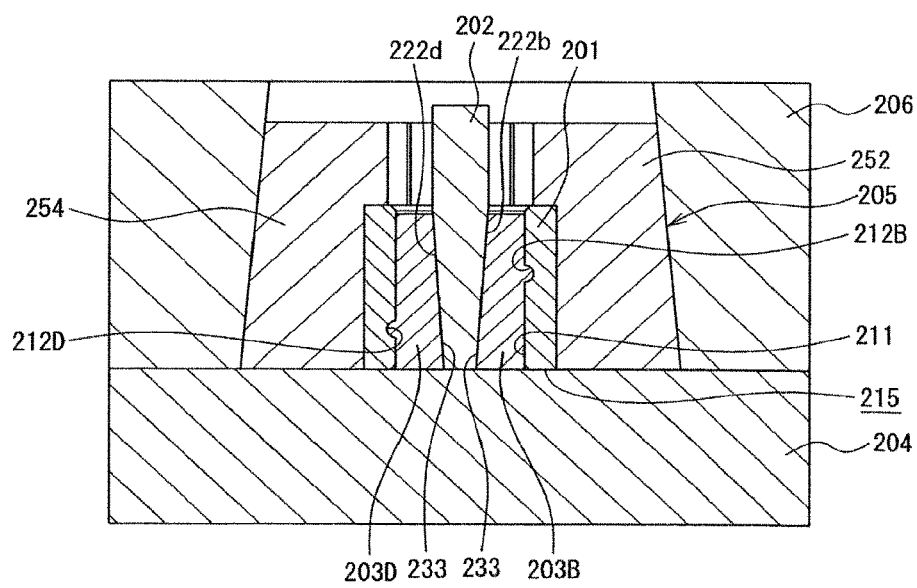

FIG. 34 is a cross-sectional view showing a third example of the manufacturing method of the ball screw of the fifth embodiment. As the third example is the same as the above-mentioned first example, with the exception that a construction of the stand. Therefore, the descriptions of the same construction denoted by the same reference numerals are omitted for simplification.

As shown in FIG. 34, in the third example, the stand 204 that is a part of the die is made of pressure resistant rubber and is devoid of the concave 241 having the same inner diameter as that of the nut blank 201. That is so say, the stand 204 is made softer than an upper pressing member (metal), and is permitted to undergo somewhat of elastic deformation. Put differently, a pressing force to an end face is reduced than that to the outer circumferential surface of the nut blank 201. Thus, the excess material to flow by working of the S-shaped concave tends to more protrude over a lower end face 215 of the nut blank 201 that is likely to be elastically deformed. As a consequence, a different-sized convex may be provided which is a result of protruding of the excess material over the both end faces 214 and 215 in an axial direction of the nut blank 201. This prevents adhesion when an end face of the nut at the side where the end face is not planar and the housing, etc., collide against each other, as at least either of the upper end face 214 or the lower end face 215 of the nut blank 201 is not flat after forging.

Here, whether what shape of the end face convex should be taken is not limited to the convex as exemplified in the first and the second examples, rather an end face of the nut having an undulated shape may be included.

Moreover, as a candidate of the pressure resistant rubber, materials that may resist compression under high pressure are desirable. A variety of synthetic rubber, such as urethane rubber, nitrile rubber, acrylic rubber, fluorine rubber, and acrylonitrile-butadiene rubber may preferably be used for this purpose.

In the event of fear of frictional wear to the pressure resistant rubber, arising from direct abutment of the stand 204 made of the pressure resistant rubber and the nut blank 201, the lower end face 215 of the nut blank 201 may be received through elastic members such as rubber, spring, etc.

Fourth Example

Figure 35A:
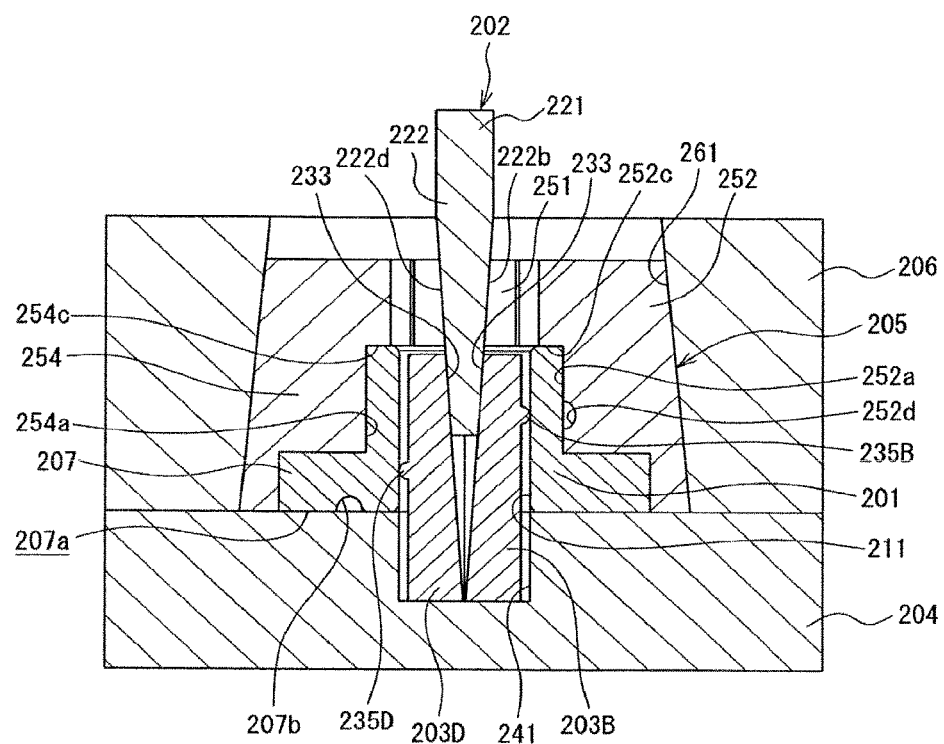
FIGS. 35A and 35B are cross-sectional views showing a construction in the fourth embodiment of manufacturing method of the fifth embodiment.
Figure 35B:
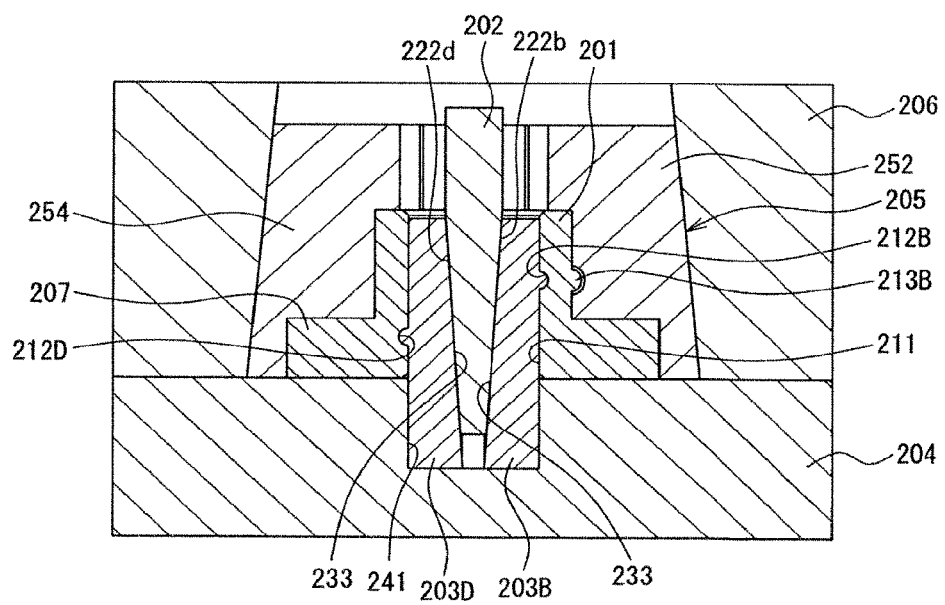

FIG. 35 is a cross-sectional view showing a fourth example of the manufacturing method of the ball screw of the fifth embodiment. As the fourth example is the same as the above-mentioned second example, with the exception that a recess is formed in the nut blank, and so its description of the same construction denoted by the same reference numeral is omitted for brevity's sake.

As shown in FIG. 35, in the fourth example, a concave 207b is formed at an end face 207a of the flange 207, which is used when plastic working is applied to the nut blank 201 in which the flange 207 is provided. Thereby, since the excess material flows to the recess 207b, without forming the recesses 242a to 242d in the stand 204, it preferably enables working of the S-shaped concaves 212A to 212D.

Herein, in the fourth example, the lower end face 215 of the nut blank 201 may not be plane after forging. That is, where volume of the recess 207b is different from that of the S-shaped concaves 211A to 212D, the formation of a recess or a convex at a position of the recess 207b contributes to reduce a colliding area of the nut and the housing. This prevents the occurrence of adhesion between the nut and the housing.

Fifth Example

Figure 36A:
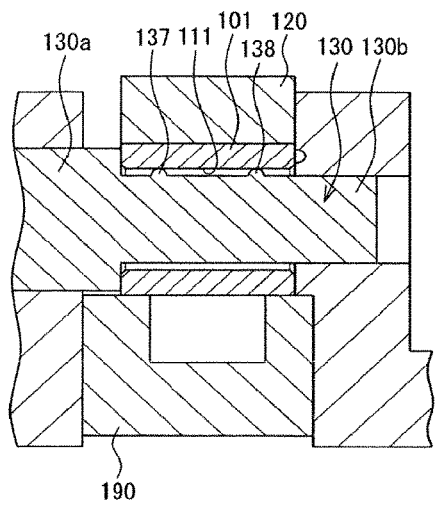
FIGS. 36A and 36B are views explaining a method of the fifth example of manufacturing method of the fifth embodiment.
Figure 36B:
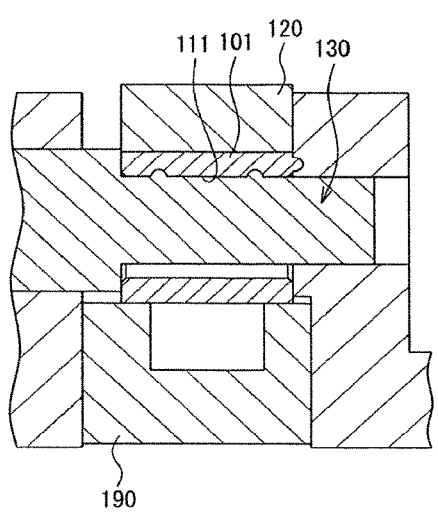
Figure 37A:
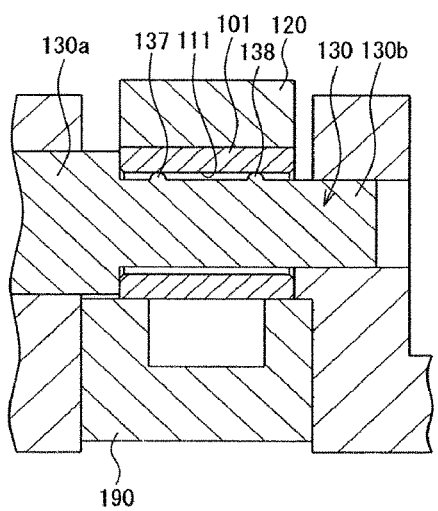
FIGS. 37A and 37B are views explaining a method of the fifth example of manufacturing method of the fifth embodiment.
Figure 37B:
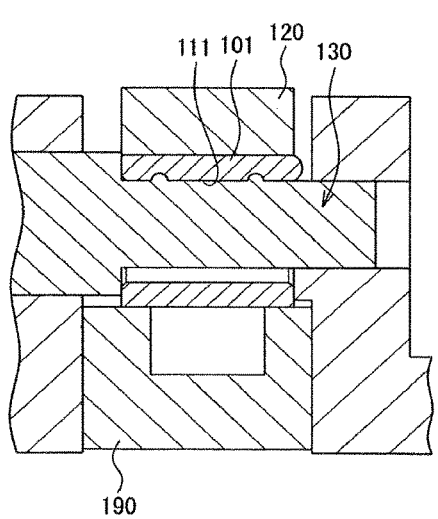

FIGS. 36 and 37 are a cross-sectional view showing a fifth example of the manufacturing method of the ball screw of the fifth embodiment. As shown in FIG. 36, previously providing a concave 196 on a member which faces an axial end face of the nut blank 101 and restrains the axial end face simultaneously attains by cold forging the formation of the concave 197 on the inner circumferential surface 111 of the nut blank 101 and the formation of the projection 198 on the end face in an axial direction of the nut blank 101, in the exactly same way as the example shown in FIG. 28.

Further, as shown in FIG. 37, where the member facing the end face in an axial direction of the nut blank 101 does not restrain the end face in an axial direction, because the member and the end face in an axial direction of the nut blank 101 are apart from each other, it allows by cold forging the simultaneous formation of the concave 197 on the inner circumferential surface 111 of the nut blank 101 and the formation of the projection 198 on the end face in an axial direction of the nut blank 101, in the exactly same way as the example shown in FIG. 28, even without the formation of the groove 196 in the member.

Ball Screw

Figure 38A:
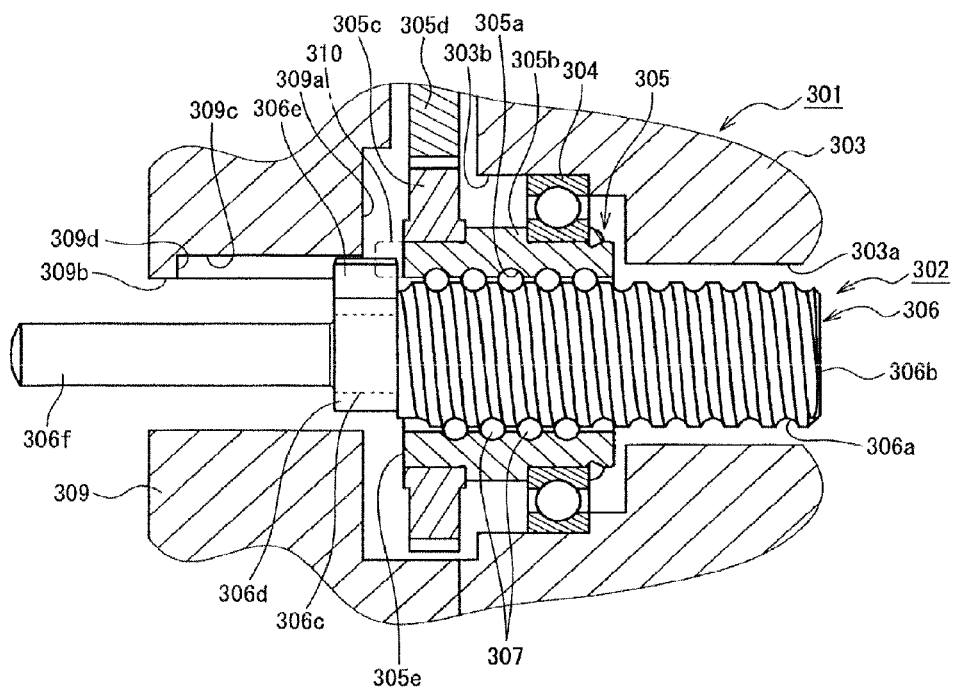
Figure 38B:
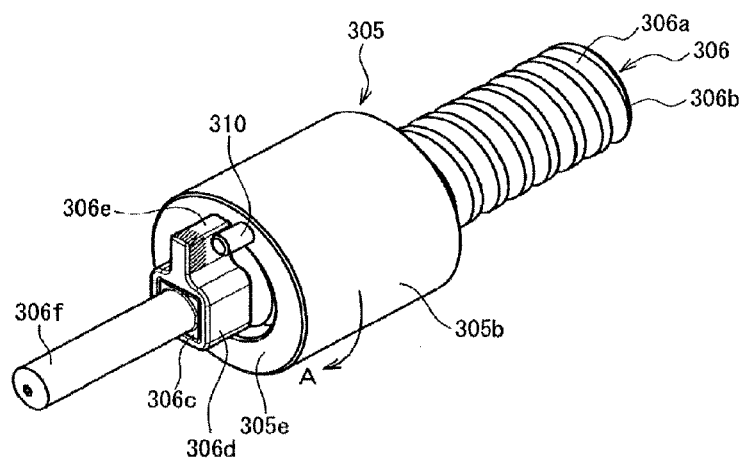

An explanation will then made below to the ball screw utilizing the nut manufactured in the first and the fourth examples by referring to drawings. FIG. 38 is a view showing one exemplary construction of the ball screw of the fifth embodiment; in which FIG. 28A is a cross-sectional view, and FIG. 38B is a perspective view. As shown in FIG. 38A, the ball screw 302 includes: a nut 305 rotatably supported via a bearing 304 in a large-diameter hole 303*b* communicating with a central opening of the housing 303 in which a central opening 303*a* is formed as a fixed portion; a screw shaft 306 to be screwed with the nut 305; and a large number of balls 307 loaded between the nut 305 and the screw shaft 306.

The nut 305 is manufactured by any of the methods disclosed in the foregoing first to fourth examples. To put it concretely, the nut 305 is made of a cylindrical member 305*b* on inner circumferential surface of which a screw groove 305*a* is formed. One end of an outer circumferential surface of the cylindrical member 305*b* is rotatably supported via the bearing 304 by the housing 303, and a spur gear 305*c* is fitted onto the other end. A spur gear 305*c* is meshed with the spur gear 305*d*, which is coupled to a rotation axis of the electric motor as a rotary driving source (not shown), and the nut 305 is rotationally driven by a turning force of the electric motor.

Moreover, in the nut 305, a cylindrical abutting piece 310 is axially provided in a projecting manner, as a abutting member, which is abutted to an end face in a circumferential direction of a guide projection 306*e* of the screw shaft 306 to be mentioned later, at a more outside position in a radial direction than the screw groove 305*a* on a side end face 305*e* in an axial direction at the spur gear 305*c* side.

The abutting piece 310 is a convex provided on the end face 214(215) of the nut blank 201 in the forgoing first to fourth examples. A circulating groove (not shown) is the S-shaped concaves 212A to 212D formed in the first to fourth examples. Further, the screw groove 305*a* is one which is formed by cutting, etc. Incidentally, as the abutting piece 310 is the convex provided on the end face 214(215) of the nut blank 201 in the foregoing first to fourth examples, the total volume of these projections is virtually identical with that of a concave of the S-shaped recesses 212A to 212D (not shown).

The screw shaft 306 is being inserted into a central opening 303*a* formed in the protrusion housing, and includes: a large-diameter portion 306*b* on the outer circumferential surface of which a screw groove 306*a* is formed; a square tube 306*d* fitted to a prism 306*c* provided at one end of the large-diameter portion 306*b*; a guide projection 306*e* outwardly projecting from its one plane than the large-diameter portion 306*b* in a radial direction; and a small-diameter shaft 306*f* connected to the prism 306*c*.

Here, at the end where the nut 305 of the housing 303 is received, a fixing cover 309 is integrally fixed by a fixing member such as bolting, as a fixed portion, made by die-casting e.g. of aluminum, aluminum alloy, etc. that is used for forming a receiving portion 309*a* to receive therein the nut 305. In the fixing cover 309, an inserting hole 309*b* is formed, which has a diameter smaller than that of the central opening 303*a* of the housing 303 into which the small-diameter shaft 306*f* and the large-diameter portion 306*b* of the screw shaft 306 are inserted, and has a diameter larger than the large-diameter portion 306*b* of the screw shaft 306. A guide groove 309*c* to guide a guide projection 306*e* of the screw shaft 306 is formed at the inner circumferential surface side of an insertion hole 309*b*. The guide groove 309*c* is opened to the receiving portion 309*a* side, and at the opposite side to the receiving portion 309*a* side, a stopper 309*d* is provided to which the guide projection 306*e* abuts without opening.

As shown in FIG. 38B, suppose that the abutting piece 310 of the nut 305 is abutted to an end face in a circumferential direction of the guide projection 306*e* of the screw shaft 306, and is at the stroke ends in a radial direction, as shown in FIG. 38A, and that about a half the guide projection 306*e* in an axial direction is engaged, in this state, into the guide groove 309*c* of the fixing cover 309.

By rotating from this state the nut 305 in a direction indicated by an arrow A, the abutting piece 310 separates in a circumferential direction from the guide protrusion 310*c* with the rotation of the nut 305. At the same time, as the guide projection 306*e* is engaged into the guide groove 309*c* of the fixing cover 309 to stop the rotation of the screw shaft 306, the screw shaft 306 advances in an axial direction and the guide projection 306*e* advances concurrently therewith.

After that, the nut 305 continues to rotate, and when an end face at the small-diameter shaft 306*f* side of the guide projection 306*e* of the screw shaft 306 abuts to the stopper 309*d* of the fixing cover 309, the advance of the screw shaft 306 stops and reaches the forward stroke end.

When the nut 305 is reversely rotated in an opposite direction counter to an arrow A shown in FIG. 38B, from a state where the screw shaft 306 reached the forward stroke end, the screw shaft 306 is subject not to rotate and retreats in an axial direction, as the guide projection 306*e* of the screw shaft 306 is engaged into the guide groove 309*c* of the fixing cover 309, with the reverse rotation of the nut 305.

When the guide projection 306*e* of the screw shaft 306 reaches a position (one turn short of the stroke end) facing the abutting piece 310 of the nut 305, a reverse rotation of the nut 305 is allowed.

On that account, the screw shaft 306 further retreats and a back end of the guide projection 306*e* enters a raceway at an end of the abutting piece 310 provided in the nut 305. Finally, as shown in FIG. 38B, the abutting piece 310 abuts an end face in a circumferential direction of guide projection 306*e*. In this situation, as shown in FIG. 38A, as about a half the axial length of the guide projection 306*e* is engaged into the guide groove 309*c* i.e. in a non-rotating state, and the abutting piece 310 abuts the guide projection 306*e* with the predetermined abutting length, the abutting piece 310 is abutted to the guide projection 306*e* to restrain a further reverse rotation of the nut 305, and the screw shaft 306 reaches the backward stroke end.

In this way, at the stroke end toward the nut 305 side of the screw shaft 306, the abutting piece 310 provided in the nut 305 is abutted to the guide projection 306*e* having a rotation stopper capability of the screw shaft 306, to thereby exhibit the rotation stopper capability. Additionally, by forming the guide projection 306*e* using the aforementioned method, a metal flow (fiber flow) is hardly cut and subject to work hardening, which offers the guide projection 306*e* with high strength.

Accordingly, the guide projection 306*e* may have the both rotation stopper and stopper capabilities, which eliminate the need for providing the stopper capability with another member. This simplifies a construction as well as reduces parts count, thereby reducing the product cost.

When the screw shaft 306 reaches the stroke end, the guide projection 306*e* of the screw shaft 306 is engaged into the guide groove 309*c*, and the abutting piece 310 is abutted to the projection projecting from the guide groove 309*c*. Because of this, when input torque to be transmitted to the nut 305 is transmitted via the abutting piece 310 to the guide projection 306*e*, the transmitted torque is received via the guide projection 306*e* in the guide groove 309*c*, as the guide projection 306e itself is engaged into the guide groove 309c. This securely prevents the radial load actions upon the screw shaft 306 and the nut 305.

Figure 39:
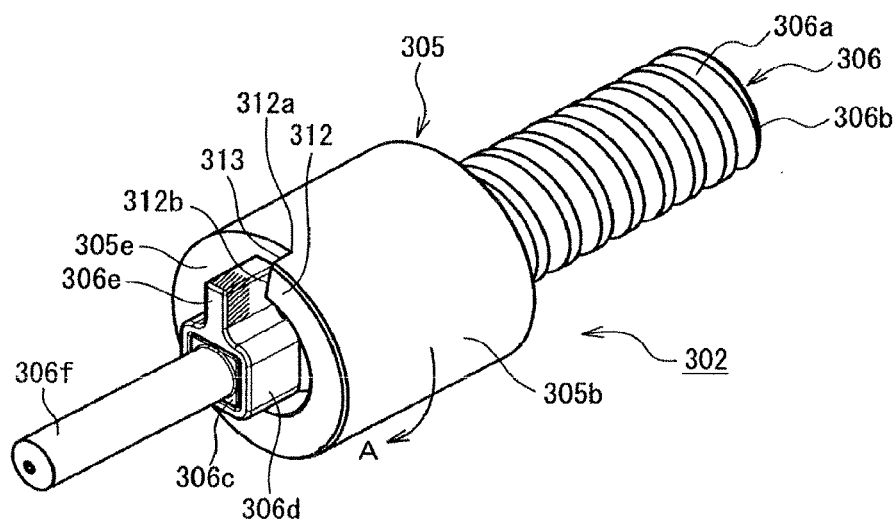
FIG. 39 is a perspective view showing a construction of another example of the ball screw of the fifth embodiment.

An explanation will next be made to another example of the ball screw of the fifth embodiment by referring to drawings. FIG. 39 is a perspective view showing another construction of the ball screw of the fifth embodiment. As the ball screw disclosed in the example is the same as the abovementioned ball screw, with the exception that a convex (abutting portion) is provided on an end face in an axial direction of the nut is worked, its description of the same construction denoted by the same reference numeral is omitted for brevity's sake.

As shown in FIG. 39, in this example, the abutting member is configured of a spiral slope and a abutting surface, in place of the abutting piece. Namely, the abutting member to be provided on an end face at the spur gear 305c side of the nut 305 includes a spiral slope 312 and a abutting surface 313 manufactured by applying any of cutting, grinding, or plastic working to a convex provided on an end face in an axial direction of the nut.

The spiral slope 312 is formed so that a projecting length in an axial direction gradually gets longer as it goes toward a circumferential direction in a counterclockwise direction from a start edge 312a, which takes up a predetermined width at the inner circumferential side in a radial direction from one point of an outer circumferential line on the side end face 305e at the spur gear 305c side of the nut 305. Further, the abutting surface 313 is abutted on an end face in a circumferential direction of the guide projection 306e of the screw shaft 306 provided by axially extending from a longest projection 312b facing the start edge 312a of the spiral slope 312 toward the start edge 312a.

With this construction, as shown in FIG. 39, by rotating the nut 305 in a direction indicated by an arrow A in which the abutting surface 313 is abutted to an end face in a circumferential direction of the guide projection 306e, from a state where the screw shaft 306 is at the backward stroke end, the abutting surface 313 of the spiral slope 312 separates in a circumferential direction from the guide projection 306e with the rotation of the nut 305. At the same time, the screw shaft 306 advances in an axial direction and the guide projection 306e also advances, as the guide projection 306e is engaged with the guide groove 309c of the fixing cover 309, and the screw shaft 306 is subject not to rotate.

After one rotation of the nut 305, the locking surface 313 of the nut 305 is separated from a back end of the guide projection 306e, which avoids the abutting surface 313 from abutting to the end face in a circumferential direction of the guide projection 306e.

Subsequently, the nut 305 continues to rotate, and when an end face at the small-diameter shaft 306f side of the guide projection 306e of the screw shaft 306 abuts to the stopper 309e of the fixing cover 309, the advance of the screw shaft 306 is stopped and reaches the forward stroke end.

When the nut 305 is reversely rotated in an opposite direction to a direction indicated by an arrow A from a state where the screw shaft 306 reached the forward stroke end, the screw shaft 306 is subject not to rotate and retreats in an axial direction, as the guide projection 306e of the screw shaft 306 is engaged into the guide groove 309c of the fixing cover 309 with the reverse rotation of the nut 305.

Then, when the guide projection 306e of the screw shaft 306 reaches a position (one turn short of the stroke end) facing the abutting surface 313 of the nut 305, as mentioned previously, the reverse rotation of the nut 305 is allowed.

For this reason, the screw shaft 306 further retreats and a back end of the guide projection 306e enters in a raceway of the longest projection 312b provided in the nut 305. Finally, as shown in FIG. 39, the abutting surface 313 abuts an end face in a circumferential direction of the guide projection 306e. In this state, as with the aforesaid example, because about half of the axial length of the guide projection 306e is engaged into the guide groove 309c, the guide projection 306e is in a non-rotating state. As the abutting surface 313 abuts to the guide projection 306e, the abutting surface 313 is abutted to the guide projection 306e to restrain a further reverse rotation of the nut 305, and the screw shaft 306 reaches the backward stroke end.

In this manner, also in this example, at the stroke end to the nut 305 side of the screw shaft 306, the abutting surface 313 of the spiral slope 312 provided in the nut 305 is abutted to the guide projection 306e having a rotation stopper capability, to thereby exhibit a stopper capability.

Hence, the guide projection 306e may have both the rotation stopper and stopper capabilities, which eliminates the need for providing the stopper capability by use of another member. This simplifies the construction as well as reduces product counts, thereby reducing the product cost.

Here, the concave 242a of the stand 204 may have the substantially same shape as the spiral slope (abutting portion) by using the method shown in GIGS. 29 and 33, and may be manufactured simultaneously with the circulating groove by forging.

Further, whereas the geometry of the ball screw in the example of the ball screw shown in FIGS. 38 and 39 is one which shows a case where the nut rotates (case where the nut does not move in an axial direction of the screw shaft), it may be valid for an aspect that a screw shaft of the ball screw where a convex is provided on an end face of the nut rotates, and the nut moves in an axial direction.

As described above, although the explanation has been made to the examples of the ball screw nut which is manufactured by the manufacturing method of the ball screw nut and the ball screw nut manufactured thereby according to the fifth embodiment, the fifth embodiment is not necessarily limited to the above examples, as long as the fifth embodiment is at least a ball screw nut in which a convex is provided at least on an end face in an axial direction of the nut and a manufacturing method thereof. It should be understood that various modifications of the fifth embodiment may be possible, as far as they do not deviate from the spirit of the fifth embodiment.

For example, the manufacturing method of the ball screw nut according to the fifth embodiment, and the nut of the ball screw manufactured thereby may equally be applied to a ball screw nut that adopts a circulating screw shaft. Further, in the above example, while the example is given where the plurality of S-shaped concaves are simultaneously provided by plastic working on the inner circumferential surface of the nut blank, the plurality of S-shaped concaves may consecutively be provided.

Also, as plastic working of the S-shaped concaves 212A to 212D in the fifth example, a variety of plastic working such as hot forging, cold forging, hydro forming, etc, may be applied.

Sixth Embodiment

The sixth embodiment is directed to a ball screw in which balls are loaded between the ball screw shaft and the ball screw nut, in particular, to be suited for a ball screw in which a concave, serving as the circulating groove, is formed on an inner circumferential surface of the ball screw nut.

The ball screw allows a smoother rotational-linear motion by rolling the balls, by forms a male ball screw groove in the ball screw shaft, by forming a female ball screw groove in the ball screw nut, and by loading balls between these male and female ball screw grooves. In utilizing such a ball screw, Patent Document 4 discloses e.g. press fitting a rolling bearing on an outer circumferential surface of the ball screw nut.

However, in general ball screw, it needs so-called, a ball returning passage to return balls of the ball screw nut from a rolling end point to a rolling start point of the ball screw nut along a female ball screw groove. The ball returning passage is formed of separate ball returning members inserted from the outer circumferential surface of the ball screw nut to the inner circumferential surface of the ball screw nut in which the female ball screw groove is formed. That is, a through hole to circulate the balls is formed in the nut, and when rolling bearing is press fitted to the ball screw nut in which the through hole is formed in an open manner, compressive stress to the ball screw nut becomes uneven in a circumferential direction with the press fitting. For example, there is some probability of affecting to the inner circumferential surface of the ball screw nut, i.e. circularity of the female ball screw groove.

The sixth embodiment focuses on the above-identified problems, and its object is to provide a ball screw in which a compressive stress of the ball screw nut with press fitting is liable to be equal in a circumferential direction, even when a nut fitted member is press fitted onto the ball screw nut.

In order to solve the above-identified problems, the ball screw of the sixth embodiment includes: balls that are rolling elements; a ball screw shaft having on its outer circumferential surface a male ball screw groove, as a rolling groove into which the balls are loaded; a ball screw nut which has on its outer circumferential surface a female ball screw groove, as a rolling groove, into which the balls are loaded, is fitted onto the ball screw shaft, and of which outer circumferential surface are in a non-through state; a nut fitted member fitted by press fitting onto the outer circumferential surface of the ball screw nut.

Further, interference by press fitting of the nut fitted member and the ball screw nut exceeds 0.02% of the external dimensions of the outer circumferential surface of the nut onto which the nut fitted member is fitted.

Furthermore, interference by press fitting of the nut fitted member and the ball screw nut exceeds 0.02% and less than 0.16% of the external dimensions of the outer circumferential surface of the ball screw nut onto which the fitted member is fitted.

When the nut fitted member is press fitted in the nut, shrink fitting is used which heats the nut fitted member to fit onto the nut.

Further, a circulating groove constituting the ball returning passage is formed on the inner circumferential surface of the ball screw nut.

Furthermore, the nut fitted member is any one of a sleeve, a rolling bearing, and a gear wheel, each having a cylindrical inner circumferential surface, or a combination of them.

According to the ball screw nut according to the sixth embodiment, the nut fitted member is fitted by press fitting onto the outer circumferential surface of the ball screw nut that is fitted onto the ball screw shaft. The inner circumferential surface and the outer circumferential surface of the ball screw nut are in a non-through state. Thus, it is easy to secure the nut fitted member, as well as compressive stress of the ball screw nut with press fitting of the nut fitted member is liable to be equal in a circumferential direction. Moreover, an appropriate compressive force may be applied to the inner circumferential surface of the ball screw nut i.e. to the female ball screw groove, which improves the durability of rolling fatigue of the female ball screw groove of the ball screw nut.

Since the interference by press fitting of the nut fitted member and the ball screw nut exceeds 0.02% of the external dimensions of the outer circumferential surface of the ball screw nut to be fitted onto the nut fitted member, it enables fixing of the nut fitted member by press fitting on the outer circumferential surface of the ball screw nut. Further, as the interference between the nut fitted member and the ball screw nut by press fitting exceeds 0.02% and less than 0.16%, it enables fixing of the nut fitted member by press fitting onto the outer circumferential surface of the ball screw nut, as well as rendering a compressive stress produced in the ball screw nut and the nut fitted member to be a proper one.

Where the nut fitted member is press fitted in the ball screw nut, the increased interference of the nut fitted member and the ball screw nut can be made larger, as shrink fitting is adopted to heat the nut fitted member and to fit it onto the ball screw nut.

Moreover, since the circulating groove constituting the ball returning passage is formed on the inner circumferential surface of the ball screw nut, the inner circumferential surface and the outer circumferential surface of the ball screw nut is liable to be in a non-piercing through state, which easily improves the circularity of the outer circumferential surface of the ball screw nut onto which the nut fitted member is press fitted.

Further, the nut fitted member made of any of a sleeve, a bearing, a gear, each having a cylindrical inner circumferential surface, or combination thereof facilitates the practice of the invention.

An explanation will next be made to an example of the ball screw of a sixth embodiment by referring to drawings.

Figure 40:
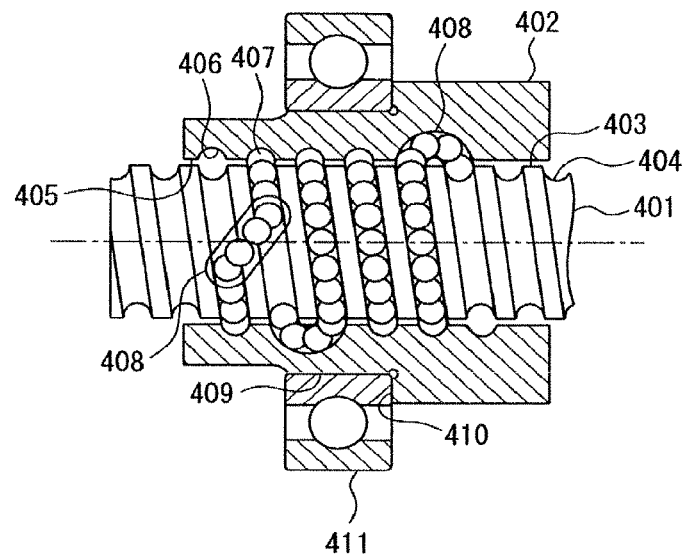
FIG. 40 is a longitudinal sectional view showing a first example of the ball screw of a sixth embodiment.

FIG. 40 is a longitudinal sectional view showing a first example of the ball screw of the sixth embodiment.

Reference Numeral 401 in FIG. 40 denotes a ball screw shaft. A ball screw nut 402 is fitted onto the ball screw shaft 401. On an outer circumferential surface 403 of the ball screw shaft 401, a male ball screw groove 404 is formed. Also, on an inner circumferential surface 405 of the ball screw nut 402, a female ball screw groove 406 is formed. Multiple balls are loaded between the male ball screw groove 404 and the female ball screw groove 406.

Thus, for example, when the ball screw shaft 401 or the ball screw nut 402 rotates, the balls 407 roll in the male ball screw groove 404 and the female ball screw groove 406. Accompanying thereto, the ball screw nut 402 or the ball screw shaft 401 linearly moves. This achieves a smooth rotational-linear motion.

Moreover, in the first example, as is disclosed in Patent Document 3 proposed earlier by the applicant of this invention, a circulating groove 408 constituting the ball returning passage is directly formed by plastic forming on the inner circumferential surface 405 of the ball screw nut 402. The circulating groove 408 is configured of the S-shaped concave formed on the inner circumferential surface 405 of the ball screw nut 402. Accordingly, in the first example, the inner circumferential surface and the outer circumferential surface of the ball screw nut 402 can be put in a non-through state.

Then, in the first example, on a part of the outer circumferential surface of the ball screw nut 402, an outer circumferential surface 409 having high circularity is formed, e.g. by grinding, and in addition, an abutting end face 410 is formed to be adjacent to the outer circumferential surface 409. A rolling bearing 411 is fitted onto the outer circumferential surface 409 as a nut fitted member by press fitting, and positioning is done by abutting an end face of the rolling bearing 411 to the abutting end face 410. An inner circumferential surface of the inner ring of the rolling bearing 411 is typically finished to have high circularity. Therefore, if the circularity of the outer circumferential surface 409 of the ball screw nut 402 is high, the rolling bearing 411 can be press fitted closely in the ball screw nut 402.

In this instance, because the inner circumferential surface 405 and the outer circumferential surface 409 of the ball screw nut 402 are in a non-through state, a compressive stress of the ball screw nut 402 is liable to be equal in a circumferential direction with the press fitting of the rolling bearing 411. In particular, if the circularity of the outer circumferential surface 409 of the ball screw nut 402 is high, the compressive stress of the ball screw nut 402 is roughly equal in a circumferential direction with the press fitting of the rolling bearing 411, as the circularity of the inner circumferential surface of the inner ring of the rolling bearing 411 is high as stated above.

The circularity of the inner circumferential surface of the inner ring of the rolling bearing 411 that is the nut fitted member and that of the outer circumferential surface 409 of the ball screw nut 402 shall be both less than or equal to 10 μm, preferably, be less than or equal to 5 μm, and more preferably be less than or equal to 1 μm. Further, preferably, surface roughness of the inner circumferential surface of an inner ring of the rolling bearing 411 that is the nut fitted member and surface roughness of the outer circumferential surface of the ball screw nut 402 are less than or equal to 3 μmRa, and more preferably be less than or equal to 1 μmRa.

In this way, in the ball screw of the first example, by fitting the rolling bearing 411 that is the nut fitted member onto the outer circumferential surface 409 of the ball screw nut 402 by press fitting, which is fitted by press fitting onto the ball screw shaft 401 and of which inner circumferential surface 405 and outer circumferential surface are in a non-through state, it is easy to fix the rolling bearing, as well as compressive stress of the ball screw nut 402 is liable to be equal with the press fitting of the rolling bearing 411. Moreover, an appropriate compressive stress may be applied to the inner circumferential surface 405 of the ball screw nut 402, i.e. to the female ball screw groove 406. This improves durability of rolling fatigue of the female ball screw groove 406 of the ball screw nut 402.

Further, if the interference of the rolling bearing 411 that is the nut fitted member and the ball screw nut 402 by press fitting exceeds 0.02% of the external dimensions of the outer circumferential surface 409 of the ball screw nut 402 to be fitted onto the rolling beating 411, the rolling bearing 411 can more firmly be fixed by press fitting to the outer circumferential surface 409 of the ball screw nut 402. Furthermore, if the interference between the rolling bearing 411 that is the nut fitted member and the ball screw nut 402 by press fitting is less than 0.16% of the external dimensions of the outer circumferential surface 409 of the ball screw nut 402 to be fitted onto the rolling bearing 411, compressive stress produced in the ball screw nut 402 and the rolling bearing 411 can be made more appropriate. However, when the interference exceeds 0.16%, an excessive tensile stress is liable to be developed in the inner ring of the rolling bearing 411, and thus it is not desirable, as it is very likely to produce a crack in the inner ring.

Preferably, the interference of the rolling bearing 411 that is the nut fitted member and the ball screw nut 402 by press fitting is within a range from 0.05% to 0.15% of the external dimensions of the outer circumferential surface 409 of the ball screw nut 402 to be fitted onto the rolling beating 411. Additionally, it is preferable that when load to be applied to the rolling beating 411 that is the nut fitted member or the ball screw nut 402 is heavy, the interference is within a range from 0.08% to 0.15% of the external dimensions of the outer circumferential surface 409 of the ball screw nut 402 to be fitted onto the rolling bearing 411.

Assuming that the circulating groove 408 constituting the ball returning passage is formed on the inner circumferential surface 405 of the ball screw nut 402, the inner circumferential surface 405 and the outer circumferential surface of the ball screw nut 402 is liable to be in a non-through state. This easily improves circularity of the outer circumferential surface 409 of the ball screw nut 402 onto which the rolling bearing 411 that is the nut fitted member is press fitted. What is more, the rolling bearing 411 may be press fitted to a position corresponding to the circulating groove 408.

Figure 41:
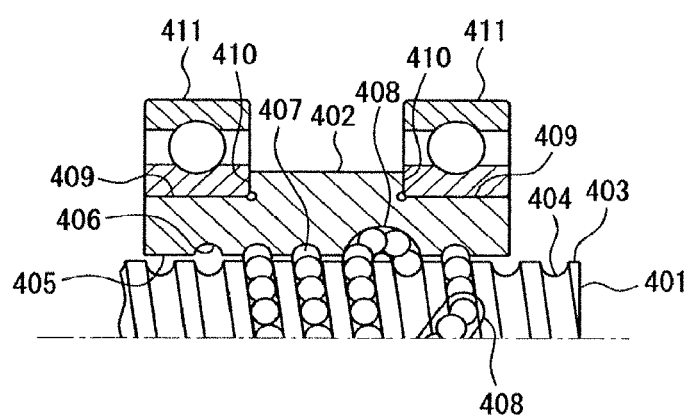
FIG. 41 is a longitudinal sectional view showing a second example of the ball screw of the sixth embodiment.

FIG. 41 is a longitudinal sectional view showing a second example of the ball screw of a sixth embodiment. As a lower half of longitudinal section is symmetric with an upper half thereof, and so its illustration is omitted for brevity's sake. Further, as the construction of the ball screw per se is the same as that in the first example shown in FIG. 40, the same construction is denoted by the same reference numeral, and thus its detailed description is omitted for simplification.

In the second example, as with the first example, the rolling bearing 411 is used for the nut fitted member, the outer circumferential surface 409 for press fitting the rolling bearing 411 is manufactured at the both ends in an axial direction of the ball screw nut 402 with high circularity by cutting process or the like, and a abutting end face 411 is adjacently formed at the inside in an axial direction of these outer circumferential surfaces 409. Then, the rolling bearing 411 is press fitted onto the respective outer circumferential surfaces 409 from the outside in an axial direction.

The details of the circularity, surface roughness, and interference of the both when the rolling bearing 411 that is the nut fitted member is press fitted onto the outer circumferential surface of the ball screw nut 402 are the same as those in the first example. It is noted that when the rolling bearing 411 is press fitted onto the outer circumferential surface 409 of the ball screw nut 402, different parameters of these rolling bearings 411 may be taken. Also, the rolling bearing 411 may employ various bearings, such as a roller bearing, apart from the illustrated ball bearing.

Figure 42:
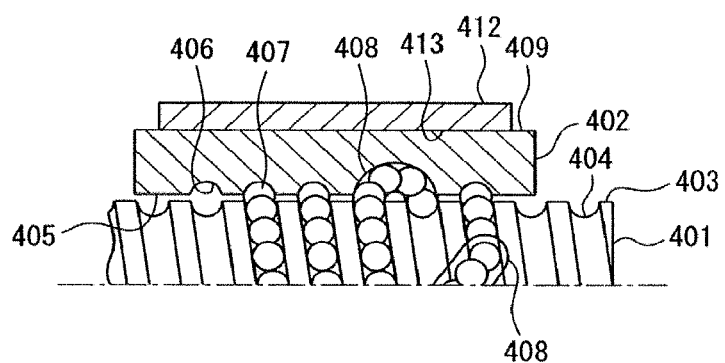
FIG. 42 is a longitudinal sectional view showing a third example of the ball screw of the sixth embodiment.

FIG. 42 is a longitudinal sectional view showing a third example of the ball bearing of the sixth embodiment. As a lower half of the longitudinal section is symmetric with an upper half thereof, and so its illustration is omitted for brevity's sake. Further, as the construction of the ball screw per se is the same as that in the first example shown in FIG. 40, the same construction is denoted by the same reference numeral, and thus its detailed description is omitted for simplification.

In the third example, a sleeve 412 is used for the nut fitted member. Here, assume that an inner circumferential surface 413 of the sleeve 412 has the same diameter throughout the length in an axial direction, and that an outer circumferential surface 409 of the ball screw nut 402 onto which the inner circumferential surface 413 of the sleeve 412 is fitted also has the same diameter throughout the length in an axial direction. The outer circumferential surface 409 for press fitting the sleeve 412 is formed by grinding, etc., with high circularity throughout the length in an axial direction of the ball screw nut 402, the inner circumferential surface 413 of the sleeve 412 is also formed by grinding with high circularity, and the sleeve 412 is press fitted onto the outer circumferential surface 409 of the ball screw nut 402 from one side in an axial direction.

When the sleeve 412 that is the nut fitted member is press fitted into the outer circumferential surface 409 of the ball screw nut 402, the details of the circularity, surface roughness, and interference of the sleeve 412 and the outer circumferential surface 409 are the same as those of the rolling bearing 411 in the first example. Where the sleeve 412 is press fitted onto the outer circumferential surface 409 of the ball screw nut 402, as the nut fitted member, the thickness of the ball screw nut 402 may be thinned as an outer circumference of the ball screw nut 402 may be reinforced with the sleeve 412. In addition to this, if it succeeds in thinning the thickness of the ball screw nut 402, it has the merit of facilitating plastic working of the circulating groove 408 formed, e.g. of the S-shaped concave.

When the sleeve 412 that is the nut fitted member is press fitted in the ball screw nut 402, adopting shrinkage fitting in which the sleeve 412 is fitted onto the ball screw nut 402 after heating the sleeve 412 to expand an inner diameter thereof brings about increased interference by press fitting of the both.

Figure 43:
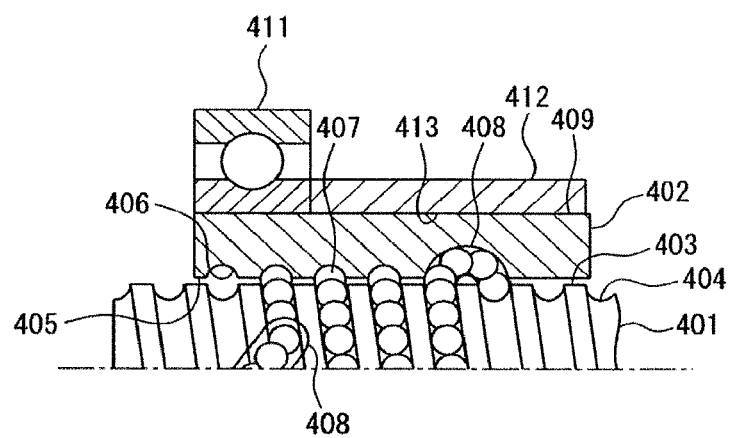
FIG. 43 is a longitudinal sectional view showing a fourth example of the ball screw of the sixth embodiment.

FIG. 43 is a longitudinal sectional view showing a fourth example of the ball screw of the sixth embodiment. As a lower half of longitudinal section is symmetric with an upper half thereof, and so its illustration is omitted for brevity's sake. Further, as the construction of the ball screw per se is the same as that in the first example shown in FIG. 40, the same construction is denoted by the same reference numeral, and thus its detailed description is omitted for simplification.

In the fourth example, the sleeve 412 and the rolling bearing 411 are utilized for the nut fitted member. The inner circumferential surface 413 of the sleeve 412 has the same diameter throughout the length in an axial length matching with the inner circumferential surface of an inner ring of the rolling bearing 411, and that of the outer circumferential surface 409 of the ball screw nut 402 onto which an inner ring of the rolling bearing 411 and the inner circumferential surface 413 of the sleeve 412 are fitted has the same diameter throughout the length in an axial direction. The outer circumferential surface 409 for press fitting the sleeve 412 is formed by grinding, etc., with high circularity throughout the length in an axial direction, and the inner circumferential surface 413 of the sleeve 412 is also formed by grinding, etc., with high circularity. Subsequently, the sleeve 412 is press fitted onto the outer circumferential surface 409 of the ball screw nut 402 from one side in an axial direction, and the rolling bearing 411 is press fitted onto the outer circumferential surface 409 of the ball screw nut 402 from the other side in an axial direction, and an end face of the rolling bearing 411 is abutted to an end face in an axial direction of the sleeve 412.

When the sleeve 412 that is the nut fitted member is press fitted into the outer circumferential surface 409 of the ball screw nut 402, the details of the circularity, surface roughness, and interference of the sleeve 412 and the outer circumferential surface 409 are the same as those of the rolling bearing 411 in the first example. Also, a merit and a press fitting method in a case where the sleeve 412, as a nut fitted member, is press fitted onto the outer circumferential surface 409 of the ball screw nut 402 are the same as those in the third example.

Where the circularity, the surface roughness, and the interference associated with the press fitting of the rolling bearing 411 and the ball screw nut 402 are identical with those of the sleeve 412 and the ball screw nut 402, compressive stress of the ball screw nut 402 where the both are press fitted may be equalized by equalizing the thickness of the sleeve 412 and that of the rolling bearing 411.

Figure 44:
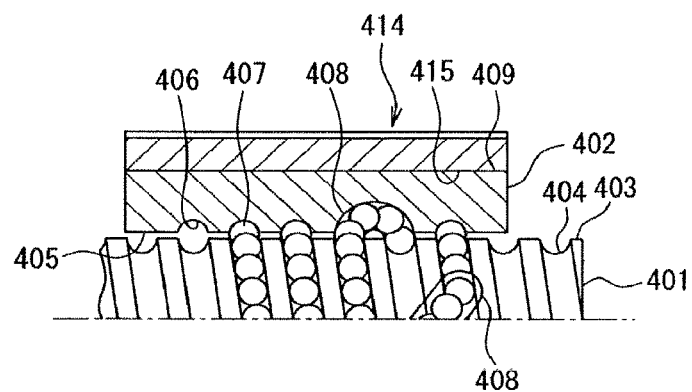
FIG. 44 is a longitudinal sectional view showing a fifth example of the ball screw of the sixth embodiment.

FIG. 44 is a longitudinal sectional view showing a fifth example of the ball screw of the sixth embodiment. As a lower half of longitudinal section is symmetric with an upper half thereof, and so its illustration is omitted for brevity's sake. Further, as the construction of the ball screw per se is the same as that in the first example shown in FIG. 40, the same construction is denoted by the same reference numeral, and thus its detailed description is omitted for simplification.

In the fifth embodiment, a gear 414 is used for the nut fitted member. The gear 414 in the fifth example is one in which teeth are formed throughout the length in an axial direction on the outer circumferential surface of a sleeve-shaped cylinder. It is configured such that the inner circumferential surface 415 of the cylinder of the gear 414 has the same diameter throughout the length in an axial direction, and the outer circumferential surface 409 of the ball screw nut 402 onto which the inner circumferential surface 415 of the gear 414 is fitted has the same diameter throughout the length in an axial direction. The outer circumferential surface 409 to press fit the gear 414 is formed by grinding, etc., with high circularity throughout the length in an axial direction of the ball screw nut 402, the inner circumferential surface 415 of the gear 414 is also formed by grinding with high circularity, and the gear 414 is press fitted on the outer circumferential surface 409 of the ball screw nut 402 from one side in an axial direction.

When the gear 414 that is the nut fitted member is press fitted into the outer circumferential surface 409 of the ball screw nut 402, the details of the circularity, surface roughness, and interference of the gear 414 and the outer circumferential surface 409 are the same as those of the rolling bearing 411 in the first example, when the gear 414 is press fitted onto the outer circumferential surface 409 of the ball screw nut 402. In this connection, a spline and a serration may be applied to the gear 414, in addition to the spur gear and a helical gear.

Figure 45:
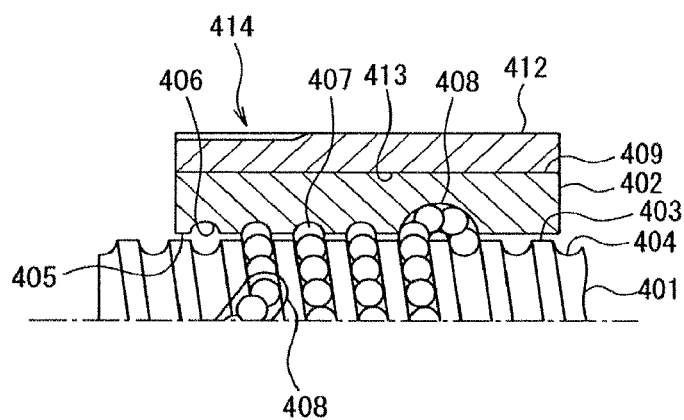
FIG. 45 is a longitudinal sectional view showing a sixth example of the ball screw of the sixth embodiment.

FIG. 45 is a longitudinal sectional view showing a sixth example of the ball screw of the sixth embodiment. As a lower half of the longitudinal section is symmetric with an upper half thereof, and so its illustration is omitted for brevity's sake. Further, as the construction of the ball screw per se is the same as that in the first example shown in FIG. 40, the same construction is denoted by the same reference numeral, and thus its detailed description is omitted for simplification.

In the sixth example, as with the foregoing third example, whereas the sleeve 412 is used for the nut fitted member, in the sleeve 412 of the sixth example, the gear 414 is formed at an end of in an axial direction of the outer circumferential surface of the cylinder. The inner circumferential surface 413 of the sleeve 412 with the gear 414 has the same diameter throughout the length in an axial direction, and the outer circumferential surface 409 of the ball screw nut 402 onto which the inner circumferential surface 413 of the sleeve 412 is fitted also has the same diameter throughout the length in an axial direction. Subsequently, the outer circumferential surface 409 for press fitting the sleeve 412 is formed by grinding, etc., with high circularity throughout the length in an axial direction of the ball screw nut 402, the inner circumferential surface 413 of the sleeve 412 is also formed by grinding, etc., with high circularity, and the sleeve 412 is press fitted onto the outer circumferential surface 409 of the ball screw nut 402 from one side in an axial direction.

The details of the circularity, surface roughness, and interference of the sleeve 412 that is the nut fitted member and the ball screw nut 402 are the same as those of the rolling bearing 411 in the first example, when the sleeve 412 is press fitted onto the outer circumferential surface 409 of the ball screw nut 402. In this connection, a spline and a serration may be applied to the gear 414, in addition to a spur gear and a helical gear.

Materials of the ball screw nut 402 in the aforementioned respective examples, carbon steel, bearing steel, stainless steel, etc., may be applied. Further, similar materials may be applied to the rolling bearing 411, the sleeve 412, and the gear 414 which are press fitted onto the ball screw nut 402. Moreover, it is preferable that these members should be hardened by a proper heat treatment at least to a pressed fitted portion.

Further, in the ball screws in the aforementioned respective example, as there can be a case where an inner diameter of the inner circumferential surface 405 of the ball screw nut 402 may become smaller due to the press fitting of the nut fitted member, it is preferable that an inner gap of the ball screw should be set in expectation of this situation.

Seventh Embodiment

The seventh embodiment is directed to a ball screw in which balls are loaded between a ball screw shaft and a ball screw nut, and is especially suited for a ball screw in which a concave defining the circulating groove formed on the inner circumferential surface of the ball screw nut.

In the ball screw, a male screw groove is formed in the ball screw shaft, a female ball screw groove is formed in the ball screw nut, and balls are loaded between these male and female ball screw grooves, thereby allowing a smooth rotational-linear motion by rolling the balls. On the occasion of using such a ball screw, e.g. there is disclosed, in Patent Document 5, fitting and installing a plastic gear that is a separate component on the outer circumferential surface of the ball screw nut.

However, when the nut fitted member such as the gear is fitted and installed on the outer circumferential surface of the ball screw nut, it is crucial for control fitting accuracy of the both, but there is a drawback in that it requires much care for working and assembly.

The seventh embodiment is devised focusing on the above-identified problems, and its object is to provide a ball screw able to easily fit the nut fitted member onto the outer circumferential surface of the ball screw nut, and to fix the member.

To solve the above-identified problems, the inventors of this invention have developed the seventh embodiment, as a result of the extensive studies, after having been obtained knowledge thereof. If it is possible to form the nut fitted member to be fitted by insert molding, such as a gear on the outer circumferential surface of the ball screw nut by insert molding, the embodiment can save labor for working and assembly. The insert molding is provided for casting it in a die. In this case, the nut fitted member is integrally formed with the ball screw nut by previously enclosing the ball screw nut therein, and by injecting resin into the die.

However, in the typical ball screw, it is necessary to provide, so-called, the ball returning passage which returns balls rolling e.g. along the female ball screw groove, from a rolling end point to a rolling start point of the ball screw nut. The ball returning passage is made of a separate ball circulating member inserted from the outer circumferential surface of the ball screw nut to the inner circumferential surface of the ball screw nut where the female ball screw groove is provided. Namely, a through hole to circulate the balls is formed in the ball screw nut. When a resin is injected on the outer circumferential surface of the ball screw nut in which the through hole is formed, an injection molding pressure comes out through the through hole, which precludes insert molding.

On the contrary, in the ball screw disclosed in Patent Document 3 proposed by the applicant of this invention, the circulating groove constituting the ball returning passage is directly formed by plastic working on the inner circumferential surface of the ball screw nut. Since the circulating groove is formed of an S-shaped concave formed on the inner circumferential surface of the ball screw nut, the inner circumferential surface and the outer circumferential surface of the ball screw nut are in a non-through state. Thus, as long as the ball screw nut in which such an inner circumferential surface and the outer circumferential surface of this kind are in a non-through state, the nut fitted member can be manufactured by insert molding.

The ball screw according to the seventh embodiment includes: balls that are rolling elements; the ball screw shaft having on its outer circumferential surface a male ball screw groove into which the balls are received, as the rolling groove; the ball screw nut having on its inner circumferential surface a female ball screw groove, as a rolling groove, into which the balls are received, being fitted onto the ball screw shaft, the inner circumferential surface and the outer circumferential surface being in a non-through state; and a nut fitted member provided by insert molding on the outer circumferential surface of the ball screw nut.

Further, a circulating groove constituting the ball returning passage is formed on the inner circumferential surface of the ball screw nut.

Moreover, the nut fitted member is provided by insert molding on an outer circumferential surface of the ball screw nut so as to cover a concave on the outer circumferential surface of the ball screw nut produced with the formation of the circulating groove.

The nut fitted member is either of or both of the sleeves or the gear with a cylindrical inner circumferential surface.

According to the ball screw of the seventh embodiment, since the nut fitted member is fitted by insert molding onto the outer circumferential surface of the ball screw shaft of which inner circumferential surface and outer circumferential surface are in a non-through state, the nut fitted member is integrally formed to be fitted onto the outer circumferential surface of the ball screw nut, without injection pressure escaping, thereby realizing easy fixation of the nut fitted member.

Further, forming the circulating groove constituting the ball returning passage on the inner circumferential surface of the ball screw nut facilitates putting the inner circumferential surface and the outer circumferential surface of the ball screw nut into a non-through state.

Furthermore, by providing the nut fitted member by insert molding on the outer circumferential surface of the ball screw nut so as to cover a concave on the outer circumferential surface of the ball screw nut produced with the formation of the circulating groove, the nut fitted member and the concave are locked to each other, and it facilitates fixation of the nut fitted member to the ball screw nut.

Moreover, constituting the nut fitted member by either of or both of the sleeve and the gear having a cylindrical inner circumferential surface facilitates to practice.

Figure 46:
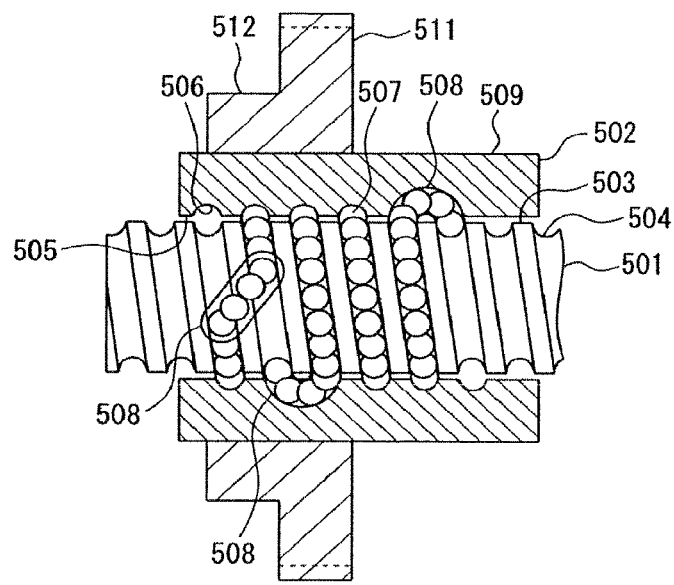
FIG. 46 is a longitudinal sectional view showing a first example of the ball screw of a seventh embodiment.

An explanation will next be made to an embodiment of the ball screw of a seventh embodiment by referring to drawings. FIG. 46 is a longitudinal sectional view showing a first example of the ball screw of the seventh embodiment.

Reference numeral 501 in FIG. 46 is a ball screw shaft. A ball screw nut 502 is fitted onto the ball screw shaft 501. A male ball screw groove 504 is formed on the outer circumferential surface of the ball screw shaft 51. Moreover, a female ball screw groove 506 is formed on the inner circumferential surface 505 of the ball screw nut 502. Multiple balls are loaded between the male ball screw groove 504 and the female ball screw groove 506. Accordingly, e.g. when the ball screw shaft 501 or the ball screw nut 502 rotates, the balls 507 roll through within the male ball screw groove 504 and the female ball screw groove 506, and the ball screw nut 502 or the ball screw shaft 501 linearly moves together therewith. This achieves a smooth rotational-linear motion.

Additionally, in the first example, as is disclosed in Patent Document 3 proposed by the applicant of this invention, the circulating groove 508 constituting the ball returning passage is directly formed by plastic working on the inner circumferential surface 505 of the ball screw nut 502. The circulating groove 508 is formed of an S-shaped concave formed on the inner circumferential surface 505 of the ball screw nut 502. Thus, in the first example, it enables putting the inner circumferential surface 505 and the outer circumferential surface 609 of the ball screw nut 502 into a non-through state.

In the first example, a gear 511 integrated with a sleeve-like gear base 512 is formed to be fitted, as a nut fitted member, by insert molding, on the outer circumferential surface 509 of the ball screw nut 502. The insert molding is, as described above, a subject to be casted into a die, in this case, the ball screw nut 502 is enclosed in the die, and the resin is injected into the die. Then, the gear 511 and the gear base 512 that are the nut fitted member are integrally formed to be fitted onto the ball screw nut 502.

Since the ball screw nut 502 of the ball screw in the first example is, as previously discussed, in an non-through state between the inner circumferential surface 505 and the outer circumferential surface 509, even by injection molding the gear 511 and the gear base 512 on the outer circumferential surface 509 of the ball screw nut 502, it is clear of worry about coming out injection pressure even by insert molding. This integrally and firmly form and fit them onto the outer circumferential surface 509 of the ball screw nut 502.

In this manner, in the ball screw of the first example, the rolling bearing 511 that is the nut fitted member is formed to be fitted by insert molding onto the outer circumferential surface 509 of the ball screw nut 502 which is fitted onto the ball screw shaft 501 and of which inner circumferential surface 505 and the outer circumferential surface are in a non-through state. Thereby, the gear 511 and the gear base 512 that are nut fitted member are integrally formed to be fitted onto the outer circumferential surface of the ball screw nut 502, which easily fixes the gear 511 and the gear base 512.

Furthermore, by forming the circulating groove 508 constituting the ball returning passage on the inner circumferential surface 505 of the ball screw nut 502, the inner circumferential surface 505 and the outer circumferential surface 509 of the ball screw nut 502 are liable to be in a non-through state.

Figure 47:
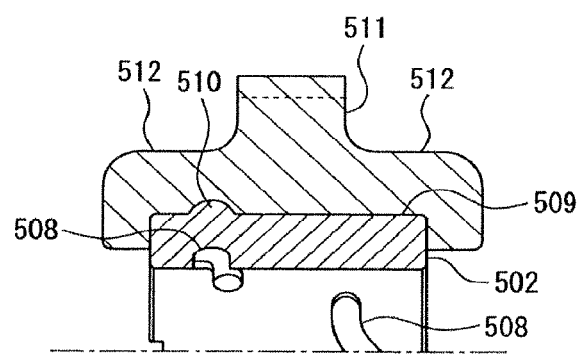
FIG. 47 is a longitudinal sectional view showing a second example of the ball screw of the seventh embodiment.
Figure 48A:
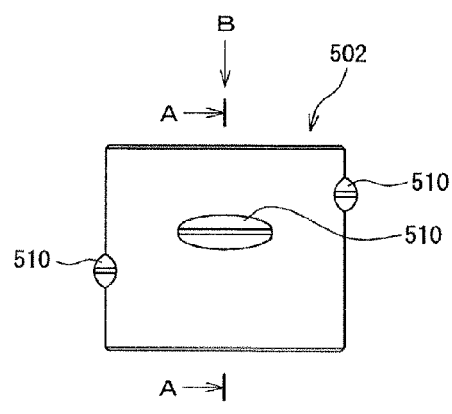
FIGS. 48A and 48B are views of a ball screw nut used in the ball screw shown in FIG. 47.
Figure 48B:
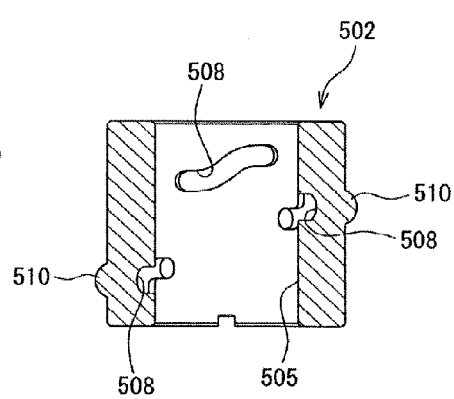
Figure 48C:
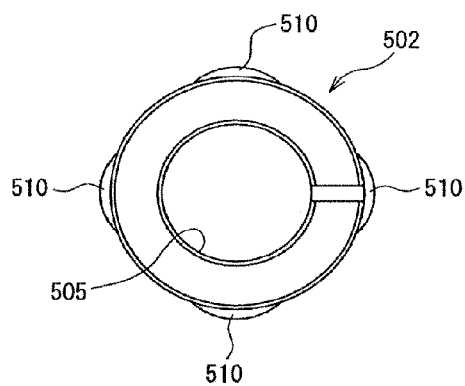
FIGS. 48C and 48D are perspective views of a ball screw nut used in the ball screw shown in FIGS. 48A and 48B.
Figure 48D:
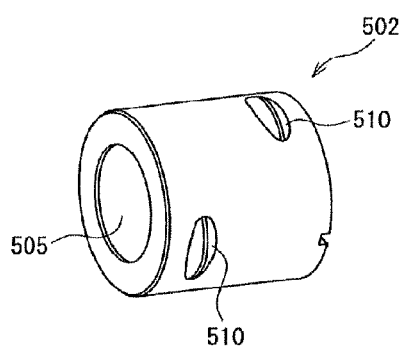

FIG. 47 is a longitudinal sectional view showing a second example of the ball screw of the seventh embodiment. A lower half of the longitudinal section is identical with that of the upper half thereof, and hence its illustration is omitted for simplification. Whereas the ball screw nut 502 shows a state where the female ball screw groove is not formed on the inner circumferential surface 505, a construction of the ball screw nut 502 per se is the same as that shown in FIG. 46 of the first example. Thus, the same construction is denoted by the same reference numeral, and so its detailed description is omitted for brevity's sake.

The second example, as with the first example, is to integrally form and fit by insert molding the sleeve-like gear base 512 and the gear 511 onto the outer circumferential surface 509 of the ball screw nut 502. Besides, in the second example, a convex 510 is previously provided on the outer circumferential surface of the ball screw nut 502. The convex 510 is, as shown in FIG. 48, produced at the time the circulating groove 508 is formed by plastic working on the inner circumferential surface 505 of the ball screw nut 502.

The circulating groove 508 in the second example inserts e.g. a die for pressing forming of the circulating groove 508 in the inner circumferential surface 505 of a material (blank) of the ball screw nut 502. After that, when a bar having a cum face is e.g. pushed inside of the die, a slide protrusion member slidably attached in the die presses the inner circumferential surface 505 of the ball screw nut 502, and presses the inner circumferential surface 505 of the ball screw nut 502 with that pressing force to form by plastic deformation the circulating groove 508. With the pressing forming of the circulating groove 508, a material of the ball screw nut 502 swells out outward, and expands as the convex 510 on the outer circumferential surface 509.

The gear base 512 and the gear 511 that are the nut fitted member are provided by insert molding on the outer circumferential surface 509 of the ball screw nut 502 produced with the formation of the circulating groove 508 like this, so as to cover the convex 510 of the outer circumferential surface 509 of the ball screw nut 502. Thereby, the gear base 512 and the gear 511 and convex 510 are locked to restrain a movement of them in an axial direction of them, which provides an easier way of fixing the gear base 512 and the gear 511 to the ball screw nut 502.

Further, by forming to fit onto by insert molding the gear base 512 so as to cover the both end faces in an axial direction of the ball screw nut 502, a movement of the gear base 512 and the gear 511 in an axial direction are restrained, thereby firmly fixing the gear base 512 and the gear 611 to the outer circumferential surface of the ball screw nut 502.

Figure 49:
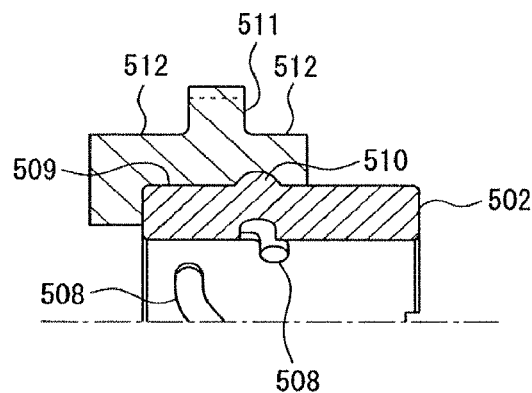
FIG. 49 is a longitudinal sectional view showing a third example of the ball screw of the seventh embodiment.

FIG. 49 is a longitudinal sectional view showing a third example of the ball screw of the seventh embodiment. A lower half of the longitudinal section is identical with that of the upper half thereof, and hence its illustration is omitted for simplification. Whereas the ball screw nut 502 shows a state where the female ball screw groove is not formed on the inner circumferential surface 505, a construction of the ball screw nut 502 per se is the same as that shown in FIG. 46 of the first example. Thus, the same construction is denoted by the same reference numeral, and so its detailed description is omitted for brevity's sake.

In the third example, as with the first example, the gear base 512 and the gear 511 are integrally formed to be fitted by insert molding onto the outer circumferential surface 509 of the ball screw nut 502. The convex 510 is previously provided, as with the second example, on the outer circumferential surface of the ball screw nut 502 in the third example. The reason why the convex 510 is provided is the same as that of the second example.

In the third example, the gear base 512 acting as a base of the gear 511 is set to a portion covering the convex 510 from an illustrated left end face of the ball screw nut 502. Covering in this manner by the gear base 512 either of an end face of the ball screw nut 502, and either of the convex 510, restrains, as with the second example, a movement in an axial direction of the gear base 512 and the gear 511, which provides a more further easy way of fixing the gear base 512 and the gear 511 to the ball screw nut 502.

Figure 50:
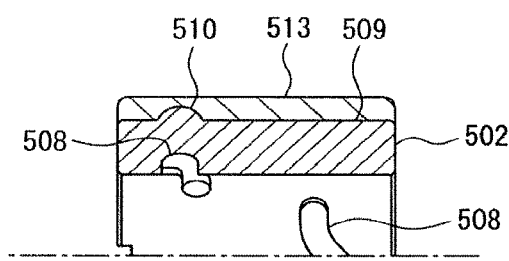
FIG. 50 is a longitudinal sectional view showing a fourth example of the ball screw of a seventh embodiment.

FIG. 50 is a longitudinal sectional view showing a fourth example of the ball screw of the seventh embodiment. A lower half of the longitudinal section is identical with that of the upper half thereof, and hence its illustration is omitted for simplification. Whereas the ball screw nut 502 shows a state where the female ball screw groove is not formed on the inner circumferential surface 505, a construction of the ball screw nut 502 per se is the same as that shown in FIG. 46 of the first example. Thus, the same construction is denoted by the same reference numeral, and so its detailed description is omitted for brevity's sake. Also, on the outer circumferential surface of the ball screw nut 502 in the fourth example, the convex 510 is previously provided as with the second example. The reason why the convex 510 is provided is the same as that of the second example.

In the fourth example, the sleeve 513 is integrally formed to be fitted as the nut fitted member by insert molding onto the outer circumferential surface 509 of the ball screw nut 502. The length in an axial direction of the sleeve 513 is reconciled with that of the ball screw nut 502. In this way, by integrally forming to fit the sleeve 513 onto the outer circumferential surface 509 of the ball screw nut 502, the outer circumferential surface of the ball screw nut 502 (to be exact, the outer circumferential surface of the sleeve 513) may be formed into a circle having the same diameter, e.g. without removing the convex 510 by grinding and cutting. If the outer circumferential surface of the ball screw nut 502 (sleeve 513) may be formed into a circle having the same diameter, a bearing, a gear, or the like are easily to be fitted onto its outer circumferential surface thereof. In this occasion, manufacturing the sleeve 513 with relatively hard resin realizes proper fitting of the bearing and the gear. As an alternative, the outer circumferential surface of the sleeve 513 is not necessarily limited to a circle, instead it may be formed into a polygon. Additionally, it is also possible to take a key seat, an encoder, a flange, and another shape such as an ellipse.

Figure 51:
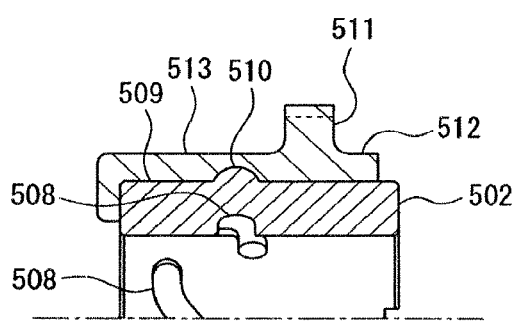
FIG. 51 is a longitudinal sectional view showing a fifth example of a ball screw of the seventh embodiment.

FIG. 51 is a longitudinal sectional view showing a fifth example of the ball screw of the seventh embodiment. A lower half of the longitudinal section is identical with that of the upper half thereof, and hence its illustration is omitted for simplification. Whereas the ball screw nut 502 shows a state where the female ball screw groove is not formed on the inner circumferential surface 505, a construction of the ball screw nut 502 per se is the same as that shown in FIG. 46 of the first example. Thus, the same construction is denoted by the same reference numeral, and so its detailed description is omitted for brevity's sake. Also, on the outer circumferential surface of the ball screw nut 502 in the fifth example, the convex 510 is previously provided as with the second example. The reason why the convex 510 is provided is the same as that of the second example.

In the fifth example, the sleeve 513 and the gear 511 are integrally formed to be fitted as the nut fitted member by insert molding onto the outer circumferential surface 509 of the ball screw nut 502. The length in an axial direction of the sleeve 513 is set to one which is enough to cover the illustrated left end face of the ball screw nut 502 and does not reach an illustrated right end face. Further, the thickness in a radial direction of the sleeve 513 is set to one enough to cover the convex 510. In this manner, by integrally formed to fit the sleeve 513 onto the outer circumferential surface 509 of the ball screw nut 502, as with the fourth example, the outer circumferential surface (to be exact, the outer circumferential surface of the sleeve 513) of the ball screw nut 502 may be formed into a circle having the same diameter, e.g. without removing the convex 510 by grinding and cutting.

As materials of the ball screw nut 502 in each example of the above-mentioned seventh embodiment, carbon steel, bearing steel, stainless steel, etc., may be applied. Further, the nut fitted member such as the gear 511 and the sleeve 513 formed to be fitted by insert molding onto the outer circumferential surface of the ball screw nut 502 is desirable to use thermoplastic resin suitable for injection molding. Instead, materials may be available, in which filler and fiber reinforcement are mixed into the thermoplastic resin. As ideal resin materials, polyamide, polyphenylene sulfide, polyimide, polyether ether ketone, fluororesin, etc. may be employed. Further, Ideal fiber reinforcements include glass fiber and carbon fiber.

Preferably, materials may be employed in which glass fiber and the carbon fiber are mixed into polyamide and polyphenylene sulfide resin so as to have percentage content of 5 to 50 percent by weight. In particular, where teeth of the gear is formed and it is taken as a fitted surface, percentage content of the glass fiber and the carbon fiber is ranging from 20 to 50 percent by weight. More preferably, it is ranging from 30 to 50 percent by weight. When percentage content of the glass fiber and the carbon fiber are less than or equal to 20 percent by weight, it is likely to be insufficient strength as teeth of the gear. Moreover, when percentage content is more than or equal to 50 percent by mass, it faces difficulties for injection molding.

In each example of the seventh embodiment, because, as previously discussed, the inner circumferential surface 505 and the outer circumferential surface 509 of the ball screw nut 502 are in a non-through state, it enables working at relatively high injection molding pressure. Therefore, this enhances percentage content of reinforcing filler such as glass fiber and carbon fiber, which manufactures more firm resin product such as the gear. For example, when the gear is formed, it is most desirable for the reinforcing filler to be 40 to 50 percent by mass. Further, as it is allowed to increase the injection molding pressure, good fluidity of resin is ensured, despite of the existence of plural convexes 510, thereby filling resin without gaps.

In the second to fifth examples, while the convex of the outer circumferential surface 509 of the ball screw nut 502 produced during the formation of the circulating groove 508 is utilized as a locking portion of the nut fitted member, such as the gear 511 and the sleeve 513, e.g. a groove or a key seat may previously be formed by knurling on the outer circumferential surface 509 of the ball screw nut 502, and may be used it as a rotation stopper for the nut fitted member.

Further, the nut fitted member to be fitted by insert molding onto the outer circumferential surface of the ball screw nut 502 may be anything, as far as it can be manufactured e.g. by insert molding on the outer circumferential surface of the ball screw nut 502, in addition to the each example. Additionally, it is also possible that the nut fitted member manufactured by insert molding is formed in a post processing into a desired shape.

It is noted that the ball screw shown in each example of the second to the seventh embodiments may be applied to the ball screw illustrated in the first embodiment.

Figure 52:
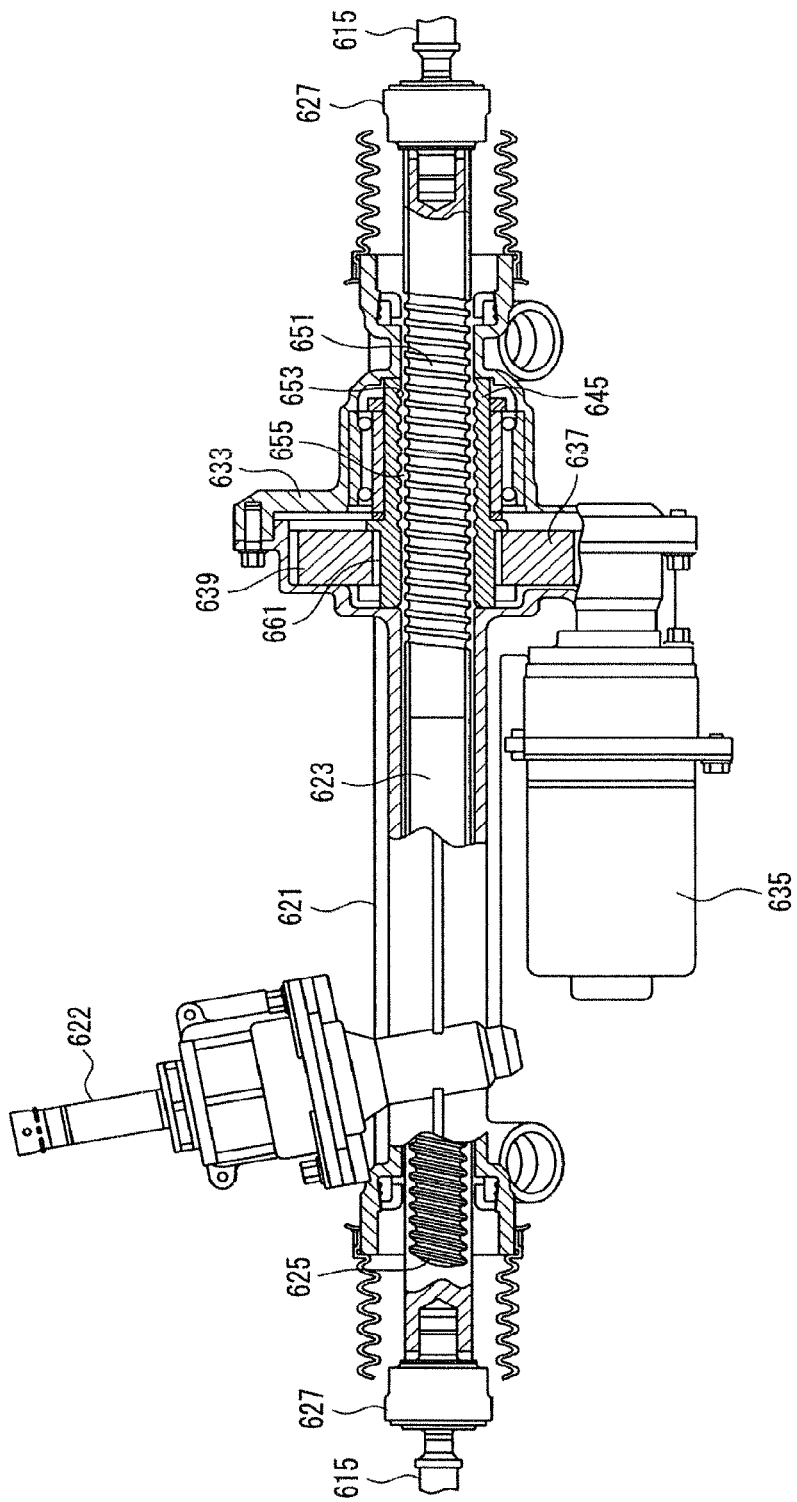
FIG. 52 is a partial sectional view of a steering gear of an electric steering device.

The ball screw illustrated in the first to the seventh embodiments may preferably be applied to an electric steering device (especially, a rack-type electric power steering device). FIG. 52 is a partial cross-sectional view of a steering gear of the electric power steering device.

In FIG. 52, within a rack and a pinion housing 621 constituting a steering gear case, a rack shaft 623 and a pinion (not shown) constituting the rack and pinion mechanism are installed thereinto, and the pinion is connected to a lower shaft 622. The rack shaft 623 has a rack 625 provided at left in FIG. 52 to be meshed with the pinion, as well as a spherical joint 627 swingably supporting a tie rod 615 is fixed at the both ends. A screw shaft of the ball screw is used for the rack shaft 623.

At the illustrated right end of the rack and pinion housing 621, a ball screw housing 633 is mounted. In the ball screw housing 633, a front end of the electric motor 635 is fixed by bolting to a lower portion thereof, as well as a driving gear 637 fixed to a shaft of the electric motor 635 and a driven gear 639 to be meshed with the driving gear 637 are housed therein. Also, in the ball screw housing 633, a ball nut 645 is rotatably held via a double row angular contact ball bearing.

The ball nut 645 is received in an inner diameter of the driven gear 639. Between an inner diameter side of shaft center of the driven gear 639 and at an outer diameter side of the ball nut 645, there is provided a spline fitting portion 661. Thereby, the driven gear 639 and the ball nut 645 may freely be slide relatively.

At the illustrated right side of the rack shaft 623, a male ball screw groove (threaded portion) 651 is formed. On the other hand, a female ball groove 653 is formed, and between a male ball groove 651 and the female ball groove 653, a large number of steel balls 655 constituting circulating balls are loaded. Also, in the ball nut 645, a circulating groove (not shown) to circulate the steel balls 655 are formed.

In the electric power steering device, when a steering wheel is steered by a driver, a steering force is transmitted from the lower shaft 622 to the pinion, a rack shaft 623 moves in an either left or a right direction in FIG. 52 with the rank 625 to be meshed with it, and a wheel is steered through right and left tie rods. At the same time, based on an output from a steering torque sensor (not shown), the electric motor 635 rotates with prescribed rotating toque in a forward or a reverse direction. Rotating torque is transmitted via the driving gear 637 and the driven gear 639 to the ball nut 645. Then, by rotating the ball nut 456, a thrust force is acted to the male ball groove 651 of the rack shaft 623 via the steal balls 655 to be engaged into the female ball screw groove 653, thereby exerting a steering assist torque.

REFERENCE SIGNS LIST

1: ball screw
2: screw shaft
3: screw groove
5: nut
5a: screw groove
7: ball rolling passage
9: ball
11: ball circulating passage
13: flange
15: teeth train for a gear
17: encoder
20: steel material
21: blank
22: concaved groove
31: key
33: bevel gear
35: detent
37: screw (external screw)
39: circumferential groove
41: rotor motor
43: inner ring
44: outer ring
45: roller
46: rolling bearing
47: cam face
48: one-way clutch
101: nut blank
111: inner circumferential surface of nut blank
111a: circle defining an inner circumferential surface of nut blank
115: S-shaped concave (concave constituting ball returning passage)
115a: S-shaped concave (concave constituting ball returning passage)
115b: S-shaped concave (concave constituting ball returning passage)
116: concave
117: concave
118: tapered surface
102: blank holder
121: concave (restraining member)
121a: recess
121b: recess
121c: recess
121d: Circumferential groove (recess)
122: lid member (restraining member)
103: cam slider
103A: cam slider
133: slope of cam slider (cam mechanism)
135: S-shaped convex
136: stopper forming convex
104: cam driver
141: slanted side face of cam slider (cam mechanism)
142: circumferential side
105A: cam slider
105B: cam slider
153: slope of cam slider (cam mechanism)
155a: S-shaped convex
155b: S-shaped convex
156: stopper forming convex
106: cam driver
161a: slope of cam driver (cam mechanism)
161b: slope of cam driver (cam mechanism
162: base
107A, 107B: cam slider
173: slope of cam slider (cam mechanism)
175a: S-shaped convex
175b: S-shaped convex
108: cam driver
181: slope
181a: slope of cam driver (cam mechanism)
161b: slope of cam driver (cam mechanism)
182: base
182a: tapered surface
191: stopper (projection)
192: stopper (projection)

193: stopper (projection)
194: flange (projection)
201: nut blank
211: inner circumferential surface of nut blank
212A to 212D: S-shaped concave
213: outer circumferential surface of nut blank
214: upper end face of nut blank
214A to 214D: convex
215: lower end face of nut blank
215A to 215D: convex
202: cam driver
221: base
222; body
222a to 222b: slanted slope (can mechanism)
203A to 203D: cam slider
231: outer circumferential surface of cam slider
233: slope of cam slider (cam mechanism)
235A to 235D: S-shaped convex
204: stand
241: concave
242a to 242d: recess
205: restraining member
251 to 254: split of restraining member
251a to 254a: large-diameter portion of inner circumferential surface of restraining member
251b to 254b: small-diameter portion of inner circumferential surface of restraining member
251c to 254c: surface restraining upper end face of nut blank
251d to 254d: recess
206: outer member
261: inner circumferential surface
401: ball screw shaft
402: ball screw nut
403: outer circumferential surface
404: male ball screw groove
405: inner circumferential surface
406: female ball screw groove
407: ball
408: circulating groove
409: outer circumferential surface
410: abutting end face
411: rolling bearing (nut fitted member)
412: sleeve (nut fitted member)
413: inner circumferential surface
414: gear (nut fitted member)
415: inner circumferential surface
501: ball screw shaft
502: ball screw nut
502: outer circumferential surface
504: male ball screw groove
505: inner circumferential surface
506: female ball screw groove
507: ball
508: circulating groove
509: outer circumferential surface (nut fitted member)
510: convex
511: gear (nut fitted member)
512: gear base (nut fitted member)
513: sleeve (nut fitted member)

The invention claimed is:

1. A manufacturing method of a ball screw, the ball screw including a screw shaft having on an outer circumferential surface a spiral screw groove, a nut having on its first inner circumferential surface a screw groove facing the screw groove of the screw shaft, a plurality of balls rollably loaded in a spiral ball rolling passage formed by the both screw grooves, and a ball circulating passage to return the balls from an end point to a start point of the ball rolling passage for circulating the balls, the manufacturing method comprising:

forming a concaved groove to be the ball circulating passage as by concaving a groove on a part of the cylindrical first inner circumferential surface of a nut blank; and integrally forming an outer circumferential formation on an outer circumferential surface of the nut blank within a range in an axial direction where the concaved groove is formed, wherein the concaved groove is formed on the first inner circumferential surface of a cylindrical nut blank by pressing the first inner circumferential surface of the nut blank with a convex, by a press method using a die which includes a cam mechanism, the cam mechanism comprising a cam driver internally inserted into the nut blank and moving in the axial direction, a cam slider disposed between the nut blank and the cam driver, and having the convex corresponding to the concaved groove, the convex moving in a radial direction of the nut blank with a movement of the cam driver, and a restraining member for restraining both end faces in the axial direction and the outer circumferential surface of the nut blank, and having a first recess on an inner circumferential surface that receives the outer circumferential surface of the nut blank, and the outer circumferential formation is formed by projecting a periphery of the nut blank into the first recess of the restraining member.

2. The manufacturing method according to claim 1, further comprising: performing a working in a subsequent process after a process in said press method, by using the outer circumferential formation, a second recess or a tapered surface formed on an inner circumferential surface of the outer circumferential formation, as a reference surface or a holding part.

3. The manufacturing method according to claim 1, wherein the outer circumferential formation is a torque transmission part, a positing part, or a mounting part.

4. The manufacturing method according to claim 1, further comprising: forming a nut fitted member by insert molding on the outer circumferential surface of the nut blank, the nut fitted member being formed to cover the outer circumferential formation produced with the formation of the concaved groove.

5. The manufacturing method according to claim 4, wherein the nut fitted member is either of or both of the sleeve or a gear having a cylindrical fourth inner circumferential surface.

6. A die comprising:
a cam mechanism, the cam mechanism including:
a cam driver internally inserted into a cylindrical nut blank and moving in an axial direction;
a cam slider disposed between the nut blank and the cam driver, and having a convex corresponding to a concaved groove to be formed on a first cylindrical inner circumferential surface of the nut blank, the convex moving in a radial direction of the nut with a movement of the cam driver; and
a restraining member for restraining both end faces in the axial direction and an outer circumferential surface of the nut blank, and having a recess on an inner circumferential surface that receives the outer circumferential surface of the nut blank, the recess corresponding to a convex partially formed on the outer circumferential surface of the nut blank.

\* \* \* \* \*